US012523658B2

(12) United States Patent
Hoshida et al.

(10) Patent No.: US 12,523,658 B2
(45) Date of Patent: Jan. 13, 2026

(54) METHODS FOR THE ASSESSMENT OF RISK AND TREATMENTS FOR LIVER CANCERS AND LETHAL LIVER DISEASE COMPLICATIONS

(71) Applicants: The Board of Regents of The University of Texas System, Austin, TX (US); Université de Strasbourg, Strasbourg (FR); Institut National de la Santé et de la Recherche Médicale (INSERM), Paris (FR); Hôpitaux Universitaires de Strasbourg (HUS), Strasbourg (FR)

(72) Inventors: Yujin Hoshida, Dallas, TX (US); Naoto Fujiwara, Tsu (JP); Amit G. Singal, Dallas, TX (US); Thomas F. Baumert, Freiburg (DE)

(73) Assignees: The Board of Regents of the University of Texas System, Austin, TX (US); Université de Strasbourg, Strasbourg (FR); Institut National de la Santé et de la Recherche Médicale (INSERM), Paris (FR); Hôpitaux Universitaires de Strasbourg (HUS), Strasbourg (FR)

( * ) Notice: Subject to any disclaimer, the term of this patent is extended or adjusted under 35 U.S.C. 154(b) by 608 days.

(21) Appl. No.: 17/896,944

(22) Filed: Aug. 26, 2022

(65) Prior Publication Data
US 2023/0073981 A1 Mar. 9, 2023

Related U.S. Application Data

(60) Provisional application No. 63/237,862, filed on Aug. 27, 2021.

(51) Int. Cl.
*G01N 33/574* (2006.01)
*G01N 33/68* (2006.01)

(52) U.S. Cl.
CPC ....... *G01N 33/57438* (2013.01); *G01N 33/68* (2013.01); *G01N 2800/085* (2013.01)

(58) Field of Classification Search
None
See application file for complete search history.

(56) References Cited

U.S. PATENT DOCUMENTS

| | | | |
|---|---|---|---|
| 2007/0122855 A1* | 5/2007 | Chiang | G01N 33/57438 435/7.23 |
| 2012/0010824 A1 | 1/2012 | Cales | |
| 2013/0196868 A1 | 8/2013 | Lebowitz et al. | |
| 2016/0369004 A1* | 12/2016 | Pytowski | A61P 35/00 |
| 2018/0193342 A1* | 7/2018 | Gandhi | A61K 31/517 |
| 2020/0197384 A1* | 6/2020 | Tamai | A61P 35/00 |
| 2020/0376020 A1* | 12/2020 | Wagner | A61P 1/16 |
| 2021/0025895 A1* | 1/2021 | Wang | G01N 33/57407 |
| 2022/0089714 A1* | 3/2022 | Koltsova | A61P 1/16 |
| 2022/0093251 A1 | 3/2022 | Cooper et al. | |
| 2023/0313299 A1 | 10/2023 | Baumert et al. | |

OTHER PUBLICATIONS

Fujiwara, N., et al. "A blood-based prognostic liver secretome signature and long-term hepatocellular carcinoma risk in advanced liver fibrosis." Med 2.7 (2021): 836-850.
Fujiwara, N., et al. "A Blood-Based Prognostic Liver Secretome Signature Predicts Long-term Risk of Hepatic Decompensation in Cirrhosis." Clinical gastroenterology and hepatology : the official clinical practice journal of the American Gastroenterological Association vol. 20,5 (2022): e1188-e1191. doi: 10.1016/j.cgh.2021.03.019.
Fujiwara, N., et al. "Molecular signatures of long-term hepatocellular carcinoma risk in nonalcoholic fatty liver disease." Science translational medicine 14.650 (2022): eabo4474.
Qian, T., et al. "Molecular signature predictive of long-term liver fibrosis progression to inform antifibrotic drug development." Gastroenterology 162.4 (2022): 1210-1225.
Fujiwara N., et al. Risk factors and prevention of hepatocellular carcinoma in the era of precision medicine. J Hepatol 2018;68:526-49.
Collaborators GBDCoD. Global, regional, and national age-sex-specific mortality for 282 causes of death in 195 countries and territories, 1980-2017: a systematic analysis for the Global Burden of Disease Study 2017. Lancet 2018;392:1736-88.
Bray F., et al. Global cancer statistics 2018: GLOBOCAN estimates of incidence and mortality worldwide for 36 cancers in 185 countries. CA Cancer J Clin 2018;68:394-424.
Marrero J., et al. Diagnosis, Staging, and Management of Hepatocellular Carcinoma: 2018 Practice Guidance by the American Association for the Study of Liver Diseases. Hepatology 2018;68:723-50.
Wolf, E., et al. "Use of hepatocellular carcinoma surveillance in patients with cirrhosis: a systematic review and meta-analysis." Hepatology 73.2 (2021): 713-725.
Goossens N., et al. Cost-Effectiveness of Risk Score-Stratified Hepatocellular Carcinoma Screening in Patients with Cirrhosis. Clin Transl Gastroenterol 2017;8:e101.
Hoshida Y., et al. Gene expression in fixed tissues and outcome in hepatocellular carcinoma. N Engl J Med 2008;359:1995-2004.
Hoshida Y., et al. Prognostic gene expression signature for patients with hepatitis C-related early-stage cirrhosis. Gastroenterology 2013;144:1024-30.

(Continued)

Primary Examiner — Changhwa J Cheu
(74) Attorney, Agent, or Firm — NORTON ROSE FULBRIGHT US LLP

(57) ABSTRACT

Disclosures herein are directed to methods and compositions for predicting high- and low-risk liver disease in patients. Based on the results achieved from the methods and compositions disclosed herein, liver disease patients can be classified into a prognostic risk group, which enables early diagnosis and prevention of HCC and other lethal complications. Methods and compositions disclosed herein substantially improve the poor prognosis of subjects having or at risk for one or more liver diseases.

21 Claims, 31 Drawing Sheets
(28 of 31 Drawing Sheet(s) Filed in Color)

(56) References Cited

OTHER PUBLICATIONS

King L., et al. A genomic and clinical prognostic index for hepatitis C-related early-stage cirrhosis that predicts clinical deterioration. Gut 2015;64:1296-302.

Nakagawa S., et al. Molecular Liver Cancer Prevention in Cirrhosis by Organ Transcriptome Analysis and Lysophosphatidic Acid Pathway Inhibition. Cancer Cell 2016;30:879-90.

Goossens N., et al. Nonalcoholic Steatohepatitis Is Associated With Increased Mortality in Obese Patients Undergoing Bariatric Surgery. Clin Gastroenterol Hepatol 2016;14:1619-28.

Ono A., et al. Persisting risk of hepatocellular carcinoma after hepatitis C virus cure monitored by a liver transcriptome signature. Hepatology 2017;66:1344-6.

Hamdane N., et al. HCV-Induced Epigenetic Changes Associated With Liver Cancer Risk Persist After Sustained Virologic Response. Gastroenterology 2019;156:2313-29 e7.

Friedman J., et al. Regularization Paths for Generalized Linear Models via Coordinate Descent. J Stat Softw 2010;33:1-22.

Fujiwara N., et al. Risk Factors of Hepatocellular Carcinoma for Precision Personalized Care. In: Hoshida Y, ed. Hepatocellular Carcinoma: Translational Precision Medicine Approaches. Cham (CH)2019:3-25.

Kokudo N., et al. Clinical practice guidelines for hepatocellular carcinoma: The Japan Society of Hepatology 2017 (4th JSH-HCC guidelines) 2019 update. HepatNEJol Res 2019;49:1109-13.

Singal A., et al. Effectiveness of hepatocellular carcinoma surveillance in patients with cirrhosis. Cancer Epidemiol Biomarkers Prev 2012;21:793-9.

Moon A., et al. Contemporary Epidemiology of Chronic Liver Disease and Cirrhosis. Clin Gastroenterol Hepatol 2019.

Ogata F., et al. Outcome of All-Oral Direct-Acting Antiviral Regimens on the Rate of Development of Hepatocellular Carcinoma in Patients with Hepatitis C Virus Genotype 1-Related Chronic Liver Disease. Oncology 2017;93:92-8.

Ikeda K., et al. Direct-Acting Antivirals Decreased Tumor Recurrence After Initial Treatment of Hepatitis C Virus-Related Hepatocellular Carcinoma. Dig Dis Sci 2017;62:2932-42.

Graf E., et al. Assessment and comparison of prognostic classification schemes for survival data. Stat Med 1999;18:2529-45.

Harrell F., Jr., et al. Multivariable prognostic models: issues in developing models, evaluating assumptions and adequacy, and measuring and reducing errors. Stat Med 1996; 15:361-87.

Pepe M., et al. Estimating the receiver operating characteristic curve in studies that match controls to cases on covariates. Acad Radiol 2013;20:863-73.

Lausen B., et al.. Maximally Selected Rank Statistics. Biometrics 1992;48:73-85.

Nakagawa H., et al. Impact of serum levels of interleukin-6 and adiponectin on all-cause, liver-related, and liver-unrelated mortality in chronic hepatitis C patients. J Gastroenterol Hepatol 2015;30:379-88.

Sun T., et al. Prognostic value of osteopontin in patients with hepatocellular carcinoma: A systematic review and meta-analysis. Medicine (Baltimore) 2018;97:e12954.

Zhang B., et al. Diagnostic accuracy of midkine on hepatocellular carcinoma: A meta-analysis. PLoS One 2019;14:e0223514.

Castello B., et al. Post-transplantation outcome in nonalcoholic steatohepatitis cirrhosis: Comparison with alcoholic cirrhosis. Ann Hepatol 2019;18:855-61.

Baumert T., et al. Hepatitis C-related hepatocellular carcinoma in the era of new generation antivirals. BMC Med 2017;15:52.

Kanwal F., et al. Risk of Hepatocellular Cancer in HCV Patients Treated With Direct-Acting Antiviral Agents. Gastroenterology 2017;153:996-1005 e1.

Ioannou G., et al. Increased Risk for Hepatocellular Carcinoma Persists Up to 10 Years After HCV Eradication in Patients with Baseline Cirrhosis or High FIB-Scores. Gastroenterology 2019.

Singal A., et al. Direct-Acting Antiviral Therapy for Hepatitis C Virus Infection Is Associated With Increased Survival in Patients With a History of Hepatocellular Carcinoma. Gastroenterology 2019;157:1253-63 e2.

Manthravadi S., et al. Impact of sustained viral response postcurative therapy of hepatitis C-related hepatocellular carcinoma: a systematic review and meta-analysis. Int J Cancer 2017;140:1042-9.

Simon T., et al. Lipophilic Statins and Risk for Hepatocellular Carcinoma and Death in Patients With Chronic Viral Hepatitis: Results From a Nationwide Swedish Population. Ann Intern Med 2019.

Simon T., et al. Association of Aspirin with Hepatocellular Carcinoma and Liver-Related Mortality. N Engl J Med 2020;382:1018-28.

Xu R., et al. Circulating tumour DNA methylation markers for diagnosis and prognosis of hepatocellular carcinoma. Nat Mater 2017;16:1155-61.

Johnson P., et al. The detection of hepatocellular carcinoma using a prospectively developed and validated model based on serological biomarkers. Cancer Epidemiol Biomarkers Prev 2014;23:144-53.

Atiq O., et al. An assessment of benefits and harms of hepatocellular carcinoma surveillance in patients with cirrhosis. Hepatology 2017;65:1196-205.

Parikh N., et al. Cost-Effectiveness of Hepatocellular Carcinoma Surveillance: An Assessment of Benefits and Harms. Am J Gastroenterol 2020.

UniProt Consortium. "UniProt: a worldwide hub of protein knowledge." Nucleic acids research 47.D1 (2019): D506-D515.

Almagro Armenteros, J., et al. "SignalP 5.0 improves signal peptide predictions using deep neural networks." Nature biotechnology 37.4 (2019): 420-423.

Savojardo, C., et al. "DeepSig: deep learning improves signal peptide detection in proteins." Bioinformatics 34.10 (2018): 1690-1696.

Tsirigos, K., et al. "The TOPCONS web server for consensus prediction of membrane protein topology and signal peptides." Nucleic acids research 43.W1 (2015): W401-W407.

Schwenk, J., et al. "The human plasma proteome draft of 2017: building on the human plasma PeptideAtlas from mass spectrometry and complementary assays." Journal of proteome research 16.12 (2017): 4299-4310.

Nanjappa, V., et al. "Plasma Proteome Database as a resource for proteomics research: 2014 update." Nucleic acids research 42.D1 (2014): D959-D965.

Wang, M., et al. "Version 4.0 of PaxDb: protein abundance data, integrated across model organisms, tissues, and cell-lines." Proteomics 15.18 (2015): 3163-3168.

Diamandis, E. "Cancer biomarkers: can we turn recent failures into success?." Journal of the National Cancer Institute 102.19 (2010): 1462-1467.

Uhlén, M., et al. "Tissue-based map of the human proteome." Science 347.6220 (2015): 1260419.

Liu, X., et al. "Association of serum level of growth differentiation factor 15 with liver cirrhosis and hepatocellular carcinoma." PloS one 10.5 (2015): e0127518.

Koo, B., et al. "Growth differentiation factor 15 predicts advanced fibrosis in biopsy-proven non-alcoholic fatty liver disease." Liver International 38.4 (2018): 695-705.

Liberzon, A., et al. "The molecular signatures database hallmark gene set collection." Cell systems 1.6 (2015): 417-425.

Subramanian, A., et al. "Gene set enrichment analysis: a knowledge-based approach for interpreting genome-wide expression profiles." Proceedings of the National Academy of Sciences 102.43 (2005): 15545-15550.

Nakagawa, S., et al. "Molecular liver cancer prevention in cirrhosis by organ transcriptome analysis and lysophosphatidic acid pathway inhibition." Cancer cell 30.6 (2016): 879-890.

Shi, H., et al. "Predicting drug-target interactions using Lasso with random forest based on evolutionary information and chemical structure." Genomics 111.6 (2019): 1839-1852.

Ramachandran, P., et al. "Resolving the fibrotic niche of human liver cirrhosis at single-cell level." Nature 575.7783 (2019): 512-518.

(56) References Cited

OTHER PUBLICATIONS

Kokudo, N., et al. "Clinical practice guidelines for hepatocellular carcinoma: the Japan Society of Hepatology 2017 (4th JSH-HCC guidelines) 2019 update." Hepatology Research 49.10 (2019): 1109-1113.

WHO Expert Committee. "Physical status: the use and interpretation of anthropometry. Report of a WHO Expert Committee." World Health Organ Tech Rep Ser 854 (1995): 1-452.

Pan W., et al. "How to define obesity? Evidence-based multiple action points for public awareness, screening, and treatment: an extension of Asian-Pacific recommendations." (2008): 370-374.

Osaki, Y., et al. "Prevalence and trends in alcohol dependence and alcohol use disorders in Japanese adults; results from periodical nationwide surveys." Alcohol and Alcoholism 51.4 (2016): 465-473.

Carrat, F., et al., Clinical outcomes in patients with chronic hepatitis C after direct-acting antiviral treatment: a prospective cohort study Lancet. 2019; 393: 1453-1464.

Nagata, H., et al. "Effect of interferon-based and-free therapy on early occurrence and recurrence of hepatocellular carcinoma in chronic hepatitis C." Journal of hepatology 67.5 (2017): 933-939.

Hughes, D., et al. "Serum levels of α-fetoprotein increased more than 10 years before detection of hepatocellular carcinoma." Clinical Gastroenterology and Hepatology 19.1 (2021): 162-170.

Rich, N., et al. "Hepatocellular carcinoma demonstrates heterogeneous growth patterns in a multicenter cohort of patients with cirrhosis." Hepatology 72.5 (2020): 1654-1665.

Castelló, B., et al. "Post-transplantation outcome in non-alcoholic steatohepatitis cirrhosis: Comparison with alcoholic cirrhosis." Annals of Hepatology 18.6 (2019): 855-861.

Baumert, T., et al. "Hepatitis C-related hepatocellular carcinoma in the era of new generation antivirals." BMC medicine 15 (2017): 1-10.

Kanwal, F., et al. "Risk of hepatocellular cancer in HCV patients treated with direct-acting antiviral agents." Gastroenterology 153.4 (2017): 996-1005.

Ioannou, G., et al. "Increased risk for hepatocellular carcinoma persists up to 10 years after HCV eradication in patients with baseline cirrhosis or high FIB-4 scores." Gastroenterology 157.5 (2019): 1264-1278.

Singal, A., et al. "Direct-acting antiviral therapy for hepatitis C virus infection is associated with increased survival in patients with a history of hepatocellular carcinoma." Gastroenterology 157.5 (2019): 1253-1263.

Galle, P., et al. "Biology and significance of alpha-fetoprotein in hepatocellular carcinoma." Liver international 39.12 (2019): 2214-2229.

Nathani, P., et al. "Hepatocellular carcinoma tumour volume doubling time: a systematic review and meta-analysis." Gut 70.2 (2021): 401-407.

Mogensen, U., et al. "Evaluating random forests for survival analysis using prediction error curves." Journal of statistical software 50.11 (2012): 1.

Lausen, B., et al. "Maximally selected rank statistics." Biometrics (1992): 73-85.

Doove, L., et al. "Recursive partitioning for missing data imputation in the presence of interaction effects." Computational statistics & data analysis 72 (2014): 92-104.

Van Buuren, S., et al. "mice: Multivariate imputation by chained equations in R." Journal of statistical software 45 (2011): 1-67.

Dong, Y., et al. "Principled missing data methods for researchers." SpringerPlus 2 (2013): 1-17.

Guha, I., et al. "Validation of a model for identification of patients with compensated cirrhosis at high risk of decompensation." Clinical Gastroenterology and Hepatology 17.11 (2019): 2330-2338.

Hsu, C., et al. "Comparison of seven noninvasive models for predicting decompensation and hospitalization in patients with cirrhosis." Digestive diseases and sciences (2021): 1-10.

International Search Report and Written Opinion for PCT/US2023/079339 mailed Mar. 26, 2024 (Applicant—The Board of Regents of the University of Texas System, et al.) (21 Pages).

Marcolongo, M., et al. "A seven-gene signature (cirrhosis risk score) predicts liver fibrosis progression in patients with initially mild chronic hepatitis C." Hepatology 50.4 (2009): 1038-1044.

Dobin, A., et al. STAR: ultrafast universal RNA-seq aligner. Bioinformatics 2013;29:15-21.

Liao, Y., et al. The R package Rsubread is easier, faster, cheaper and better for alignment and quantification of RNA sequencing reads. Nucleic Acids Res 2019;47:e47.

Love, M., et al. Moderated estimation of fold change and dispersion for RNA-seq data with DESeq2. Genome Biol 2014;15:550.

Fujiwara, N., et al. "Plasma-signature-model for end-stage liver disease score to predict survival in severe alcoholic hepatitis." Clinical Gastroenterology and Hepatology 20.3 (2022): 651-657.

Hoshida, Y. Nearest template prediction: a single-sample-based flexible class prediction with confidence assessment. PLoS One 2010;5:e15543.

Zhang, D., et al. A hepatic stellate cell gene expression signature associated with outcomes in hepatitis C cirrhosis and hepatocellular carcinoma after curative resection. Gut 2016;65:1754-64.

Drews, F., et al. Disruption of the latent transforming growth factor-beta binding protein-1 gene causes alteration in facial structure and influences TGF-beta bioavailability. Biochim Biophys Acta 2008;1783:34-48.

Song, W., et al. Multiscale Embedded Gene Co-expression Network Analysis. PLoS Comput Biol 2015;11:e1004574.

Benjamini, Y., et al. Controlling the False Discovery Rate: A Practical and Powerful Approach to Multiple Testing. J R Stat Soc Series B Stat Methodol 1995;57:289-300.

Diseases GBD, Injuries C. Global burden of 369 diseases and injuries in 204 countries and territories, 1990-2019: a systematic analysis for the Global Burden of Disease Study 2019. Lancet 2020;396:1204-1222.

Karsdal, M., et al. Collagen biology and non-invasive biomarkers of liver fibrosis. Liver Int 2020;40:736-750.

Fujiwara, N., et al. A Blood-Based Prognostic Liver Secretome Signature Predicts Long-term Risk of Hepatic Decompensation in Cirrhosis. Clin Gastroenterol Hepatol 2021.

Higashi, T., et al. Hepatic stellate cells as key target in liver fibrosis. Adv Drug Deliv Rev 2017;121:27-42.

Sulkowski, M., et al. Rapid fibrosis progression among HIV/hepatitis C virus-co-infected adults. AIDS 2007;21:2209-16.

Department of H, Human Services. Panel on Clinical Practices for Treatment of HIVI, Henry JKFFPoCPfToHIVI. Guidelines for the use of antiretroviral agents in HIV-infected adults and adolescents, Jan. 28, 2000 by the Panel on Clinical Practices for Treatment of HIV Infection. HIV Clin Trials 2000;1:60-110.

Castera, L., et al. Prospective comparison of transient elastography, Fibrotest, APRI, and liver biopsy for the assessment of fibrosis in chronic hepatitis C. Gastroenterology 2005;128:343-50.

Castera, L., Non-invasive evaluation of liver fibrosis using transient elastography. J Hepatol 2008;48:835-47.

Daijo, K., et al. Risk factors for histological progression of non-alcoholic steatohepatitis analyzed from repeated biopsy cases. J Gastroenterol Hepatol 2020;35:1412-1419.

Ratziu, V., et al. Cenicriviroc Treatment for Adults With Nonalcoholic Steatohepatitis and Fibrosis: Final Analysis of the Phase 2b CENTAUR Study. Hepatology 2020;72:892-905.

Crouchet, E., et al. A human liver cell-based system modeling a clinical prognostic liver signature for therapeutic discovery. Nat Commun 2021;12:5525.

Zhang, D., et al. A hepatic stellate cell gene expression signature associated with outcomes in hepatitis C cirrhosis and hepatocellular carcinoma after curative resection. Gut 2015.

Tan, P., et al. Clinicopathological indices to predict hepatocellular carcinoma molecular classification. Liver Int 2015.

Chen, J., et al. HCV and HIV co-infection: mechanisms and management. Nat Rev Gastroenterol Hepatol 2014;11:362-71.

Berenguer, M., et al. Progression of liver fibrosis in post-transplant hepatitis C: mechanisms, assessment and treatment. J Hepatol 2013;58:1028-41.

(56) References Cited

OTHER PUBLICATIONS

Yang, L., et al. Liver transplantation: a systematic review of long-term quality of life. Liver Int 2014;34:1298-313.

Omar, H., et al. Longitudinal assessment of hepatic fibrosis in responders to direct-acting antivirals for recurrent hepatitis C after liver transplantation using noninvasive methods. Clin Transplant 2018;32:e13334.

Falade-Nwulia, O., et al. Oral Direct-Acting Agent Therapy for Hepatitis C Virus Infection: A Systematic Review. Ann Intern Med 2017;166:637-648.

Novo, E., et al. Overexpression of Bcl-2 by activated human hepatic stellate cells: resistance to apoptosis as a mechanism of progressive hepatic fibrogenesis in humans. Gut 2006;55:1174-82.

Subramanian, A., et al. A Next Generation Connectivity Map: L1000 Platform and the First 1,000,000 Profiles. Cell 2017;171:1437-1452 e17.

Anan, A., et al. Proteasome inhibition induces hepatic stellate cell apoptosis. Hepatology 2006;43:335-44.

Juhling, F., et al. Targeting clinical epigenetic reprogramming for chemoprevention of metabolic and viral hepatocellular carcinoma. Gut 2021;70:157-169.

Fuchs, B., et al. Epidermal growth factor receptor inhibition attenuates liver fibrosis and development of hepatocellular carcinoma. Hepatology 2014;59:1577-90.

Friedman, S., et al. A randomized, placebo-controlled trial of cenicriviroc for treatment of nonalcoholic steatohepatitis with fibrosis. Hepatology 2018;67:1754-1767.

Sojoodi, M., et al. Epigallocatechin Gallate Induces Hepatic Stellate Cell Senescence and Attenuates Development of Hepatocellular Carcinoma. Cancer Prev Res (Phila) 2020;13:497-508.

Peng, F., et al. CAT1 silencing inhibits TGF-beta1-induced mouse hepatic stellate cell activation in vitro and hepatic fibrosis in vivo. Cytokine 2020;136:155288.

Crouchet, E., et al. A human liver cell-based system modeling a clinical prognostic liver signature combined with single-cell RNA-Seq for discovery of liver disease therapeutics. Nat Commun 2021 in press.

Zhang, Y., et al. E2F1 is a novel fibrogenic gene that regulates cholestatic liver fibrosis through the Egr-1/SHP/EID1 network. Hepatology 2014;60:919-30.

Vuppalanchi, R., et al. "Therapeutic pipeline in nonalcoholic steatohepatitis." Nature reviews Gastroenterology & hepatology 18.6 (2021): 373-392.

McMullen, P., et al. A map of the PPARalpha transcription regulatory network for primary human hepatocytes. Chem Biol Interact 2014;209:14-24.

Honor, A., et al. Givosiran to treat acute porphyria. Drugs Today (Barc) 2021;57:47-59.

Cheng, Q., et al. Selective organ targeting (SORT) nanoparticles for tissue-specific mRNA delivery and CRISPR-Cas gene editing. Nat Nanotechnol 2020;15:313-320.

Lai, Q., et al. E2F1 inhibits circulating cholesterol clearance by regulating Pcsk9 expression in the liver. JCI Insight 2017;2.

Lee, B., et al. "National prevalence estimates for steatotic liver disease and subclassifications using consensus nomenclature." Hepatology 79.3 (2024): 666-673.

García-Compeán, D., et al. "NAFLD VS MAFLD. The evidence-based debate has come. Time to change?." Annals of Hepatology 27.6 (2022): 100765.

Pouwels, S., et al. "Non-alcoholic fatty liver disease (NAFLD): a review of pathophysiology, clinical management and effects of weight loss." BMC endocrine disorders 22.1 (2022): 63.

Monti, S., et al. "Consensus clustering: a resampling-based method for class discovery and visualization of gene expression microarray data." Machine learning 52 (2003): 91-118.

Sadanandam, A., et al. "A colorectal cancer classification system that associates cellular phenotype and responses to therapy." Nature medicine 19.5 (2013): 619-625.

Joo, K.M., et al. "Patient-specific orthotopic glioblastoma xenograft models recapitulate the histopathology and biology of human glioblastomas in situ." Cell reports 3.1 (2013): 260-273.

Loomba, R., et al. "Mechanisms and disease consequences of nonalcoholic fatty liver disease." Cell 184.10 (2021): 2537-2564.

Mokdad, A., et al. "Trends and patterns of disparities in cancer mortality among US counties, 1980-2014." Jama 317.4 (2017): 388-406.

Younossi, Z., et al. "Global perspectives on nonalcoholic fatty liver disease and nonalcoholic steatohepatitis." Hepatology 69.6 (2019): 2672-2682.

Simon, T., et al. "Cancer risk in patients with biopsy-confirmed nonalcoholic fatty liver disease: a population-based cohort study." Hepatology 74.5 (2021): 2410-2423.

Sanyal, A., et al. "Prospective study of outcomes in adults with nonalcoholic fatty liver disease." New England Journal of Medicine 385.17 (2021): 1559-1569.

Younes, R., et al. "Long-term outcomes and predictive ability of non-invasive scoring systems in patients with non-alcoholic fatty liver disease." Journal of hepatology 75.4 (2021): 786-794.

Singal, A., et al. "Novel application of predictive modeling: a tailored approach to promoting HCC surveillance in patients with cirrhosis." Clinical Gastroenterology and Hepatology 20.8 (2022): 1795-1802.

Pepe, M., et al. "Pivotal evaluation of the accuracy of a biomarker used for classification or prediction: standards for study design." Journal of the National Cancer Institute 100.20 (2008): 1432-1438.

Gellert-Kristensen, H., et al. "Combined effect of PNPLA3, TM6SF2, and HSD17B13 variants on risk of cirrhosis and hepatocellular carcinoma in the general population." Hepatology 72.3 (2020): 845-856.

Lurje, I., et al. "Dendritic cell and T cell crosstalk in liver fibrogenesis and hepatocarcinogenesis: implications for prevention and therapy of liver cancer." International journal of molecular sciences 21.19 (2020): 7378.

Yang, Q., et al. "Serotonin activated hepatic stellate cells contribute to sex disparity in hepatocellular carcinoma." Cellular and Molecular Gastroenterology and Hepatology 3.3 (2017): 484-499.

Liang, B., et al. "TBX3 functions as a tumor suppressor downstream of activated CTNNB1 mutants during hepatocarcinogenesis." Journal of hepatology 75.1 (2021): 120-131.

Nakagawa, H., et al. "ER stress cooperates with hypernutrition to trigger TNF-dependent spontaneous HCC development." Cancer cell 26.3 (2014): 331-343.

Lee, Y., et al. "Autophagy is a gatekeeper of hepatic differentiation and carcinogenesis by controlling the degradation of Yap." Nature communications 9.1 (2018): 4962.

Dapito, D., et al. "Promotion of hepatocellular carcinoma by the intestinal microbiota and TLR4." Cancer cell 21.4 (2012): 504-516.

Kettner, N., et al. "Circadian homeostasis of liver metabolism suppresses hepatocarcinogenesis." Cancer cell 30.6 (2016): 909-924.

Grohmann, M., et al. "Obesity drives STAT-1-dependent NASH and STAT-3-dependent HCC." Cell 175.5 (2018): 1289-1306.

Barb, D., et al. "Plasma fibroblast growth factor 21 is associated with severity of nonalcoholic steatohepatitis in patients with obesity and type 2 diabetes." The Journal of Clinical Endocrinology & Metabolism 104.8 (2019): 3327-3336.

Attia, Y., et al. "Activation of FXR modulates SOCS3/Jak2/STAT3 signaling axis in a NASH-dependent hepatocellular carcinoma animal model." Biochemical pharmacology 186 (2021): 114497.

Aizarani, N., et al. "A human liver cell atlas reveals heterogeneity and epithelial progenitors." Nature 572.7768 (2019): 199-204.

Payen, V., et al. "Single-cell RNA sequencing of human liver reveals hepatic stellate cell heterogeneity." Jhep Reports 3.3 (2021): 100278.

Pfister, D., et al. "NASH limits anti-tumour surveillance in immunotherapy-treated HCC." Nature 592.7854 (2021): 450-456.

Hao, Y., et al. "Integrated analysis of multimodal single-cell data." Cell 184.13 (2021): 3573-3587.

Dudek, M., et al. "Auto-aggressive CXCR6+ CD8 T cells cause liver immune pathology in NASH." Nature 592.7854 (2021): 444-449.

(56) References Cited

OTHER PUBLICATIONS

Carpino, G., et al. "Increased liver localization of lipopolysaccharides in human and experimental NAFLD." Hepatology 72.2 (2020): 470-485.
Tirosh, I., et al. "Dissecting the multicellular ecosystem of metastatic melanoma by single-cell RNA-seq." Science vol. 352,6282 (2016): 189-96. doi: 10.1126/science.aad0501.
Deczkowska, A., et al. "XCR1+ type 1 conventional dendritic cells drive liver pathology in non-alcoholic steatohepatitis." Nature medicine 27.6 (2021): 1043-1054.
Wculek, S., et al. "Dendritic cells in cancer immunology and immunotherapy." Nature Reviews Immunology 20.1 (2020): 7-24.
Munn, D., et al. "IDO in the tumor microenvironment: inflammation, counter-regulation, and tolerance." Trends in immunology 37.3 (2016): 193-207.
Heinze, G., et al. "A solution to the problem of monotone likelihood in Cox regression." Biometrics 57.1 (2001): 114-119.
Singal, A., et al. "GALAD demonstrates high sensitivity for HCC surveillance in a cohort of patients with cirrhosis." Hepatology 75.3 (2022): 541-549.
Kroczek, R., et al. "The role of XCR1 and its ligand XCL1 in antigen cross-presentation by murine and human dendritic cells." Frontiers in immunology 3 (2012): 14.
Rustgi, V., et al. "Bariatric surgery reduces cancer risk in adults with nonalcoholic fatty liver disease and severe obesity." gastroenterology 161.1 (2021): 171-184.
Haas, J., et al. "Transcriptional network analysis implicates altered hepatic immune function in NASH development and resolution." Nature metabolism 1.6 (2019): 604-614.
Lefebvre, P., et al. "Interspecies NASH disease activity whole-genome profiling identifies a fibrogenic role of PPARα-regulated dermatopontin." JCI insight 2.13 (2017).
Pinyopornpanish, K., et al. "Chemopreventive effect of statin on hepatocellular carcinoma in patients with nonalcoholic steatohepatitis cirrhosis." Official journal of the American College of Gastroenterology| ACG 116.11 (2021): 2258-2269.
Margerie, D., et al. "Hepatic transcriptomic signatures of statin treatment are associated with impaired glucose homeostasis in severely obese patients." BMC Medical Genomics 12 (2019): 1-10.
Singal, A., et al. "Benefits and harms of hepatocellular carcinoma surveillance in a prospective cohort of patients with cirrhosis." Clinical Gastroenterology and Hepatology 19.9 (2021): 1925-1932.
Govaere, O., et al. "Transcriptomic profiling across the nonalcoholic fatty liver disease spectrum reveals gene signatures for steatohepatitis and fibrosis." Science translational medicine 12.572 (2020): eaba4448.
Hoang, S., et al. "Gene expression predicts histological severity and reveals distinct molecular profiles of nonalcoholic fatty liver disease." Scientific reports 9.1 (2019): 12541.
Gerhard, G., et al. "Transcriptomic profiling of obesity-related nonalcoholic steatohepatitis reveals a core set of fibrosis-specific genes." Journal of the Endocrine Society 2.7 (2018): 710-726.
Chalasani, N., et al. "The diagnosis and management of nonalcoholic fatty liver disease: practice guidance from the American Association for the Study of Liver Diseases." Hepatology 67.1 (2018): 328-357.
Kleiner, D., et al. "Design and validation of a histological scoring system for nonalcoholic fatty liver disease." Hepatology 41.6 (2005): 1313-1321.
Simon, R., et al. "Use of archived specimens in evaluation of prognostic and predictive biomarkers." Journal of the National Cancer Institute 101.21 (2009): 1446-1452.
Shiina, S., et al. "Radiofrequency ablation for hepatocellular carcinoma: 10-year outcome and prognostic factors." Official journal of the American College of Gastroenterology| ACG 107.4 (2012): 569-577.
Liao, Y., et al. "featureCounts: an efficient general purpose program for assigning sequence reads to genomic features." Bioinformatics 30.7 (2014): 923-930.
Liberzon, A., et al. "Molecular signatures database (MSigDB) 3.0." Bioinformatics 27.12 (2011): 1739-1740.
Van der Auwera, G., et al. Genomics in the cloud: using Docker, GATK, and WDL in Terra. O'Reilly Media, 2020.
Sherry, S., et al. "dbSNP: the NCBI database of genetic variation." Nucleic acids research 29.1 (2001): 308-311.
Poplin, R., et al. "Scaling accurate genetic variant discovery to tens of thousands of samples." BioRxiv (2017): 201178.
Stuart, T., et al. "Comprehensive integration of single-cell data." cell 177.7 (2019): 1888-1902.
MacParland, S., et al. "Single cell RNA sequencing of human liver reveals distinct intrahepatic macrophage populations." Nature communications 9.1 (2018): 4383.
Elosua-Bayes, M., et al. "SPOTlight: seeded NMF regression to deconvolute spatial transcriptomics spots with single-cell transcriptomes." Nucleic acids research 49.9 (2021): e50-e50.
Efremova, M., et al. "CellPhoneDB: inferring cell-cell communication from combined expression of multi-subunit ligand-receptor complexes." Nature protocols 15.4 (2020): 1484-1506.
Ahrens, M., et al. "DNA methylation analysis in nonalcoholic fatty liver disease suggests distinct disease-specific and remodeling signatures after bariatric surgery." Cell metabolism 18.2 (2013): 296-302.
Murphy, S., et al. "Relationship between methylome and transcriptome in patients with nonalcoholic fatty liver disease." Gastroenterology 145.5 (2013): 1076-1087.
Haas, J., et al. "Author Correction: Transcriptional network analysis implicates altered hepatic immune function in NASH development and resolution." Nature Metabolism 1.7 (2019): 744-744.
Imamura, H., et al. "Risk factors contributing to early and late phase intrahepatic recurrence of hepatocellular carcinoma after hepatectomy." Journal of hepatology 38.2 (2003): 200-207.
Roessler, S., et al. "A unique metastasis gene signature enables prediction of tumor relapse in early-stage hepatocellular carcinoma patients." Cancer research 70.24 (2010): 10202-10212.
Trépo, E., et al. "Combination of gene expression signature and model for end-stage liver disease score predicts survival of patients with severe alcoholic hepatitis." Gastroenterology 154.4 (2018): 965-975.
Bair, E., et al. "Semi-supervised methods to predict patient survival from gene expression data." PLoS biology 2.4 (2004): e108.
Reich, M., et al. "GenePattern 2.0." Nature genetics 38.5 (2006): 500-501.
Bansal, M., et al. "A community computational challenge to predict the activity of pairs of compounds." Nature biotechnology 32.12 (2014): 1213-1222.
Candia, J., et al. "The genomic landscape of Mongolian hepatocellular carcinoma." Nature Communications 11.1 (2020): 4383.
Deltenre, P., et al. "Gene signature-MELD score and alcohol relapse determine long-term prognosis of patients with severe alcoholic hepatitis." Liver international 40.3 (2020): 565-570.
Åberg, F., et al. "Alcohol consumption and metabolic syndrome: clinical and epidemiological impact on liver disease." Journal of hepatology 78.1 (2023): 191-206.

\* cited by examiner

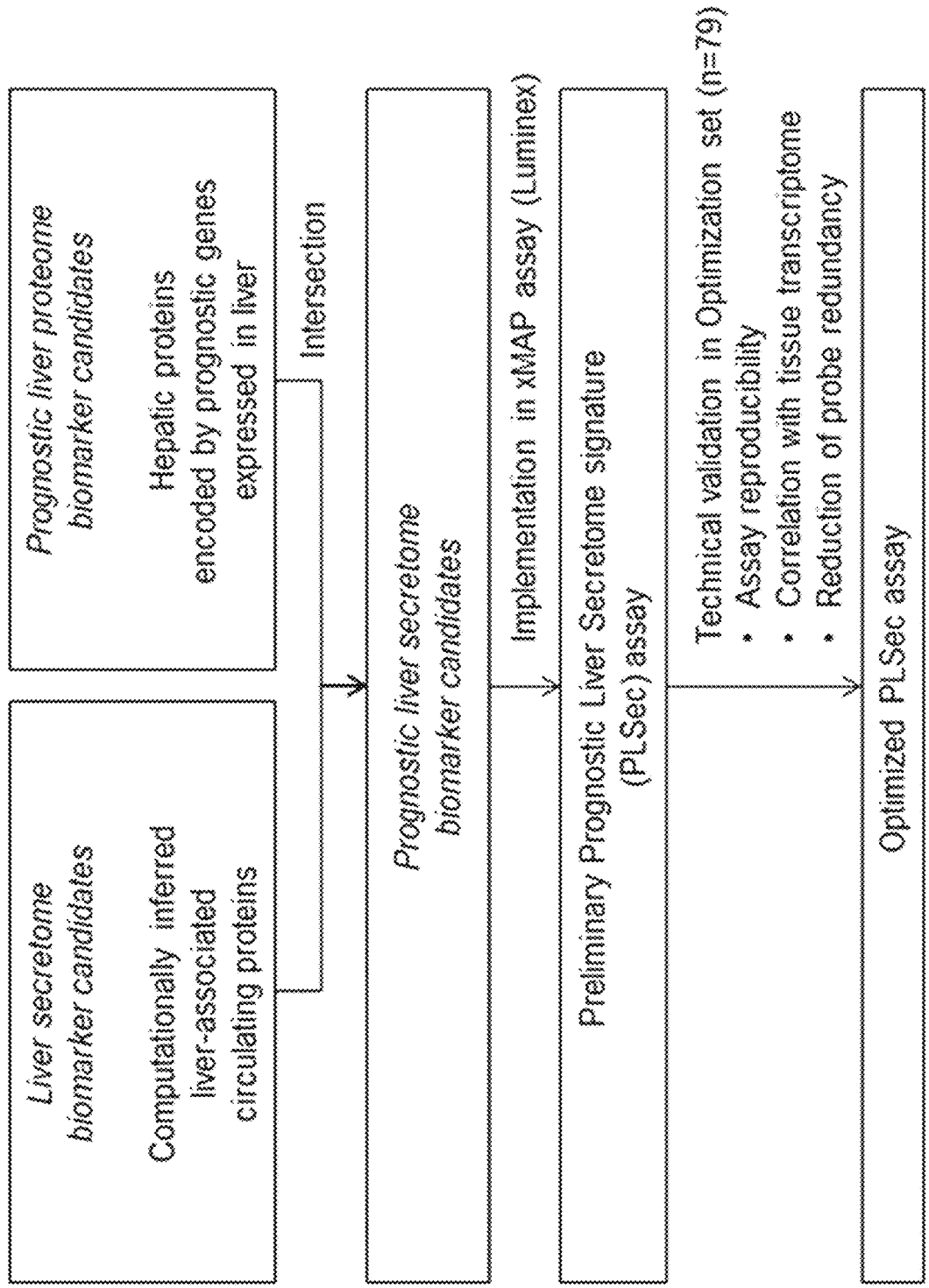

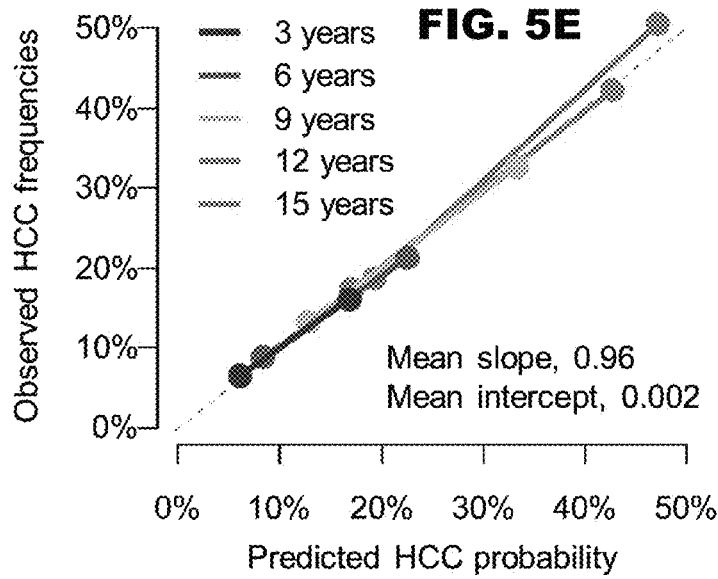
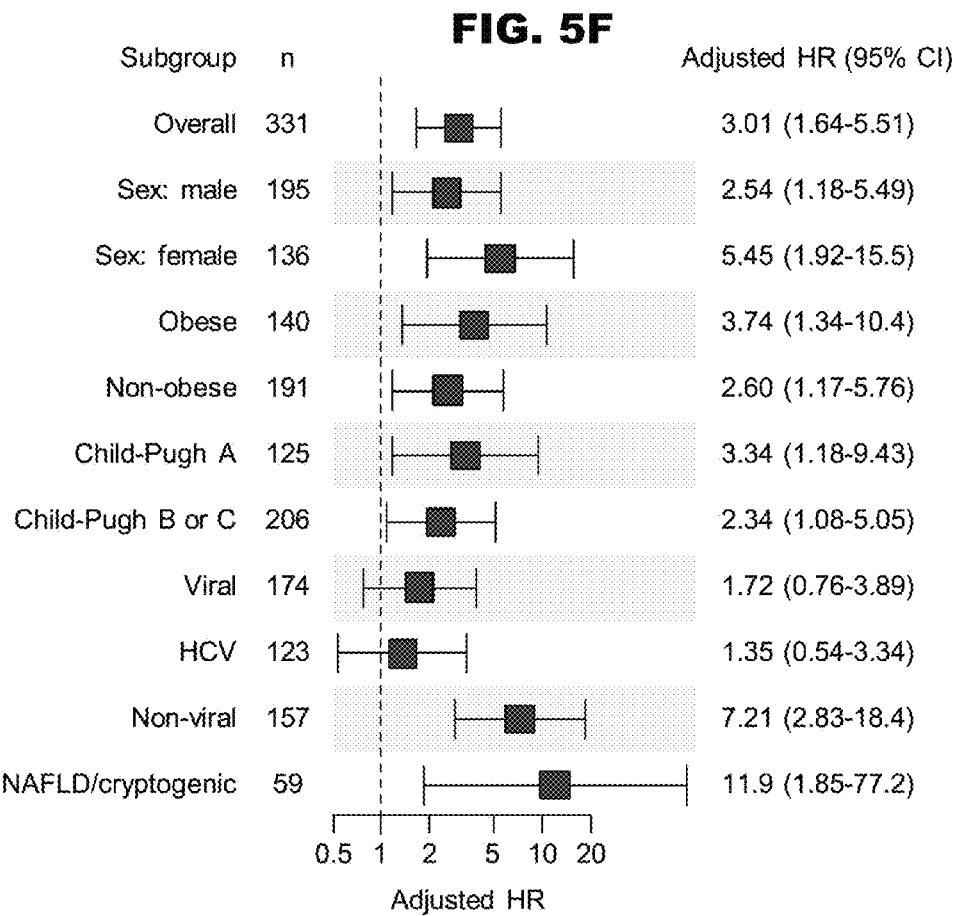

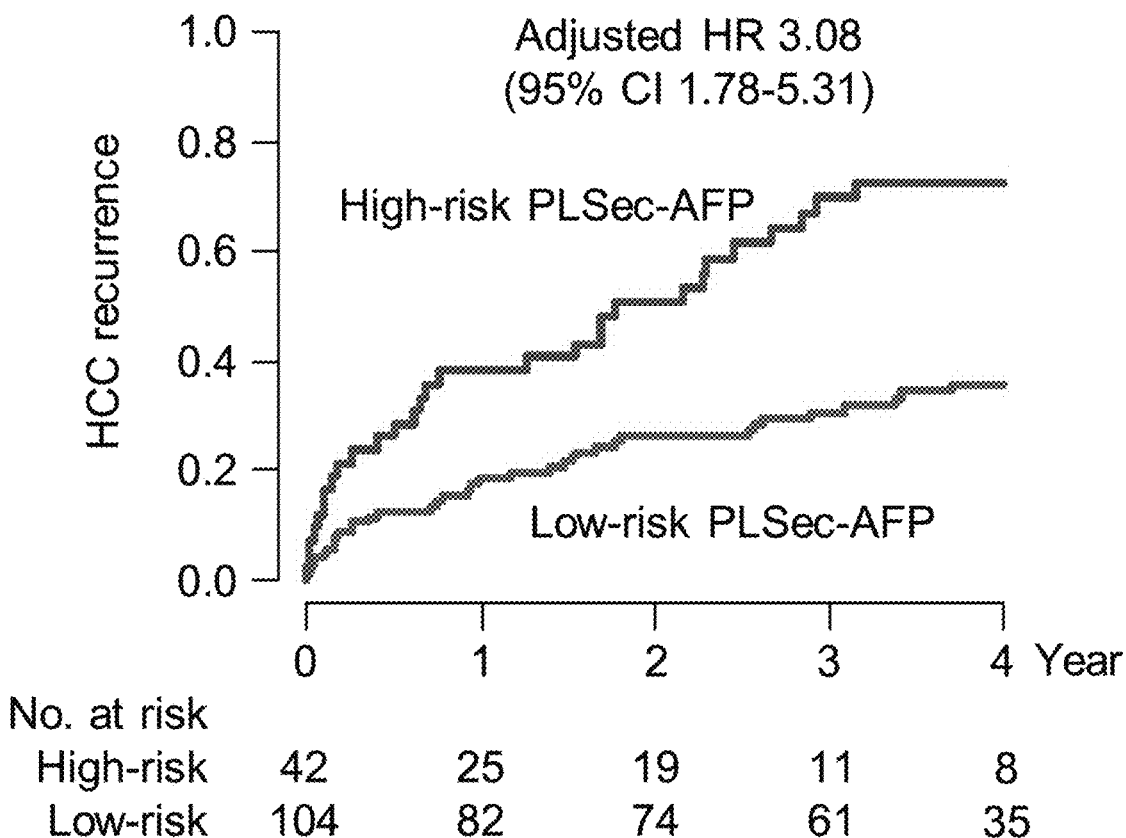
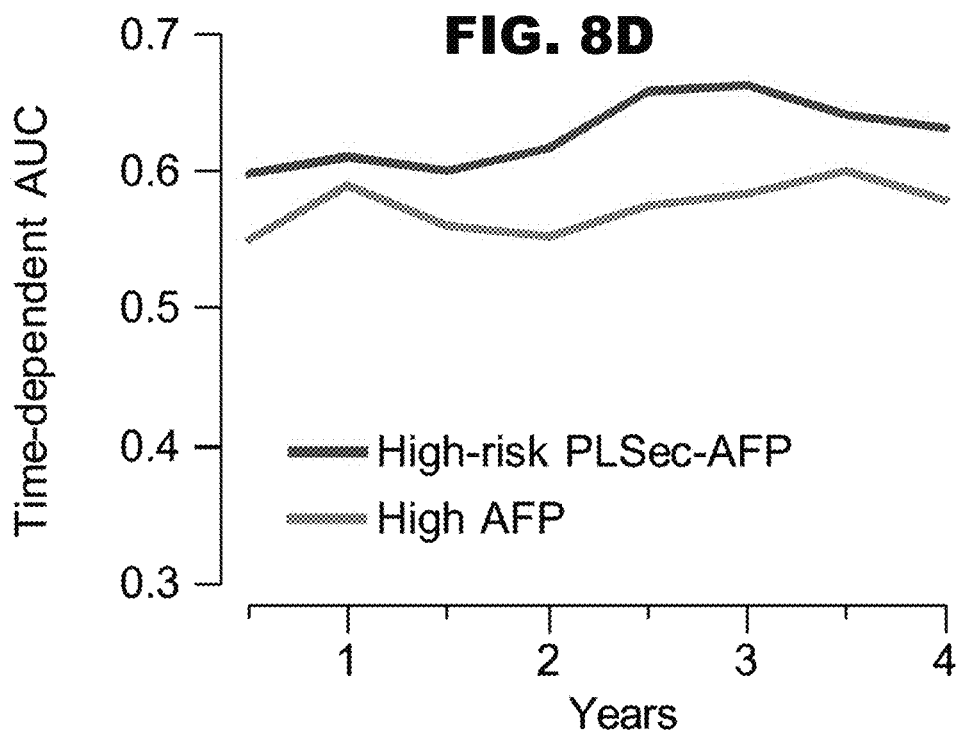

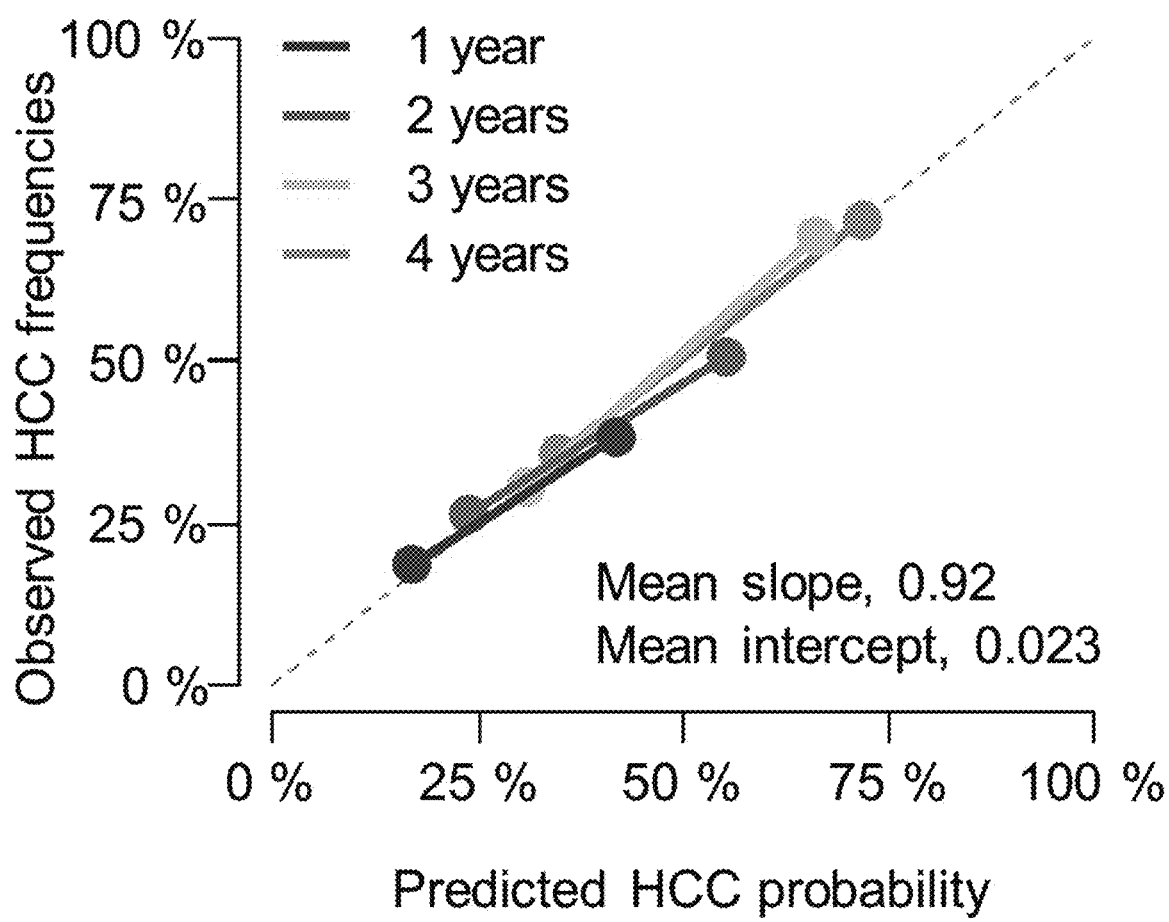

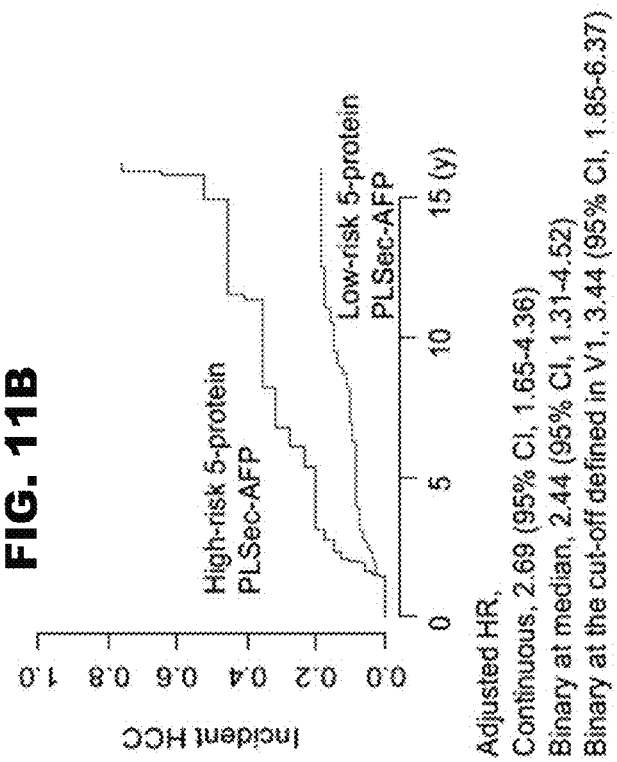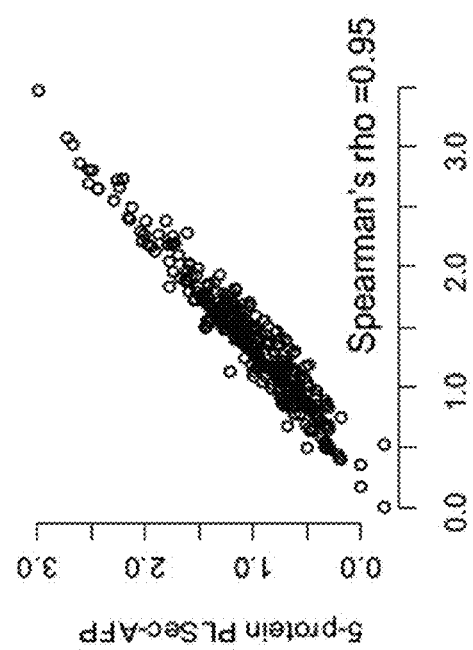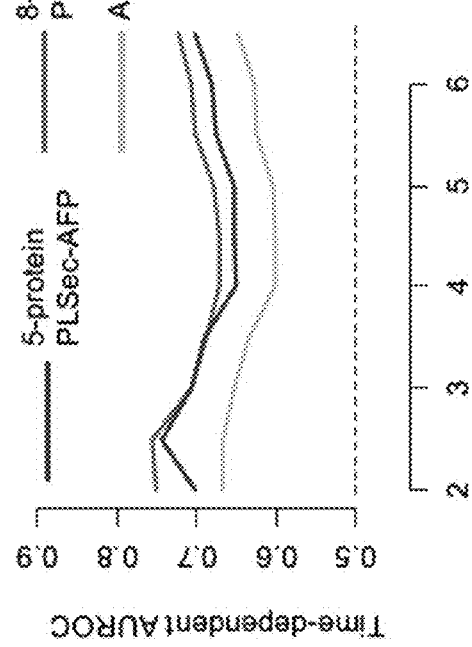
FIG. 11A
FIG. 11B
FIG. 11C

Median follow-up, 2.6 (IQR, 1.3-4.2) years
102 HCCs developed.
Annual incident HCC, 2.6%

METHODS FOR THE ASSESSMENT OF RISK AND TREATMENTS FOR LIVER CANCERS AND LETHAL LIVER DISEASE COMPLICATIONS

CROSS REFERENCE TO RELATED APPLICATION

This application claims the benefit of U.S. Provisional Application No. 63/237,862 filed on Aug. 27, 2021, the disclosure of which is hereby incorporated by reference in its entirety.

ACKNOWLEDGEMENT OF GOVERNMENT SUPPORT

This invention was made with government support under Grant Nos. DK099558, CA233794, CA230694, and CA222900 awarded by the National Institutes of Health. The government has certain rights in this invention.

BACKGROUND

1. Field

The present inventive concept is directed to methods of determining a prognostic liver secretome signature (PLSec) score for use in prediction of risk for developing liver cancer (e.g., hepatocellular carcinoma (HCC)) and lethal liver disease complications (e.g., hepatic decompensation, fibrosis progression) in a subject.

2. Discussion of Related Art

Accurate prediction of risk for developing cancers (especially HCC) and lethal complications is a critical step in the management of subjects having chronic liver diseases. The prediction of HCC and other prognostic risk and/or outcome of treatment aiming at reducing the risk will provide critical information to subjects and treating physicians, both at the time of selection of the caring/treatment strategy and after the application of therapy. For subjects diagnosed with chronic liver diseases, identification of a subset of patients at elevated risk of HCC and other lethal complications is critical for diagnosis of these life-threatening medical problems at early stage where curative treatment options are still available. This is important especially because of the vast size of the liver disease patient population. For example, one of several causes of chronic liver diseases, non-alcoholic fatty liver disease (NAFLD) affects 60-80 million Americans, which is already far beyond the capability of existing health care facilities across the nation. Indeed, only <25% of HCC patients are diagnosed at early stages, and consequently, HCC prognosis is extremely poor (5-year survival rate <15%) compared to other cancer types such as colon (5-year survival rate 58%), breast (5-year survival rate 86%), and prostate (5-year survival rate 88%) cancers. Thus, identification at-risk patients will significantly improve efficiency of diagnosing early-stage disease followed by curative treatment. In addition, the high-risk patients can be subjected to therapies to reduce the risk level to prevent future development of HCC and other lethal complications such as hepatic decompensation. Unfortunately, predictive algorithms for risk of disease progression based on typical clinical risk factors, such as age, sex, and degree of liver dysfunction, have suboptimal performance when used in the clinic. As such, there is a need in the art for improved methods that accurately determine the risk of liver disease progression toward HCC and the potential for lethal complications.

SUMMARY OF THE INVENTION

The present disclosure is based, in part, on the novel finding that determining the abundance of proteins in a biological sample obtained from a subject can be used to generate a PLSec score for use in prediction of cancer risk, detection, and treatment of liver cancer (e.g., HCC) in a subject. Accordingly, provided herein are methods and kits for measuring protein abundance of a panel of circulating proteins, determining a PLSec score, and treating high- and low-risk liver cancer subjects according to their PLSec score.

Aspects of the present disclosure provide for methods of predicting risk for developing HCC in a subject. In some embodiments, methods of predicting risk for developing HCC in a subject may comprise determining a PLSec score for the subject, wherein the subject may have or be suspected of having a disease, a condition, or a combination thereof that predisposes the subject to HCC.

In some embodiments, methods of predicting risk for developing HCC in a subject may further comprise a method of obtaining the PLSec score for the subject, wherein the method of obtaining the PLSec score can include any of the following steps: (a) obtaining a sample of blood from the subject; (b) subjecting the sample to a multi-analyte profiling assay for protein quantification of vascular cell adhesion molecule 1 (VCAM-1), insulin-like growth factor-binding protein 7 (IGFBP-7), gp130, matrilysin, interleukin-6 (IL-6), C-C motif chemokine ligand 21 (CCL-21), angiogenin, and protein S; (c) normalizing the protein quantification measurements of VCAM-1, IGFBP-7, gp130, matrilysin, IL-6, CCL-21, angiogenin, and protein S to median fluorescent intensity; and/or, (d) converting the normalized protein quantification measurements of VCAM-1, IGFBP-7, gp130, matrilysin, IL-6, CCL-21, angiogenin, and protein S into an aggregated score, wherein the aggregated score is the PLSec score. In some embodiments, a subject disclosed herein may be predicted to be at low risk for developing HCC if the PLSec score is below 4. In some aspects, a subject disclosed herein may be predicted to be at high risk for developing HCC if the PLSec score is 4 or higher.

In some embodiments, a disease, condition, and/or combination thereof that may predispose a subject disclosed herein to HCC can be cirrhosis, chronic infection of hepatitis B virus (HBV), chronic infection of hepatitis C virus (HCV), non-alcoholic fatty liver disease (NAFLD), non-alcoholic steatohepatitis (NASH), primary biliary cirrhosis (PBC), hereditary hemochromatosis, type 2 diabetes, obesity, tobacco use, alcohol abuse, long-term anabolic steroid use, tyrosinemia, alpha1-antitrypsin deficiency, porphyria cutanea tarda, glycogen storage diseases, Wilson disease, or any combination thereof.

In certain embodiments, methods disclosed herein may be used to diagnose HCC in a subject. In some embodiments, methods disclosed herein can be used to determine a PLSec score for use in diagnosing HCC in a subject. In some embodiments, methods disclosed herein can be used to determine a PLSec score for a subject, wherein a subject having a PLSec score of 4 or higher is diagnosed as having HCC. In some embodiments, methods disclosed herein can further include diagnosing HCC by performing a liver biopsy, one or more blood tests to assess liver function, computed tomography, magnetic resonance imaging, or any combination thereof. In some embodiments, one or more blood tests performed to assess liver function may comprise measuring alanine transaminase (ALT), aspartate transaminase (AST), alkaline phosphatase (ALP), albumin, bilirubin, gamma-glutamyltransferase (GGT), L-lactate dehydrogenase (LD), prothrombin time (PT), or any combination thereof.

In some embodiments, methods disclosed herein may further include administering one or more treatments of HCC to the subject wherein the subject has a PLSec score is 4 or higher. In some aspects, one or more treatments of HCC to be administered may be surgical removal of one or more liver tumors, liver transplant, radiation therapy, drug therapy, immunotherapy, chemotherapy, or any combination thereof. In some aspects, a drug therapy for use herein may be administration of one or more drugs to the subject, wherein the drugs can be sorafenib, regorafenib, nivolumab, erlotinib, lenvatinib, cabozantinib, ramucirumab, pembrolizumab, durvalumab, tremelimumab, atezolizumab, bevacizumab, or any combination thereof.

Other aspects of the present disclosure provide methods of determining a PLSec score for a subject. In some embodiments, methods of determining a PLSec score for a subject may include any of the following steps: (a) obtaining a sample of blood from the subject; (b) subjecting the sample to a multi-analyte profiling assay for protein quantification of vascular cell adhesion molecule 1 (VCAM-1), insulin-like growth factor-binding protein 7 (IGFBP-7), gp130, matrilysin, interleukin-6 (IL-6), C-C motif chemokine ligand 21 (CCL-21), angiogenin, and protein S; (c) normalizing protein quantification measurements of VCAM-1, IGFBP-7, gp130, matrilysin, IL-6, CCL-21, angiogenin, and protein S to median fluorescent intensity; and/or, (d) converting the normalized protein quantification measurements of VCAM-1, IGFBP-7, gp130, matrilysin, IL-6, CCL-21, angiogenin, and protein S into an aggregated score, wherein the aggregated score is the PLSec score.

In some embodiments, a subject of any of the methods disclosed herein may be having or may be suspected of having a disease, a condition, or a combination thereof that predisposes the subject to HCC. In some aspects, a disease, a condition, or a combination thereof that predisposes the subject to HCC may be cirrhosis, chronic infection of hepatitis B virus (HBV), chronic infection of hepatitis C virus (HCV), non-alcoholic fatty liver disease (NAFLD), non-alcoholic steatohepatitis (NASH), primary biliary cirrhosis (PBC), hereditary hemochromatosis, type 2 diabetes, obesity, tobacco use, alcohol abuse, long-term anabolic steroid use, tyrosinemia, alpha1-antitrypsin deficiency, porphyria cutanea tarda, glycogen storage diseases, Wilson disease, or any combination thereof. In some embodiments, a subject having a PLSec score below 4 is at low risk for developing HCC. In some embodiments, a subject having a PLSec score of 4 or above is at high risk for developing HCC.

Still other aspects of the present disclosure provide diagnostic kits for determining a PLSec score of a subject. In some embodiments, kits disclosed herein may contain one or more reagents for use in a multi-analyte profiling assay. In some embodiments, kits disclosed herein may contain one or more reagents for use in a multi-analyte profiling assay such as beads labeled with antibodies to vascular cell adhesion molecule 1 (VCAM-1), insulin-like growth factor-binding protein 7 (IGFBP-7), gp130, matrilysin, interleukin-6 (IL-6), C-C motif chemokine ligand 21 (CCL-21), angiogenin, and/or protein S.

Other aspects of the present disclosure provide methods of treating HCC in a subject at high risk for developing HCC. In some embodiments, methods herein of treating HCC in a subject at high risk for developing HCC can include any of the following steps: (a) determining if the subject is at high risk for developing HCC by (i) obtaining a sample of blood from the subject; (ii) determining the protein levels of at least two liver disease biomarkers wherein, one of the at least two liver disease biomarkers is selected from vascular cell adhesion molecule 1 (VCAM-1), insulin-like growth factor-binding protein 7 (IGFBP-7), gp130, matrilysin, interleukin-6 (IL-6), and C-C motif chemokine ligand 21 (CCL-21); and the other one of the at least two liver disease biomarkers is selected from angiogenin and protein S; (iii) determining that the subject is at high risk for developing HCC if the one of the at least two liver disease biomarkers selected from VCAM-1, IGFBP-7, gp130, matrilysin, IL-6, and CCL-21 has a higher protein expression compared to a control, and the other one of the at least two liver disease biomarkers selected from angiogenin and protein S has a higher protein expression compared to a control, wherein the control is a sample of blood from a subject known to not have any liver disease; and/or (b) administering one or more treatments of HCC to the subject determined to be at high risk for developing HCC.

In some embodiments, protein levels of VCAM-1, IGFBP-7, gp130, matrilysin, IL-6, CCL-21, angiogenin and protein S may be determined according to the methods disclosed herein, wherein the subject is at high risk for developing HCC if any one of VCAM-1, IGFBP-7, gp130, matrilysin, IL-6, or CCL-21 has a higher protein expression compared to a control and any one of angiogenin or protein S has a higher protein expression compared to a control. In some embodiments, the protein levels of VCAM-1, IGFBP-7, gp130, matrilysin, IL-6, CCL-21, angiogenin and protein S may be determined according to the methods disclosed herein, wherein the subject is at high risk for developing HCC if VCAM-1, IGFBP-7, gp130, matrilysin, IL-6, and CCL-21 have a higher protein expression compared to a control and angiogenin and protein S have a higher protein expression compared to a control.

In some embodiments, the level of at least two liver disease biomarkers according to the methods disclosed herein may be determined by one or more of the following: Western blotting, enzyme-linked immunosorbent assay (ELISA), multi-analyte profiling assay, mass spectrometry, HPLC, flow cytometry, fluorescence-activated cell sorting (FACS), liquid chromatography-mass spectrometry (LC/MS), immunoelectrophoresis, translation complex profile sequencing (TCP-seq), protein microarray, protein chip, capture arrays, reverse phase protein microarray (RPPA), two-dimensional gel electrophoresis or (2D-PAGE), functional protein microarrays, electrospray ionization (ESI), and matrix-assisted laser desorption/ionization (MALDI). In some aspects, the level of at least two liver disease biomarkers may be determined by ELISA or multi-analyte profiling assay.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following drawings form part of the present specification and are included to further demonstrate certain aspects of the present disclosure, which can be better understood by reference to the drawing in combination with the detailed description of specific embodiments presented herein. Embodiments of the present inventive concept are illustrated by way of example in which like reference numerals indicate similar elements.

FIGS. 1A-1C depict representative schematic diagrams illustrating an exemplary work-flow to derive a serum-protein-based PLSec from validated hepatic transcriptome signatures. FIG. 1A shows a schematic illustrating an exemplary overview of the work-flow to derive a serum-protein-based PLSec. FIG. 1B shows a schematic illustrating an exemplary overview of the work-flow for computational derivation of secretome biomarker candidates. FIG. 1C shows a schematic illustrating an exemplary overview of work-flow for assessment of organ specificity and ambiguity.

FIG. 3A shows correlations of abundance across the 27 proteins associated with tissue PLS/LRS status in the optimization set. Red- and blue-colored protein names indicate high- and low-risk proteins included in the final PLSec assay, respectively. FIG. 3B shows the number of selections for each protein as non-redundant prognostic feature over the 1,000 iterative feature selections by LASSO. FIG. 3C shows a pattern of the PLSec protein abundance and associated clinical variables in the optimization set (79 patients with chronic hepatitis or cirrhosis who had curative HCC resection). FIG. 3D shows within-plate reproducibility of PLSec between technical replicates. FIG. 3E shows inter-plate/batch reproducibility of PLSec between technical replicates. FIG. 3F shows a prognostic association of PLSec assessed by log-rank test according to PLSec cut-off value in the optimization set. FIG. 3G shows capability to predict tissue-transcriptome-signature-based risk classification of the 43-protein panel, the 27-protein panel, and the final 8-protein PLSec. FIG. 3H shows association of PLSec-based prognostic prediction with overall survival after curative surgical tumor resection. FIG. 3I shows association of PLSec-based prognostic prediction with late HCC recurrence after curative surgical tumor resection. FIG. 3J shows induction of the 466 PLS/LRS-associated pathways in single-cell genome-wide transcriptome profiles of human cirrhotic livers. As depicted, COL1A1 represents collagen type I alpha 1 chain; VCAM-1 represents vascular cell adhesion molecule 1; ICAM-1 represents intercellular adhesion molecule 1; CCL-19 represents C-C motif chemokine 19; CXCL-6 represents C-X-C motif chemokine 6; IL-6 represents interleukin-6; GPNMB represents transmembrane glycoprotein NMB; COL4A1 represents collagen alpha-1(IV) chain; FSTL1 represents follistatin-related protein 1; HGF represents hepatocyte growth factor; uPAR represents urokinase plasminogen activator surface receptor; TIMP-1 represents metalloproteinase inhibitor 1; CCL-21 represents C-C motif chemokine 21; IGFBP-7 represents insulin-like growth factor-binding protein 7; IGFBP-6 represents insulin-like growth factor-binding protein 6; PECAM-1 represents platelet endothelial cell adhesion molecule; IL-5 represents interleukin 5; NGF represents beta-nerve growth factor; PLSec represents prognostic liver secretome signature; AFP represents alpha-fetoprotein; HCV represents hepatitis C virus; HBV represents hepatitis B virus; MFI represents median fluorescent intensity; AUC represents area under receiver operating characteristic curve; HR represents hazard ratio; CI represents confidence interval; HCC represents hepatocellular carcinoma; HSC represents hepatic stellate cell; VSMC represents vascular smooth muscle cell; and GSEI represents gene signature enrichment index. FIG. 3K shows the sensitivity of Luminex assay where vertical bars indicate 95% confidence interval from 10 batches at each dilution. FIG. 3L shows the prognostic association of PLSec with late HCC recurrence assessed by log-rank test according to PLSec cut-off values in the optimization set.

FIGS. 5A-5F depict representative images and graphs illustrating clinical utility of validation set 1—cirrhosis with mixed HCC etiologies (prospective-retrospective cohort). FIG. 5A shows a schematic of the exemplary study design. FIG. 5B shows a pattern of the PLSec protein abundance and associated clinical variables. FIG. 5C shows time-dependent AUC of PLSec-AFP score, PLSec alone, and AFP alone. FIG. 5D shows an association of PLSec-AFP with incident HCC. FIG. 5E shows a calibration plot of PLSec-AFP at various time points. The gray dashed line indicates ideal calibration. FIG. 5F shows an association of PLSec-AFP with incident HCC in various subgroups. Horizontal bars indicate 95% CI. As depicted, AFP represents α-fetoprotein; ARLD represents alcohol-related liver disease; AUC represents area under the receiver operating characteristic curve; CI represents confidence interval; HBV represents hepatitis B virus; HCC represents hepatocellular carcinoma; HCV represents hepatitis C virus; HR represents hazard ratio; IQR represents interquartile range; NAFLD represents non-alcoholic fatty liver disease; and PLSec represents prognostic liver secretome signature.

FIG. 6A shows an association of PLSec with incident HCC in validate set 1. FIG. 6B shows associations of AFP with time to HCC development in individual patients in validation set 1. Closed and open circles indicate HCC development and censored observation, respectively. Gray horizontal lines indicate duration of clinical follow-up. Red and blue squares indicate proportion of incident HCC every 2 years in patients with high 5 ng/mL) and low (<5 ng/mL) AFP at enrollment, respectively. Proportion of HCC incidence was consistent over time in both AFP-high and low groups and not associated with AFP levels (p=0.76 and 0.46 by Pearson correlation test, respectively). FIG. 6C shows a log-transformed hazard ratio of incident HCC related to PLSec in validation set 1. Gray shadows indicate 95% confidence interval. FIG. 6D shows a log-transformed hazard ratio of incident HCC related to AFP in validation set 1. Gray shadows indicate 95% confidence interval. FIG. 6E shows that sensitivity and specificity of high-risk PLSec-AFP were stable over time in validation set 2. FIG. 6F shows association of high AFP with HCC recurrence. High AFP was defined as 5.5 ng/mL, a cut-off frequently used in the context of post-SVR HCC risk prediction in validation set 3. FIG. 6G shows a calibration plot of high AFP at various time points in validation set 3. FIG. 6H shows an association of high-risk PLSec-AFP with HCC recurrence according to time between HCC treatment and DAA initiation in validation set 3. As depicted, PLSec represents prognostic liver secretome signature; AFP represents alpha-fetoprotein; HCC represents hepatocellular carcinoma; HR represents hazard ratio; CI represents confidence interval; and DAA represents direct-acting antivirals.

FIG. 7A shows a schematic of the exemplary study design. FIG. 7B shows a pattern of the PLSec protein abundance and associated clinical variables. FIG. 7C shows an adjusted AUC of PLSec-AFP score (1.66) and AFP (5.5 ng/mL) over time. Vertical bars indicate 95% CI. FIG. 7D shows pre- and post-test annual HCC incidence rate estimated based on the performance of PLSec-AFP in validation set 2. Widths of light green and yellow boxes indicate the ranges of reported annual HCC incidence in all HCV-cured cirrhosis patients and their subset with high FIB-4 index, respectively. FIG. 7E shows the change in PLSec over the course of DAA-based anti-HCV treatment and post-treatment follow-up. Trend of change in PLSec over time was tested by the Jonckheere-Terpstra test (p=0.43 for the cases; p<0.001 for the controls). PLSec values at week 48 were lower in the controls compared to the cases (Wilcoxon rank-sum test, p=0.013). As depicted, AFP represents α-fetoprotein; AUC represents area under receiver operating characteristic curve; CI represents confidence interval; DAA represents direct-acting antivirals; HCC represents hepatocellular carcinoma; HCV represents hepatitis C virus; IQR represents interquartile range; PLSec represents prognostic liver secretome signature; and SVR represents sustained virologic response.

FIGS. 8A-8E depict representative images and graphs illustrating clinical utility of validation set 3— HCC risk after complete response to HCC therapies and HCV cure by DAA (prospective-retrospective cohort). FIG. 8A shows a schematic of the exemplary study design. FIG. 8B shows a pattern of PLSec protein abundance and associated clinical variables. FIG. 8C shows an association of PLSec-AFP with HCC recurrence. FIG. 8D shows a time-dependent AUC of high-risk PLSec-AFP and high AFP (5.5 ng/mL). FIG. 8E shows the calibration plots of high-risk PLSec-AFP at various time points. The gray dashed line indicates ideal calibration. As depicted, AFP represents α-fetoprotein; AUC represents area under the receiver operating characteristic curve; CI represents confidence interval; DAA represents direct-acting antivirals; HCC represents hepatocellular carcinoma; HR represents hazard ratio; IQR represents interquartile range; and PLSec represents prognostic liver secretome signature.

FIG. 9A shows a pattern of PLSec protein abundance and associated clinical variables. FIG. 9B shows association of PLSec with long-term risk of hepatic decompensation. FIG. 9C shows association of PLSec with incident hepatic decompensation in various subgroups. The size of box is proportional to the number of patients. FIG. 9D shows time-dependent AUROC of the PLAF, PLSec, ALBI-FIB-4, and MELD score. FIG. 9E is a calibration plot of the PLAF score at 5 years. The grey dashed line indicates ideal calibration. FIG. 9F shows association of the PLAF score with long-term risk of hepatic decompensation. AUROC, area under the receiver operating characteristic curve; CI, confidence interval; HCV, hepatitis C virus; HR, hazard ratio; MELD, model for end-stage liver disease.

FIGS. 11A-11E depict validation assays for a 5-panel protein PLSec assay (IL6ST, CCL21, IGFBP7, Angiogenin+ VCAM1). FIGS. 11A-11C show assays from validation set 1 using data from patients having cirrhosis with mixed etiologies. FIGS. 11D-11E show assays from validation set 3 using data from patients having curative HCC resection and subsequent SVR with DAA.

Figure 1B:
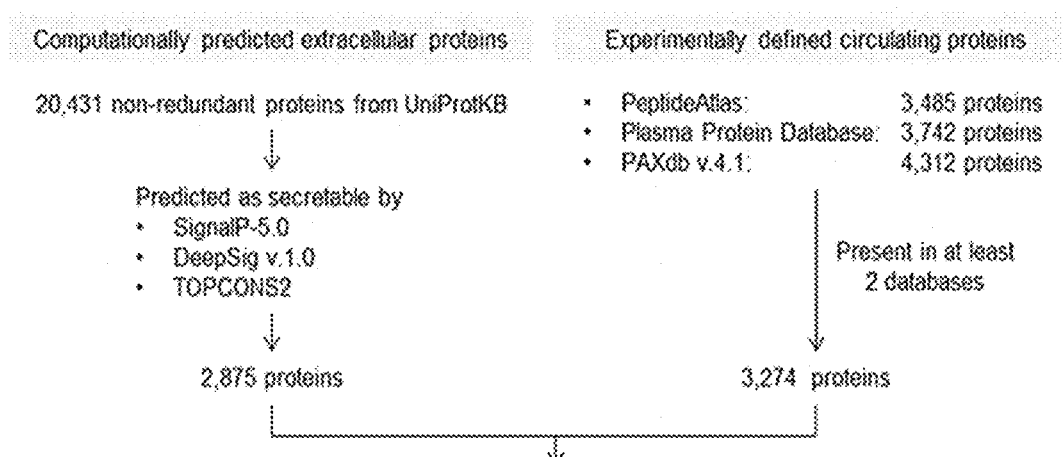

The drawing figures do not limit the present inventive concept to the specific embodiments disclosed and described herein. The drawings are not necessarily to scale, emphasis instead being placed on clearly illustrating principles of certain embodiments of the present inventive concept.

DETAILED DESCRIPTION

The following detailed description references the accompanying drawings that illustrate various embodiments of the present inventive concept. The drawings and description are intended to describe aspects and embodiments of the present inventive concept in sufficient detail to enable those skilled in the art to practice the present inventive concept. Other components can be utilized and changes can be made without departing from the scope of the present inventive concept. The following description is, therefore, not to be taken in a limiting sense. The scope of the present inventive concept is defined only by the appended claims, along with the full scope of equivalents to which such claims are entitled.

The present disclosure is based, in part, on the novel finding that determining the abundance of proteins in a biological sample obtained from a subject can be used to generate a PLSec score for use in prediction of cancer risk, detection, and treatment of liver cancer (e.g., HCC) in the subject. Accordingly, provided herein are methods for measuring protein abundance of a panel of circulating proteins, determining a PLSec score, and treating high- and low-risk liver cancer subjects according to their PLSec score. Kits used in practicing the methods disclosed herein are also provided in the present disclosure.

I. Terminology

The phraseology and terminology employed herein are for the purpose of description and should not be regarded as limiting. For example, the use of a singular term, such as, "a" is not intended as limiting of the number of items. Also, the use of relational terms such as, but not limited to, "top," "bottom," "left," "right," "upper," "lower," "down," "up," and "side," are used in the description for clarity in specific reference to the figures and are not intended to limit the scope of the present inventive concept or the appended claims.

Further, as the present inventive concept is susceptible to embodiments of many different forms, it is intended that the present disclosure be considered as an example of the principles of the present inventive concept and not intended to limit the present inventive concept to the specific embodiments shown and described. Any one of the features of the present inventive concept may be used separately or in combination with any other feature. References to the terms "embodiment," "embodiments," and/or the like in the description mean that the feature and/or features being referred to are included in, at least, one aspect of the description. Separate references to the terms "embodiment," "embodiments," and/or the like in the description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the present inventive concept may include a variety of combinations and/or integrations of the embodiments described herein. Additionally, all aspects of the present disclosure, as described herein, are not essential for its practice. Likewise, other systems, methods, features, and advantages of the present inventive concept will be, or become, apparent to one with skill in the art upon examination of the figures and the description. It is intended that all such additional systems, methods, features, and advantages be included within this description, be within the scope of the present inventive concept, and be encompassed by the claims.

As used herein, the term "about," can mean relative to the recited value, e.g., amount, dose, temperature, time, percentage, etc., ±10%, ±9%, ±8%, ±7%, ±6%, ±5%, ±4%, ±3%, ±2%, or ±1%.

The terms "comprising," "including," "encompassing" and "having" are used interchangeably in this disclosure. The terms "comprising," "including," "encompassing" and "having" mean to include, but not necessarily be limited to the things so described.

The terms "or" and "and/or," as used herein, are to be interpreted as inclusive or meaning any one or any combination. Therefore, "A, B or C" or "A, B and/or C" mean any of the following: "A," "B" or "C"; "A and B"; "A and C"; "B and C"; "A, B and C." An exception to this definition will occur only when a combination of elements, functions, steps or acts are in some way inherently mutually exclusive.

"Biomarker" as used herein refers to any biological molecules (e.g., nucleic acids, genes, peptides, proteins, lipids, hormones, metabolites, and the like) that, singularly or collectively, reflect the current or predict future state of a biological system. Thus, as used herein, the presence or concentration of one or more biomarkers can be detected and correlated with a known condition, such as a disease state. In some aspects, detecting the presence and/or concentration of one or more biomarkers herein may be an indication of a liver cancer risk in a subject. In some other aspects, detecting the presence and/or concentration of one or more biomarkers herein may be used in treating and/or preventing a liver cancer in a subject.

As used herein, the terms "treat", "treating", "treatment" and the like, unless otherwise indicated, can refer to reversing, alleviating, inhibiting the process of, or preventing the disease, disorder or condition to which such term applies, or one or more symptoms of such disease, disorder or condition and includes the administration of any of the compositions, pharmaceutical compositions, or dosage forms described herein, to prevent the onset of the symptoms or the complications, or alleviating the symptoms or the complications, or eliminating the condition, or disorder.

The term "biomolecule" as used herein refers to, but is not limited to, proteins, enzymes, antibodies, DNA, siRNA, and small molecules. "Small molecules" as used herein can refer to chemicals, compounds, drugs, and the like.

The term "nucleic acid" or "polynucleotide" refers to deoxyribonucleic acids (DNA) or ribonucleic acids (RNA) and polymers thereof in either single- or double-stranded form. Unless specifically limited, the term encompasses nucleic acids containing known analogues of natural nucleotides that have similar binding properties as the reference nucleic acid and are metabolized in a manner similar to naturally occurring nucleotides. Unless otherwise indicated, a particular nucleic acid sequence also implicitly encompasses conservatively modified variants thereof (e.g., degenerate codon substitutions), alleles, orthologs, SNPs, and complementary sequences as well as the sequence explicitly indicated. Specifically, degenerate codon substitutions may be achieved by generating sequences in which the third position of one or more selected (or all) codons is substituted with mixed-base and/or deoxyinosine residues (Batzer et al., Nucleic Acid Res. 19:5081 (1991); Ohtsuka et al., J. Biol. Chem. 260:2605-2608 (1985); and Rossolini et al., Mol. Cell. Probes 8:91-98 (1994)).

The terms "peptide," "polypeptide," and "protein" are used interchangeably, and refer to a compound comprised of amino acid residues covalently linked by peptide bonds. A protein or peptide must contain at least two amino acids, and no limitation is placed on the maximum number of amino acids that can comprise a protein's or peptide's sequence. Polypeptides include any peptide or protein comprising two or more amino acids joined to each other by peptide bonds. As used herein, the term refers to both short chains, which also commonly are referred to in the art as peptides, oligopeptides and oligomers, for example, and to longer chains, which generally are referred to in the art as proteins, of which there are many types. "Polypeptides" include, for example, biologically active fragments, substantially homologous polypeptides, oligopeptides, homodimers, heterodimers, variants of polypeptides, modified polypeptides, derivatives, analogs, fusion proteins, among others. A polypeptide includes a natural peptide, a recombinant peptide, or a combination thereof.

It should also be understood that, unless clearly indicated to the contrary, in any methods claimed herein that include more than one step or act, the order of the steps or acts of the method is not necessarily limited to the order in which the steps or acts of the method are recited.

II. Methods of Determining a Prognostic Liver Secretome Signature (PLSec) Score In general, methods disclosed herein include determining a PLSec score for a subject, wherein the determined PLSec score can be used to predict the risk for developing HCC in the subject, the prognostic outcome for a subject having or suspected of having HCC, and/or providing a suitable treatment regimen to the subject. Standard procedures used to classify a variety of cancers (e.g., tumor staging) do not take into account extenuating factors that have an impact of HCC risk, outcome, and treatment regimens. To account for such extenuating factors, the present disclosure provides novel methods of classifying HCC in a subject having or suspected of having HCC by determining a PLSec score of the subject.

As used herein, a suitable subject includes a mammal, a human, a livestock animal, a companion animal, a lab animal, or a zoological animal. In some embodiments, a subject may be a rodent, e.g., a mouse, a rat, a guinea pig, etc. In other embodiments, a subject may be a livestock animal. Non-limiting examples of suitable livestock animals may include pigs, cows, horses, goats, sheep, llamas and alpacas. In yet other embodiments, a subject may be a companion animal. Non-limiting examples of companion animals may include pets such as dogs, cats, rabbits, and birds. In yet other embodiments, a subject may be a zoological animal. As used herein, a "zoological animal" refers to an animal that may be found in a zoo. Such animals may include non-human primates, large cats, wolves, and bears. In other embodiments, the animal is a laboratory animal. Non-limiting examples of a laboratory animal may include rodents, canines, felines, and non-human primates. In some embodiments, the animal is a rodent. Non-limiting examples of rodents may include mice, rats, guinea pigs, etc. In preferred embodiments, the subject is a human.

In some embodiments, a suitable subject for the methods herein may have or be suspected of having a liver cancer. In some embodiments, a suitable subject for the methods herein may have or be suspected of having a secondary liver cancer. A secondary liver cancer, also known as a liver metastasis, develops when primary cancer from another part of the body spreads to the liver. In some embodiments, a subject to be subjected to the methods herein may have or be suspected of having a primary liver cancer. A primary liver cancer is a cancer that originates in the liver. Non-limiting examples of primary liver cancers include hepatocellular carcinoma (HCC) (also called hepatoma); fibrolamellar HCC; cholangiocarcinoma (e.g., bile duct cancer); angiosarcoma (also called hemangiocarcinoma), and the like. HCC is the most common type of liver cancer, accounting for approximately 75 percent of all liver cancers. HCC starts in the main type of liver cells, called hepatocellular cells. HCC can result from one or more injuries to the liver that may predispose a subject to HCC. Non-limiting examples of one or more injuries to the liver that may predispose a subject to HCC can include cirrhosis, chronic infection of hepatitis B virus (HBV), chronic infection of hepatitis C virus (HCV), non-alcoholic fatty liver disease (NAFLD), non-alcoholic steatohepatitis (NASH), primary biliary cirrhosis (PBC), hereditary hemochromatosis, type 2 diabetes, obesity, tobacco use, alcohol abuse, long-term anabolic steroid use, tyrosinemia, alpha1-antitrypsin deficiency, porphyria cutanea tarda, glycogen storage diseases, Wilson disease, or any combination thereof. In some embodiments, a suitable subject for the methods herein may have or be suspected of having one or more injuries to the liver that may predispose a subject to HCC.

In some embodiments, a suitable subject for the methods herein may present with at least one clinical symptom associated with liver cancer (e.g., HCC). Non-limiting examples of clinical symptoms associated with liver cancer (e.g., HCC) may include mild to moderate upper abdominal pain, weight loss, early satiety, or a palpable mass in the upper abdomen, paraneoplastic syndrome, hypoglycemia, erythrocytosis, hypercalcemia, intractable diarrhea and associated electrolyte disturbances (e.g., hyponatremia, hypokalemia, metabolic alkalosis), cutaneous manifestations (e.g., dermatomyositis, pemphigus foliaceus, seborrheic keratosis, pityriasis rotunda), intraperitoneal bleeding, jaundice, fever, pyogenic liver abscess, and the like. In some embodiments, a suitable subject for the methods herein may have one or more serum markers indicative of liver cancer (e.g., HCC). Non-limiting examples of serum markers indicative of liver cancer (e.g., HCC) may include alpha-fetoprotein (AFP) (e.g., an AFP level of 20 ng/mL or higher), des-gamma-carboxy prothrombin, lens culinaris agglutinin-reactive AFP (AFP-L3), and the like.

In some embodiments, a PLSec score may be determined as disclosed herein from at least one sample collected from a subject. In some aspects, at least one sample can be obtained from a subject who has not been diagnosed with a liver cancer. In some aspects, at least one sample can be obtained from a subject who has not been diagnosed with a liver cancer but is suspected of having a liver cancer. In some other aspects, at least one sample can be obtained from a subject who has been diagnosed with a liver cancer. In some aspects, at least one sample can be obtained from a subject who may have or be suspected of having one or more injuries to the liver that may predispose a subject to HCC.

In some embodiments, a PLSec score may be determined by obtaining a gene expression profile from a sample collected from a subject. As used herein, the term "gene expression profile" refers to a pattern of genes expressed in a sample at the transcription level. Non-limiting examples of methods of measuring gene expression in a sample suitable for use herein include high-density expression array, DNA microarray, polymerase chain reaction (PCR), reverse transcriptase PCR (RT-PCR), real-time quantitative reverse transcription PCR (qRT-PCR), digital droplet PCR (ddPCR), serial analysis of gene expression (SAGE), Spotted cDNA arrays, GeneChip, spotted oligo arrays, bead arrays, RNA Seq, tiling array, northern blotting, hybridization microarray, in situ hybridization, or any combination thereof. In some aspects, a gene expression profile as disclosed herein can be obtained by any known or future method suitable to assess gene expression.

In some embodiments, a PLSec score may be determined by obtaining a protein expression profile from a sample collected from a subject. As used herein, the term "protein expression profile" refers to a pattern of proteins expressed in a sample collected from the subject. Non-limiting examples of methods of measuring protein expression in a sample suitable for use herein include Western blotting, enzyme-linked immunosorbent assay (ELISA), multi-analyte profiling (xMAP), mass spectrometry, HPLC, flow cytometry, fluorescence-activated cell sorting (FACS), liquid chromatography-mass spectrometry (LC/MS), immunoelectrophoresis, translation complex profile sequencing (TCP-seq), protein microarray, protein chip, capture arrays, reverse phase protein microarray (RPPA), two-dimensional gel electrophoresis or (2D-PAGE), functional protein microarrays, electrospray ionization (ESI), matrix-assisted laser desorption/ionization (MALDI), or a combination thereof. In some aspects, a protein expression profile as disclosed herein can be obtained by any known or future method suitable to assess protein expression.

In some embodiments, a sample obtained from a subject for determination of a PLSec score as disclosed in the methods herein may be a tissue sample, a blood sample, a plasma sample, a hair sample, venous tissues, cartilage, a sperm sample, a skin sample, an amniotic fluid sample, a buccal sample, saliva, urine, serum, sputum, bone marrow or a combination thereof. In some aspects, a sample obtained from a subject for determination of a PLSec score as disclosed herein may be a tumor sample. Non-limiting methods suitable for use herein to collect tumor samples include collection by fine needle aspirate, by removal of pleural or peritoneal fluid, and by excisional biopsy. In some aspects, a tumor sample can include a biopsy from a single tumor, a biopsy from at least one tissue in contact with the tumor, and any combination thereof. In some aspects, a biopsy sample of the tumor and/or at least one tissue in contact with the tumor can be from about 10 mg about 50 mg (e.g., about 10 mg, 15 mg, 20 mg, 25 mg, 30 mg, 35 mg, 40 mg, 45 mg, 50 mg) of tissue per sample.

In some embodiments, a sample obtained from a subject for determination of a PLSec score as disclosed herein may be a blood and/or plasma sample. In some aspects, tumor sample for use in the methods herein can be tumor proteins isolated from a blood sample collected from any of the subjects disclosed herein. In some aspects, a sample obtained from a subject for determination of a PLSec score as disclosed herein may be serum.

In some aspects, a sample obtained from for determination of a PLSec score as disclosed herein may be stored at about 25° C. to about −80° C. for up to about 1 day to about 2 years, about 1 week to about 1 year, or about 1 month to about 6 months. In other aspects, a sample obtained from a subject may be immediately processed to obtain a protein expression profile as disclosed herein. In some other aspects, a sample obtained from a subject may be processed to obtain a protein expression profile as disclosed herein. Non-limiting examples of sample preparation methods can be found in art, for example in Gallagher & Wiley, (2012). CURRENT PROTOCOLS ESSENTIAL LABORATORY TECHNIQUES. Hoboken, N.J: Wiley-Blackwell, the disclosures of which are incorporated herein.

(a) Prognostic Liver Secretome Signature (PLSec)

In some embodiments, a sample obtained from a subject for determination of a PLSec score as disclosed herein consists of a secretome. As used herein, a "secretome" refers to a panel of proteins expressed by an organism and secreted into the extracellular space. In some embodiments a PLSec score as disclosed herein can be determined from a secretome expressed by the liver and secreted into the extracellular space. In some embodiments, a PLSec score as disclosed herein can be determined from a secretome expressed by the liver wherein the secretome is comprised of a panel of proteins associated with the risk of developing a liver cancer. In some aspects, a computational biology approach may be applied to identify a secretome associated with the risk of developing a liver cancer (e.g., HCC). For example, ranked prioritized circulating proteins can be tested for their association with HCC against a plurality of matched control gene set. Covariates can be adjusted to identify a set of circulating proteins enriched for HCC (e.g., p<0.001). One or more regression models may be applied to the enriched circulating proteins set to further select for proteins that are relevant to liver cancer (e.g., HCC) risk. In some embodiments, an enriched group of circulating proteins for assessing liver cancer (e.g., HCC) risk may be a panel of proteins that make up a secretome as disclosed herein. In some embodiments, computational approaches exemplified herein can identify panel of proteins for prognostic prediction of liver cancer (e.g., HCC) risk. As used herein, a "panel of proteins" refers to one or more proteins that are predictive of the risk for developing a pathological condition and/or having a pathological condition. In some embodiments, computational approaches exemplified herein can identify a panel of circulating proteins for prognostic prediction of liver cancer risk, wherein the panel of circulating proteins can be referred to as a serum-protein-based PLSec.

In some embodiments, a PLSec for liver cancer (e.g., HCC) risk assessment may comprise a combination of one or more circulating proteins of alpha-1 type I collagen, vascular cell adhesion molecule 1 (VCAM-1), intercellular adhesion molecule 1 (ICAM-1), chemokine (C-C motif) ligand 19 (CCL-19), chemokine (C-X-C motif) ligand 6 (CXCL-6), interleukin-6 (IL-6), transmembrane glycoprotein NMB, collagen alpha-1(IV) chain (COL4A1), follistatin-related protein 1 (FSTL-1), lumican (LUM), hepatocyte growth factor (HGF; also known as scatter factor (SF)), glycoprotein 130 (gp130, also known as IL6-beta or CD130), urokinase plasminogen activator surface receptor (uPAR), TIMP metallopeptidase inhibitor 1 (TIMP1), matrilysin (also known to those skilled in the art as matrix metalloproteinase-7 (MMP-7), pump-1 protease (PUMP-1), and uterine metalloproteinase), C-C motif chemokine ligand 21 (CCL-21), midkine, insulin-like growth factor-binding protein 7 (IGFBP-7), Fas ligand (FasL or CD95L or CD178), insulin-like growth factor-binding protein 6 (IGFBP-6), cathepsin-S, platelet endothelial cell adhesion molecule (PE-CAM-1; also known as cluster of differentiation 31 (CD31)), osteopontin, interleukin 5 (IL-5), nerve growth factor (NGF), angiogenin (ANG), protein S, or any combination thereof. In some embodiments, a PLSec for liver cancer (e.g., HCC) risk assessment may comprise a combination of one or more circulating proteins encoded by the genes of COL1A1, VCAM1, ICAM1, CCL19, CXCL6, IL6, GPNMB, COL4A1, FSTL1, LUM, HGF, IL6ST, PLAUR, TIMP1, MMP7, CCL21, MDK, IGFBP7, FASLG, IGFBP6, CTSS, PECAM1, SSP1, IL5, NGF, ANG, PROS1, or any combination thereof. In some embodiments, a PLSec for liver cancer (e.g., HCC) risk assessment may comprise a combination of one or more circulating proteins encoded by the genes of VCAM1, IL6, IL6ST, MMP7, CCL21, IGFBP7, ANG, PROS1, or any combination thereof.

In some embodiments, a PLSec for liver cancer (e.g., HCC) risk assessment may comprise a combination of one or more circulating proteins of VCAM-1, IGFBP-7, gp130, matrilysin (MMP-7), IL-6, CCL-21, protein S, angiogenin, or any combination thereof. In some embodiments, a PLSec for liver cancer (e.g., HCC) risk assessment may comprise a combination of two or more circulating proteins of VCAM-1, IGFBP-7, gp130, matrilysin, IL-6, CCL-21, protein S, angiogenin, or any combination thereof. In some embodiments, a PLSec for liver cancer (e.g., HCC) risk assessment may comprise a combination of three or more circulating proteins of VCAM-1, IGFBP-7, gp130, matrilysin, IL-6, CCL-21, protein S, angiogenin, or any combination thereof. In some embodiments, a PLSec for liver cancer (e.g., HCC) risk assessment may comprise a combination of four or more circulating proteins of VCAM-1, IGFBP-7, gp130, matrilysin, IL-6, CCL-21, protein S, angiogenin, or any combination thereof. In some embodiments, a PLSec for liver cancer (e.g., HCC) risk assessment may comprise a combination of five or more circulating proteins of VCAM-1, IGFBP-7, gp130, matrilysin, IL-6, CCL-21, protein S, angiogenin, or any combination thereof. In some embodiments, a PLSec for liver cancer (e.g., HCC) risk assessment may comprise a combination of six or more circulating proteins of VCAM-1, IGFBP-7, gp130, matrilysin, IL-6, CCL-21, protein S, angiogenin, or any combination thereof. In some embodiments, a PLSec for liver cancer (e.g., HCC)

risk assessment may comprise a combination of seven or more circulating proteins of VCAM-1, IGFBP-7, gp130, matrilysin, IL-6, CCL-21, protein S, angiogenin, or any combination thereof. In some embodiments, a PLSec for liver cancer (e.g., HCC) risk assessment may comprise a combination of the circulating proteins VCAM-1, IGFBP-7, gp130, matrilysin, IL-6, CCL-21, protein S, angiogenin.

In some embodiments, a PLSec for liver cancer (e.g., HCC) risk assessment may comprise a combination of one or more circulating proteins wherein at least one of the proteins is a high-risk-associated protein. In some embodiments, a PLSec for liver cancer (e.g., HCC) risk assessment may comprise a combination of one or more high-risk-associated circulating proteins of VCAM-1, IGFBP-7, gp130, matrilysin, IL-6, CCL-21, or any combination thereof. In some embodiments, a PLSec for liver cancer (e.g., HCC) risk assessment may comprise a combination of one or more circulating proteins wherein at least one of the proteins is a low-risk-associated protein. In some embodiments, a PLSec for liver cancer (e.g., HCC) risk assessment may comprise a combination of one or more low-risk-associated circulating proteins of protein S, angiogenin, or any combination thereof. In some embodiments, a PLSec for liver cancer (e.g., HCC) risk assessment may comprise a combination of one or more high-risk-associated circulating proteins and one or more low-risk-associated circulating proteins. In some embodiments, a PLSec for liver cancer (e.g., HCC) risk assessment may comprise a combination of one or more high-risk-associated circulating proteins of VCAM-1, IGFBP-7, gp130, matrilysin, IL-6, CCL-21, or any combination thereof and one or more low-risk-associated circulating proteins of protein S, angiogenin, or any combination thereof.

(b) PLSec Assays and PLSec Score

In some embodiments, a PLSec as disclosed herein may be used to determine a PLSec score. In some embodiments, a PLSec score can be determined from a sample collected from a subject as described herein. In some embodiments, a PLSec score can be determined from the results of a PLSec assay.

In some embodiments, a sample collected from a subject as disclosed herein can be processed and used in a PLSec assay. As used herein, a "PLSec assay" refers to subjecting a sample to any method suitable for determining the level of gene expression and/or protein abundance of any one of the genes/proteins comprising a PLSec for liver cancer (e.g., HCC) risk assessment as disclosed herein. In some embodiments, a PLSec assay may be a method of measuring gene expression of one or more genes within a PLSec for liver cancer risk assessment. In some embodiments, a PLSec assay may be a method of measuring gene expression of one or more of COL1A1, VCAM1, ICAM1, CCL19, CXCL6, IL6, GPNMB, COL4A1, FSTL1, LUM, HGF, IL6ST, PLAUR, TIMP1, MMP7, CCL21, MDK, IGFBP7, FASLG, IGFBP6, CTSS, PECAM1, SSP1, IL5, NGF, ANG, PROS1, or any combination thereof within a PLSec for liver cancer risk assessment. In some embodiments, a PLSec assay may be a method of measuring gene expression of one or more of VCAM1, IL6, IL6ST, MMP7, CCL21, IGFBP7, ANG, PROS1, or any combination thereof within a PLSec for liver cancer risk assessment.

In some embodiments, a PLSec assay may be a method of measuring protein abundance of one or more proteins within a PLSec for liver cancer risk assessment. In some embodiments, a PLSec assay may be a method of measuring protein abundance of one or more of alpha-1 type I collagen, VCAM-1, ICAM-1, CCL-19, CXCL-6, IL-6, transmembrane glycoprotein NMB, collagen alpha-1(IV) chain, FSTL-1, lumican, hepatocyte growth factor, gp130, urokinase plasminogen activator surface receptor, TIMP metallopeptidase inhibitor 1, matrilysin, CCL-21, midkine, IGFBP-7, FasL, IGFBP-6, cathepsin-S, PECAM-1, osteopontin, IL-5, nerve growth factor angiogenin, protein S, or any combination thereof within a PLSec for liver cancer risk assessment. In some embodiments, a PLSec assay may be a method of measuring protein abundance of one or more of VCAM-1, IGFBP-7, gp130, matrilysin, IL-6, CCL-21, protein S, angiogenin, or any combination thereof within a PLSec for liver cancer risk assessment. In some embodiments, a PLSec assay may be a method of measuring protein abundance of two to seven (e.g., 2, 3, 4, 5, 6, 7) or more of VCAM-1, IGFBP-7, gp130, matrilysin, IL-6, CCL-21, protein S, angiogenin, or any combination thereof within a PLSec for liver cancer risk assessment. In some embodiments, a PLSec assay may be a method of measuring protein abundance of a PLSec for liver cancer risk assessment, wherein the PLSec may be a protein panel of VCAM-1, IGFBP-7, gp130, matrilysin, IL-6, CCL-21, protein S, and angiogenin.

In some embodiments, a PLSec assay may entail subjecting a sample from a subject herein to a multi-analyte profiling assay for protein quantification of one or more proteins within a PLSec for liver cancer risk assessment. A multi-analyte profiling assay (xMAP; also known as a multiplex assay) is a type of immunoassay that uses magnetic beads to simultaneously measure multiple analytes in a single experiment. A multiplex assay is a derivative of an ELISA using beads for binding the capture antibody. Non-limiting examples of multi-analyte profiling (xMAP) assays suitable for use herein may include Myriad RBM MAP Luminex xMAP, and/or bead array assays performed on either multi-use flow cytometers (such as the commonly available clinical cytometers from Becton Dickinson, Beckman-Coulter, Dako-Cytomation, or Partec). In some embodiments, a PLSec assay may entail subjecting a sample collected from a subject herein to a FDA-approved multiplex clinical diagnostic technology, xMAP platform (e.g., Luminex).

In some embodiments, a PLSec assay may entail subjecting a sample from a subject herein to a multi-analyte profiling assay for protein quantification of one or more proteins (e.g., 1, 2, 3, 4, 5, 6, 7) within a protein panel of VCAM-1, IGFBP-7, gp130, matrilysin, IL-6, CCL-21, protein S, angiogenin, or any combination thereof. In some embodiments, a PLSec assay may entail subjecting a sample from a subject herein to a multi-analyte profiling assay for protein quantification of VCAM-1, IGFBP-7, gp130, matrilysin, IL-6, CCL-21, protein S, and angiogenin.

In some embodiments, a PLSec assay may entail subjecting a sample from a subject herein to a multi-analyte profiling assay for protein quantification of one or more proteins (e.g., 1, 2, 3, 4, 5, 6, 7) within a protein panel of VCAM-1, IGFBP-7, gp130, matrilysin, IL-6, CCL-21, protein S, angiogenin, or any combination thereof and normalizing the protein quantification measurements. One of skill in the art will appreciate that the method of normalizing the protein quantification measurements will depend upon the specifics of the multi-analyte profiling assay used. In accordance with some of the embodiments herein, a PLSec assay may entail subjecting a sample from a subject herein to a multi-analyte profiling assay for protein quantification of one or more proteins (e.g., 1, 2, 3, 4, 5, 6, 7) within a protein panel of VCAM-1, IGFBP-7, gp130, matrilysin, IL-6, CCL- 21, protein S, angiogenin, or any combination thereof and normalizing the protein quantification measurements to median fluorescent intensity.

In some embodiments, a PLSec assay may entail subjecting a sample from a subject herein to a multi-analyte profiling assay for protein quantification of one or more proteins (e.g., 1, 2, 3, 4, 5, 6, 7) within a protein panel of alpha-1 type I collagen, VCAM-1, ICAM-1, CCL-19, CXCL-6, IL-6, transmembrane glycoprotein NMB, collagen alpha-1(IV) chain, FSTL-1, lumican, hepatocyte growth factor, gp130, urokinase plasminogen activator surface receptor, TIMP metallopeptidase inhibitor 1, matrilysin (MMP7), CCL-21, midkine, IGFBP-7, FasL, IGFBP-6, cathepsin-S, PECAM-1, osteopontin, IL-5, nerve growth factor angiogenin, protein S, or any combination thereof and normalizing the protein quantification measurements. In some embodiments, one or more subsets of the PLSec proteins that yield comparable prognostic performance (e.g., alpha-1 type I collagen, VCAM-1, ICAM-1, CCL-19, CXCL-6, IL-6, transmembrane glycoprotein NMB, collagen alpha-1(IV) chain, FSTL-1, lumican, hepatocyte growth factor, gp130, urokinase plasminogen activator surface receptor, TIMP metallopeptidase inhibitor 1, matrilysin (MMP7), CCL-21, midkine, IGFBP-7, FasL, IGFBP-6, cathepsin-S, PECAM-1, osteopontin, IL-5, nerve growth factor angiogenin, and protein S) may be used in performing a PLSec assay, generating a PLSec score, generating a PLSec-AFP score, and/or generating a PLAF score as disclosed herein. In some aspects, one or more subsets of the PLSec proteins may include about 2, about 3, about 4, about 5, about 6, or about 7 proteins from a group comprising alpha-1 type I collagen, VCAM-1, ICAM-1, CCL-19, CXCL-6, IL-6, transmembrane glycoprotein NMB, collagen alpha-1(IV) chain, FSTL-1, lumican, hepatocyte growth factor, gp130, urokinase plasminogen activator surface receptor, TIMP metallopeptidase inhibitor 1, matrilysin (MMP7), CCL-21, midkine, IGFBP-7, FasL, IGFBP-6, cathepsin-S, PECAM-1, osteopontin, IL-5, nerve growth factor angiogenin, and protein S. In some embodiments, a subset of PLSec proteins that may be used in performing a PLSec assay, generating a PLSec score, generating a PLSec-AFP score, and/or generating a PLAF score as disclosed herein can include IL6ST, CCL21, IGFBP7, Angiogenin, and VCAM1. In some embodiments, a subset of PLSec proteins that may be used in performing a PLSec assay, generating a PLSec score, generating a PLSec-AFP score, and/or generating a PLAF score as disclosed herein can include IL6ST, CCL21, IGFBP7, Angiogenin, and Protein S. In some embodiments, a subset of PLSec proteins that may be used in performing a PLSec assay, generating a PLSec score, generating a PLSec-AFP score, and/or generating a PLAF score as disclosed herein can include IL6ST, CCL21, IGFBP7, Angiogenin, and IL6. In some embodiments, a subset of PLSec proteins that may be used in performing a PLSec assay, generating a PLSec score, generating a PLSec-AFP score, and/or generating a PLAF score as disclosed herein can include IL6ST, CCL21, IGFBP7, Angiogenin, and MMP7. In some embodiments, a subset of PLSec proteins that may be used in performing a PLSec assay, generating a PLSec score, generating a PLSec-AFP score, and/or generating a PLAF score as disclosed herein can include IL6ST, CCL21, IGFBP7, and Angiogenin. In some embodiments, a subset of PLSec proteins that may be used in performing a PLSec assay, generating a PLSec score, generating a PLSec-AFP score, and/or generating a PLAF score as disclosed herein can include IL6ST, CCL21, IGFBP7, and IL6. In some embodiments, a subset of PLSec proteins that may be used in performing a PLSec assay, generating a PLSec score, generating a PLSec-AFP score, and/or generating a PLAF score as disclosed herein can include IL6ST, CCL21, IGFBP7, and MMP7. In some embodiments, a subset of PLSec proteins that may be used in performing a PLSec assay, generating a PLSec score, generating a PLSec-AFP score, and/or generating a PLAF score as disclosed herein can include VCAM1, IGFBP7, MMP7, IL6, CCL21, Protein S, and Angiogenin.

In some embodiments, normalized protein quantification measurements produced by a PLSec assay herein may be used to generate a PLSec score. In some embodiments, normalized protein quantification measurements produced by a PLSec assay herein may be converting into an aggregated score, wherein the aggregated score is the PLSec score. In some embodiments, normalized protein quantification measurements produced by a PLSec assay herein may be converted into high or low abundance by top quartile cut-off in the optimization set, and calculated a semiquantitative score according to Formula I:

$$2 + \sum_{i=1}^{8} \begin{pmatrix} 1 \text{ for high abundance of high risk protein} \\ -1 \text{ for high abundance of low risk protein} \\ 0 \text{ otherwise} \end{pmatrix} \text{ for probe } i, \qquad (I)$$

wherein a high risk protein is VCAM-1, IGFBP-7, gp130, matrilysin, IL-6, and/or CCL-21 and a low risk protein is protein S and/or angiogenin.

In some embodiments, a subject having a PLSec score as determined herein below 4 may be predicted to be at low risk for developing liver cancer (e.g., HCC). In some embodiments, a subject having a PLSec score as determined herein of 4 or higher may be predicted to be at high risk for developing liver cancer (e.g., HCC). In some embodiments, a subject having a PLSec score as determined herein below 4 may be classified as low risk for developing liver cancer (e.g., HCC). In some embodiments, a subject having a PLSec score as determined herein of 4 or higher may be classified as high risk for developing liver cancer (e.g., HCC). In some embodiments, a subject having a PLSec score below 4 as determined herein may be diagnosed as being at low risk for developing liver cancer (e.g., HCC). In some embodiments, a subject having a PLSec score of 4 or higher as determined herein may be diagnosed as being at high risk for developing liver cancer (e.g., HCC).

In some embodiments, the amount of alpha-fetoprotein (AFP) in a sample collected from a subject herein can be measured and integrated with the PLSec score of the same sample. In accordance with these embodiments, an integrated PLSec-AFP score may be used to predict risk, classify, and/or diagnose liver cancer (e.g., HCC) severity in a subject herein. In some embodiments, a PLSec score obtained according to the methods herein from a sample can be integrated with the amount of AFP measured from the sample to obtain an integrated PLSec-AFP score according to Formula II:

$$PLSec\text{-}AFP = 0.175 \times PLSec + 0.325 \times \log_2(1 + AFP) \qquad (II).$$

In some embodiments, a subject having an integrated PLSec-AFP score as determined herein below 1.66 may be predicted to be at low risk for developing liver cancer (e.g., HCC). In some embodiments, a subject having an integrated PLSec-AFP score as determined herein of 1.66 or higher may be predicted to be at high risk for developing liver cancer (e.g., HCC). In some embodiments, a subject having an integrated PLSec-AFP score as determined herein below 1.66 may be classified as low risk for developing liver cancer (e.g., HCC). In some embodiments, a subject having an integrated PLSec-AFP score as determined herein of 1.66 or higher may be classified as high risk for developing liver cancer (e.g., HCC). In some embodiments, a subject having an integrated PLSec-AFP score below 1.66 as determined herein may be diagnosed as being at low risk for developing liver cancer (e.g., HCC). In some embodiments, a subject having an integrated PLSec-AFP score of 1.66 or higher as determined herein may be diagnosed as being at high risk for developing liver cancer (e.g., HCC).

In some embodiments, an integrated PLSec-AFP score may be used to predict recurrence after one or more curative treatments of a liver cancer (e.g., HCC) is administered. Even after complete HCC tumor resection or ablation, carcinogenic tissue in the remnant liver can give rise to recurrent de novo HCC tumors, which may progress into incurable, advanced-stage disease. In some embodiments, an integrated PLSec-AFP score may be used to predict recurrence within about one to about 10 years (e.g., about 1, 2, 3, 4, 5, 6, 7, 8, 9, 10 years) after one or more curative treatments of a liver cancer (e.g., HCC) is administered.

In some embodiments, methods of determining a PLSec score (or an integrated PLSec-AFP score) as disclosed herein may identify a subject in need of risk-based liver cancer (e.g., HCC) screening. For subjects deemed to be at risk for developing a liver cancer and/or recovering from a liver cancer, current practice guidelines recommend regular HCC screening. Non-limited examples of liver cancer (e.g., HCC) screening methods can include measuring circulating cell-free methylated DNA, measuring α-fetoprotein (AFP), ultrasound, magnetic resonance imaging (MRI), computed tomography (CT), and the like. In some embodiments, methods of determining a PLSec score (or an integrated PLSec-AFP score) as disclosed herein may identify a subject in need of risk-based liver cancer (e.g., HCC) screening to be performed at least once a year. In some aspects, methods of determining a PLSec score (or an integrated PLSec-AFP score) as disclosed herein may identify a subject in need of risk-based liver cancer (e.g., HCC) screening to be performed about once a year to about six-times a year (e.g., about once, twice, three-times, four-times, five-times, six-times a year). In some examples, methods of determining a PLSec score (or an integrated PLSec-AFP score) as disclosed herein may identify a subject in need of risk-based liver cancer (e.g., HCC) screening to be performed about twice a year.

In some embodiments, methods of diagnosing a liver cancer (e.g., HCC) in a subject may entail performing a PLSec assay and/or determining a PLSec score (or an integrated PLSec-AFP score) as disclosed herein. In some embodiments, methods of diagnosing HCC in a subject having or suspected of having HCC may entail performing a PLSec assay and/or determining a PLSec score as disclosed herein in addition to performing a liver biopsy, one or more blood tests to assess liver function, computed tomography, magnetic resonance imaging, or any combination thereof. In some aspects, the one or more blood tests performed to assess liver function may be a measurement of alanine transaminase (ALT), aspartate transaminase (AST), alkaline phosphatase (ALP), albumin, bilirubin, gamma-glutamyltransferase (GGT), L-lactate dehydrogenase (LD), prothrombin time (PT), or any combination thereof.

III. Methods of Determining a PLAF Score and Assessing Long-Term Risk of Hepatic Decompensation Progressive hepatic fibrosis and/or cirrhosis may lead to hepatic decompensation (i.e., hepatic encephalopathy, esophageal varices, and/or ascites) and/or hepatocellular carcinoma (HCC) in a subject. In certain embodiments, the present disclosure provides methods of predicting decompensation risk in a subject. In some embodiments, methods of predicting decompensation risk in a subject may entail performing a PLSec assay and/or determining a PLSec score according to the methods disclosed herein.

In some embodiments, a subject having a PLSec score below 4, as determined according to methods disclosed herein, may be predicted to be at low risk for developing hepatic decompensation. In some embodiments, a subject having a PLSec score as determined herein of 4 or higher may be predicted to be at high risk for developing hepatic decompensation. In some embodiments, a subject having a PLSec score as determined herein below 4 may be classified as low risk for developing hepatic decompensation. In some embodiments, a subject having a PLSec score as determined herein of 4 or higher may be classified as high risk for developing hepatic decompensation. In some embodiments, a subject having a PLSec score below 4 as determined herein may be diagnosed as being at low risk for developing hepatic decompensation. In some embodiments, a subject having a PLSec score of 4 or higher as determined herein may be diagnosed as being at high risk for developing hepatic decompensation.

In some embodiments, a subject having a PLSec score as determined herein of 4 or higher may be predicted to be at high risk for developing one or more symptoms of hepatic decompensation. Symptoms of hepatic decompensation may include, but are not limited to ascites, variceal bleeding, esophageal varices, hepatic encephalopathy, need for liver transplantation, or the like.

In certain embodiments, methods of predicting decompensation risk in a subject may entail performing a PLSec assay and/or determining a PLSec score according to the methods disclosed herein in addition to at least one other assessment of liver disease severity. Non-limiting examples of methods used for assessment of liver disease severity can include model for end-stage liver disease (MELD) scores, Child-Pugh (CP) scores, CLIF-C ACLF (Acute-on-Chronic Liver Failure) scores, fibrosis-4 (FIB-4) scores, serum albumin-bilirubin (ALBI) scores, and the like. Methods of determining MELD scores, Child-Pugh scores, CLIF-C ACLF scores, FIB-4 scores, ALBI scores are known in the art. In certain embodiments, methods of predicting decompensation risk in a subject may entail performing a PLSec assay and/or determining a PLSec score according to the methods disclosed herein and determining one or more MELD score, Child-Pugh score, CLIF-C ACLF score, FIB-4 score, ALBI score, or any combination thereof. In some aspects, methods of predicting decompensation risk in a subject may entail determining a PLSec score, a FIB-4 score, an ALBI score, or any combination thereof. In some other aspects, methods of predicting decompensation risk in a subject may entail determining a PLSec score, a FIB-4 score, and an ALBI score.

In certain embodiments, methods of predicting decompensation risk in a subject may entail determining a composite score, or a "PLAF" score, from a PLSec score, an ALBI, and a FIB-4 score. In some embodiments, a PLAF score may be determined according to formula III:

$$PLAF\ score = (1\ for\ PLSec \geq 4,\ otherwise\ 0) + (1\ for\ ALBI\ grade \geq 2,\ otherwise\ 0) + (1\ for\ FIB\text{-}4 > 3.25,\ otherwise\ 0) \quad (III).$$

In some embodiments, a subject having a PLAF score as determined herein of 0 may be predicted to be at very low risk for developing one or more symptoms of hepatic decompensation. In some embodiments, a subject having a PLAF score as determined herein between 0 and 1 may be predicted to be at low risk for developing one or more symptoms of hepatic decompensation. In some embodiments, a subject having a PLAF score as determined herein of about 1 may be predicted to be at low risk for developing one or more symptoms of hepatic decompensation. In some embodiments, a subject having a PLAF score as determined herein between 1 and 2 may be predicted to be at intermediate risk for developing one or more symptoms of hepatic decompensation. In some embodiments, a subject having a PLAF score as determined herein of about 2 may be predicted to be at intermediate risk for developing one or more symptoms of hepatic decompensation. In some embodiments, a subject having a PLAF score as determined herein between 2 and 3 may be predicted to be at high risk for developing one or more symptoms of hepatic decompensation. In some embodiments, a subject having a PLAF score as determined herein of about 3 may be predicted to be at high risk for developing one or more symptoms of hepatic decompensation.

In some embodiments, methods of predicting decompensation risk in a subject may entail performing a PLSec assay, determining a PLSec score and/or determining a PLAF score according to the methods disclosed herein wherein the subject may have in or may be suspected of having cirrhosis. In some embodiments, methods of predicting decompensation risk in a subject may entail performing a PLSec assay, determining a PLSec score and/or determining a PLAF score according to the methods disclosed herein wherein the subject may be in or may be suspected of being in early-stage cirrhosis. In some aspects, a subject may be in or may be suspected of being in early-stage cirrhosis from mixed etiologies.

In some embodiments, methods of predicting decompensation risk in a subject may entail performing a PLSec assay, determining a PLSec score and/or determining a PLAF score according to the methods disclosed herein wherein the subject may have or may be suspected of having liver fibrosis. In some embodiments, methods of predicting decompensation risk in a subject may entail performing a PLSec assay, determining a PLSec score and/or determining a PLAF score according to the methods disclosed herein wherein the subject may be in or may be suspected of being in early-stage liver fibrosis.

IV. Methods of Preventing/Treating Liver Cancer in a Subject

In general, methods disclosed herein include treating a subject having or suspected of having a liver cancer (e.g., HCC) by performing a PLSec assay to measure protein abundance of one or more of the circulating proteins associated with PLSec as disclosed herein, obtaining a PLSec score from the PLSec assay results, and administering the appropriate treatment based on the PLSec score. In some embodiments, treatment after determining the PLSec score as disclosed herein may depend on if the PLSec score is indicative of a high risk for HCC (e.g., greater than or equal to 4) or a low risk for HCC (e.g., less than 4).

A suitable tailored treatment approach for liver cancer (e.g., HCC) as used herein may be selected based on the subject's diagnosis and/or classification of cancer severity. In some embodiments, a subject can be diagnosed with liver cancer (e.g., HCC) based on increased gene expression/ protein abundance of one or more circulating protein markers that make up a serum-protein-based PLSec as disclosed herein. In some embodiments, a subject can be predicted to have a high or low risk for liver cancer (e.g., HCC) based on increased gene expression/protein abundance of one or more circulating protein markers that make up a serum-protein-based PLSec as disclosed herein. In some embodiments, a subject can be classified as having a high or low risk for liver cancer (e.g., HCC) based on increased gene expression/ protein abundance of one or more circulating protein markers that make up a serum-protein-based PLSec as disclosed herein.

In some embodiments, a subject can be diagnosed and/or predicted to have high or low risk for liver cancer (e.g., HCC) based methods of determining a PLSec score as disclosed herein in addition to an assessment of at least one disease, condition, or combination thereof that predisposes the subject to liver cancer (e.g., HCC). In some embodiments, further assessment of at least one disease, condition, or combination thereof that predisposes the subject to liver cancer (e.g., HCC) may include at diagnosis and/or a determination of severity of cirrhosis, chronic infection of hepatitis B virus (HBV), chronic infection of hepatitis C virus (HCV), non-alcoholic fatty liver disease (NAFLD), non-alcoholic steatohepatitis (NASH), primary biliary cirrhosis (PBC), hereditary hemochromatosis, type 2 diabetes, obesity, tobacco use, alcohol abuse, long-term anabolic steroid use, tyrosinemia, alpha1-antitrypsin deficiency, porphyria cutanea tarda, glycogen storage diseases, Wilson disease, or any combination thereof. Methods of diagnosing these diseases and conditions are known in the art. (See e.g., HARRISON'S PRINCIPLES OF INTERNAL MEDICINE, 18e. New York, N.Y.: McGraw-Hill; 2012.)

In some embodiments, a subject can be diagnosed and/or predicted to have high or low risk for liver cancer (e.g., HCC) based methods of determining a PLSec score as disclosed herein in addition to at least one other method of diagnosing liver cancer (e.g., HCC). In some embodiments, an additional method of diagnosing liver cancer (e.g., HCC) that can be used in addition to determination of a PLSec score may be histological or imaging-based (contrast-enhanced multiphase CT, ultrasound, and/or MRI) examinations according to the American Association of the Study of Liver Disease (AASLD) practice guidelines. Imaging features used to diagnose an HCC include size, kinetics, and pattern of contrast enhancement, and growth on serial imaging wherein size may be measured as the maximum cross-section diameter on the image where the lesion is most clearly seen. The histologic appearance of HCC can range from well-differentiated (with individual hepatocytes appearing nearly identical to normal hepatocytes) to poorly differentiated lesions consisting of pleomorphic tumor cells in a solid or compact growth pattern wherein central necrosis of large tumors can be commonly observed.

In some embodiments, a PLSec score may be obtained using the methods herein to determine one or more treatment options for liver cancer (e.g., HCC) in a subject. In some embodiments, a PLSec score may be obtained using the methods herein to determine one or more treatment options for liver cancer (e.g., HCC) in a subject in conjunction with one or more additional factors. In some aspects, treatment options for liver cancer (e.g., HCC) in a subject herein may depend on a PLSec score as disclosed herein and one or more of the following additional factors: size, number, and location of tumors; presence or absence of cirrhosis; operative risk based on extent of cirrhosis and comorbid diseases; overall performance status; portal vein patency; presence or absence of metastatic disease, or any combination thereof.

In some embodiments, a PLSec score may be obtained using the methods herein to determine one or more treatment options for liver cancer (e.g., HCC) in a subject wherein the one or more treatments may include surgical removal of one or more liver tumors, liver transplant, radiation therapy, drug therapy, immunotherapy, chemotherapy, or any combination thereof. In some aspects, surgical treatments of liver cancer (e.g., HCC) can include, but are not limited to, intra-arterial brachytherapy (IAB), transarterial chemoembolization (TACE), surgical resection, radiofrequency ablation (RFA), and the like. In some aspects, drug therapy of liver cancer (e.g., HCC) can include administration of one or more drugs to the subject, wherein the drugs are comprised of sorafenib, regorafenib, nivolumab, erlotinib, lenvatinib, cabozantinib, ramucirumab, pembrolizumab, durvalumab, tremelimumab, atezolizumab, bevacizumab, or any combination thereof. In some aspects, chemotherapy may comprise administration of one or more platinum-based chemotherapeutics. As used herein, a "platinum-based chemotherapeutic" is a chemotherapeutic that is an organic compound which contains platinum as an integral part of the molecule. In some embodiments, compositions of use herein can contain one or more platinum-based chemotherapeutics including, but not limited to, cisplatin, carboplatin, nedaplatin, triplatin tetranitrate, phenanthriplatin, picoplatin, satraplatin or a combination thereof. In some embodiments, a platinum-based chemotherapeutic can be administered separately from the compounds disclosed herein. In some embodiments, the platinum-based chemotherapeutic or salt thereof or derivative thereof includes cisplatin. In certain embodiments, platinum-based chemotherapeutic agents can be administered to a subject alone or in combination with at least one drug therapy (e.g., sorafenib, regorafenib), daily, every other day, twice weekly, every other day, every other week, weekly or monthly or other suitable dosing regimen. One of skill in the art will appreciate that dosing regimens can vary and require optimization for a subject to be treated based on the various factors such as that subject's age, weight, gender, renal/liver function, and the like. In some embodiments, any of the methods disclosed herein can further include monitoring occurrence of one or more adverse effects in the subject having a PLSec score indicative of a high-risk for liver cancer (e.g., HCC). Adverse effects may include, but are not limited to, hepatic impairment, hematologic toxicity, neurologic toxicity, cutaneous toxicity, gastrointestinal toxicity, or a combination thereof. When one or more adverse effects are observed, the methods disclosed herein can further include reducing or increasing the dose of one or more of the treatment regimens depending on the adverse effect or effects in the subject. For example, when a moderate to severe hepatic impairment is observed in a subject after treatment, compositions of use to treat the subject can be reduced in concentration or frequency of dosing with one or more disclosed drugs (e.g., sorafenib, regorafenib), the dose or frequency of the chemotherapeutics can be adjusted, or a combination thereof.

In some embodiments, a PLSec score may be obtained using the methods herein to determine one or more chemoprevention options for preventing liver cancer (e.g., HCC) in a subject. As used herein, "chemoprevention" refers to administration of one or more agents to prevent cancer from occurring and/or reoccurring in a subject. In some non-limiting examples, a medication, vitamin and/or supplement may be administered as chemoprevention agent. In some embodiments, a subject herein may be administered one or more chemoprevention agents after determination of their PLSec score. In some embodiments, a subject having a PLSec score equal to or greater than 4 may be administered one or more chemoprevention agents. In some aspects, chemoprevention agents suitable for administration to a subject herein after determination of the PLSec score in the subject can include an antiviral (e.g., tenofovir disoproxil fumarate), a statin (e.g., simvastatin, atorvastatin, lovastatin, pravastatin, rosuvastatin), an anti-diabetic (e.g., metformin), a dietary and/or nutritional agent (e.g., polyunsaturated fatty acids (PUFAs), eicosapentaenoic acid (EPA), docosapentaenoic acid (DPA), docosahexaenoic acid (DHA), Branched-chain amino acid (BCAA), Vitamin D, S-adenosylmethionine (SAMe)), an anti-inflammatory (e.g., celecoxib, aspirin), an immunomodulatory (e.g., thalidomide, thymalfasin), or any combination thereof.

In some aspects, treatment of a subject after determining the PLSec score as disclosed herein, may prevent liver cancer progression. In some aspects, treatment of a subject after determining the PLSec score as disclosed herein, may ameliorate one or more symptoms associated with liver cancer (e.g., HCC). In still other aspects, treatment of a subject after determining the PLSec score as disclosed herein, may reduce risk of liver cancer recurrence in the subject. In other aspects, treatment of a subject after determining the PLSec score as disclosed herein, may slow tumor growth in the liver of the subject. In some other aspects, treatment of a subject after determining the PLSec score as disclosed herein, may reduce the risk of metastasis in the subject.

In some embodiments, methods of treatment disclosed herein can impair liver tumor growth compared to liver tumor growth in an untreated subject with identical disease condition and predicted outcome. In some embodiments, liver tumor growth can be stopped following treatments according to the methods disclosed herein. In other embodiments, liver tumor growth can be impaired at least about 5% or greater to at least about 100%, at least about 10% or greater to at least about 95% or greater, at least about 20% or greater to at least about 80% or greater, at least about 40% or greater to at least about 60% or greater compared to an untreated subject with identical disease condition and predicted outcome. In other words, liver tumors in subject treated according to the methods disclosed herein grow at least 5% less (or more as described above) when compared to an untreated subject with identical disease condition and predicted outcome. In some embodiments, liver tumor growth can be impaired at least about 5% or greater, at least about 10% or greater, at least about 15% or greater, at least about 20% or greater, at least about 25% or greater, at least about 30% or greater, at least about 35% or greater, at least about 40% or greater, at least about 45% or greater, at least about 50% or greater, at least about 55% or greater, at least about 60% or greater, at least about 65% or greater, at least about 70% or greater, at least about 75% or greater, at least about 80% or greater, at least about 85% or greater, at least about 90% or greater, at least about 95% or greater, at least about 100% compared to an untreated subject with identical disease condition and predicted outcome. In some embodiments, liver tumor growth can be impaired at least about 5% or greater to at least about 10% or greater, at least about 10% or greater to at least about 15% or greater, at least about 15% or greater to at least about 20% or greater, at least about 20% or greater to at least about 25% or greater, at least about 25% or greater to at least about 30% or greater, at least about 30% or greater to at least about 35% or greater, at least about 35% or greater to at least about 40% or greater, at least about 40% or greater to at least about 45% or greater, at least about 45% or greater to at least about 50% or greater, at least about 50% or greater to at least about 55% or greater, at least about 55% or greater to at least about 60% or greater, at least about 60% or greater to at least about 65% or greater, at least about 65% or greater to at least about 70% or greater, at least about 70% or greater to at least about 75% or greater, at least about 75% or greater to at least about 80% or greater, at least about 80% or greater to at least about 85% or greater, at least about 85% or greater to at least about 90% or greater, at least about 90% or greater to at least about 95% or greater, at least about 95% or greater to at least about 100% compared to an untreated subject with identical disease condition and predicted outcome.

In some embodiments, treatment of liver tumors according to the methods disclosed herein can result in a shrinking of a liver tumor in comparison to the starting size of the liver tumor. In some embodiments, liver tumor shrinking may be at least about 5% or greater to at least about 10% or greater, at least about 10% or greater to at least about 15% or greater, at least about 15% or greater to at least about 20% or greater, at least about 20% or greater to at least about 25% or greater, at least about 25% or greater to at least about 30% or greater, at least about 30% or greater to at least about 35% or greater, at least about 35% or greater to at least about 40% or greater, at least about 40% or greater to at least about 45% or greater, at least about 45% or greater to at least about 50% or greater, at least about 50% or greater to at least about 55% or greater, at least about 55% or greater to at least about 60% or greater, at least about 60% or greater to at least about 65% or greater, at least about 65% or greater to at least about 70% or greater, at least about 70% or greater to at least about 75% or greater, at least about 75% or greater to at least about 80% or greater, at least about 80% or greater to at least about 85% or greater, at least about 85% or greater to at least about 90% or greater, at least about 90% or greater to at least about 95% or greater, at least about 95% or greater to at least about 100% (meaning that the liver tumor is completely gone after treatment) compared to the starting size of the liver tumor.

In various embodiments, treatments administered according to the methods disclosed herein can improve patient life expectancy compared to the life expectancy of an untreated subject with identical disease condition (e.g., liver cancer) and predicted outcome. As used herein, "patient life expectancy" is defined as the time at which 50 percent of subjects are alive and 50 percent have passed away. In some embodiments, patient life expectancy can be indefinite following treatment according to the methods disclosed herein. In other aspects, patient life expectancy can be increased at least about 5% or greater to at least about 100%, at least about 10% or greater to at least about 95% or greater, at least about 20% or greater to at least about 80% or greater, at least about 40% or greater to at least about 60% or greater compared to an untreated subject with identical disease condition and predicted outcome. In some embodiments, patient life expectancy can be increased at least about 5% or greater, at least about 10% or greater, at least about 15% or greater, at least about 20% or greater, at least about 25% or greater, at least about 30% or greater, at least about 35% or greater, at least about 40% or greater, at least about 45% or greater, at least about 50% or greater, at least about 55% or greater, at least about 60% or greater, at least about 65% or greater, at least about 70% or greater, at least about 75% or greater, at least about 80% or greater, at least about 85% or greater, at least about 90% or greater, at least about 95% or greater, at least about 100% compared to an untreated subject with identical disease condition and predicted outcome. In some embodiments, patient life expectancy can be increased at least about 5% or greater to at least about 10% or greater, at least about 10% or greater to at least about 15% or greater, at least about 15% or greater to at least about 20% or greater, at least about 20% or greater to at least about 25% or greater, at least about 25% or greater to at least about 30% or greater, at least about 30% or greater to at least about 35% or greater, at least about 35% or greater to at least about 40% or greater, at least about 40% or greater to at least about 45% or greater, at least about 45% or greater to at least about 50% or greater, at least about 50% or greater to at least about 55% or greater, at least about 55% or greater to at least about 60% or greater, at least about 60% or greater to at least about 65% or greater, at least about 65% or greater to at least about 70% or greater, at least about 70% or greater to at least about 75% or greater, at least about 75% or greater to at least about 80% or greater, at least about 80% or greater to at least about 85% or greater, at least about 85% or greater to at least about 90% or greater, at least about 90% or greater to at least about 95% or greater, at least about 95% or greater to at least about 100% compared to an untreated patient with identical disease condition and predicted outcome.

V. Kits

The present disclosure provides kits for performing any of the methods disclosed herein. In some aspects, the present disclosure provides a kit for determining expression of one or more markers of liver cancer (e.g., HCC) as disclosed herein and for diagnosing the cancer. Such a kit may comprise a means for determining any of the combinations proteins that make up a panel of circulating proteins referred to as a serum-protein-based PLSec as disclosed herein.

In some embodiments, the means for determining expression of one or more circulating proteins of PLSec as disclosed herein may have a set of antibodies, peptides, aptamers, or any combination thereof. In some examples, a means for determining expression of one or more circulating proteins of PLSec disclosed herein may have a set of antibodies/antigens. Each of the antibodies/antigens can detect a target circulating protein of PLSec in the combination and the whole set, collectively, may be designed for detecting at least eight PLSec proteins (e.g., VCAM-1, IGFBP-7, gp130, matrilysin, IL-6, CCL-21, angiogenin, and protein S) in combination. Design of such antibodies/antigens for detecting a particular protein using MAPx is within the knowledge of a skilled person in the art. See, e.g., Sambrook et al. et al., MOLECULAR CLONING—A LABORATORY MANUAL (2ND ED.), Vols. 1-3, Cold Spring Harbor Laboratory, Cold Spring Harbor, N.Y. (1989).

In some embodiments, kits disclosed herein can have a solid support member, on which the set of antibodies (e.g., "probes") can be immobilized. In some examples, kits disclosed herein may comprise a platform comprising a support member, on which the set of probes can be immobilized. The probes may have oligonucleotide or peptide molecules that bind to a specific target molecule. The support member in the platform may be either porous or non-porous. For example, the probes may be attached to a nitrocellulose or nylon membrane or to a bead. Alternatively, the support member may have a glass or plastic surface. In some examples, the solid phase may be a nonporous or, optionally, a porous material such as a gel.

In some embodiments, a platform array may comprise a support member with an ordered array of binding (e.g., hybridization) sites or "probes" each representing one of the target protein marker described herein. Preferably the platform arrays are addressable arrays, and more preferably positionally addressable arrays. For example, each probe of the array is preferably located at a known, predetermined position on the solid support such that the identity (i.e., the sequence, the binding epitope) of each probe can be determined from its position in the array (i.e., on the support or surface). In some embodiments, each probe is covalently attached to a solid support. In some aspects, the solid support may be a bead.

Any of the kits disclosed herein may further comprise a container for placing a biological sample, and optionally a tool for collecting a biological sample from a subject. Alternatively, or in addition, the kit may further comprise one or more reagents for determining protein levels of the one or more circulating proteins of PLSec as disclosed herein from the biological sample. In some examples, the kit may comprise reagents for immunodetection of one or more circulating proteins of PLSec as disclosed herein. In other examples, the kit may comprise reagents for hybridization.

Any of the kits may further comprise an instruction manual providing guidance for using the kit to determine a protein panel having any combination of the one or more circulating proteins of PLSec as disclosed herein.

Further, any of the kits disclosed herein may comprise a processor, e.g., a computational processor, for assessing abundance of one or more of the circulating proteins of PLSec as disclosed herein. Such a processor may be configured with a regression model such as those disclosed herein. By inputting the marker profile (e.g., the protein expression level of circulating proteins of PLSec), the processor may process the information to diagnose liver cancer (e.g., HCC) and optionally diagnose the level of liver cancer (e.g., HCC) severity by generating a PLSec score according to the methods disclosed herein. In other aspects, the processor may process the information to assess long-term risk of hepatic decompensation by generating a PLSec score and/or a PLAF score according to the methods disclosed herein.

Having described several embodiments, it will be recognized by those skilled in the art that various modifications, alternative constructions, and equivalents may be used without departing from the spirit of the present inventive concept. Additionally, a number of well-known processes and elements have not been described in order to avoid unnecessarily obscuring the present inventive concept. Accordingly, this description should not be taken as limiting the scope of the present inventive concept.

Those skilled in the art will appreciate that the presently disclosed embodiments teach by way of example and not by limitation. Therefore, the matter contained in this description or shown in the accompanying drawings should be interpreted as illustrative and not in a limiting sense. The following claims are intended to cover all generic and specific features described herein, as well as all statements of the scope of the method and assemblies, which, as a matter of language, might be said to fall there between.

EXAMPLES

The following examples are included to demonstrate preferred embodiments of the disclosure. It should be appreciated by those of skill in the art that the techniques disclosed in the examples that follow represent techniques discovered by the inventor to function well in the practice of the present disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the present disclosure.

Example 1

In an exemplary method, a computational pipeline was used to translate a gene signature to secretome signature. Invasive tissue biopsy generally limits transcriptome profiling of diseased organ tissue as a suitable means to identify pathogenic and prognostic molecular dysregulation; however, biomarker assessment in circulation obscures the source organ that releases the biomolecules. To overcome these challenges and enable less invasive monitoring of organ-specific biological dysregulation, the present disclosure provides a computational pipeline to systematically translate a tissue transcriptome-based molecular signature into a list of proteins inferred to be released into circulation from an organ of interest called translation of gene expression to SECretome (TexSEC). The pipeline was formed by integrating (i) assembled proteome databases with an algorithm to infer organ specificity of proteins in circulation (liver secretome biomarker candidates), and (ii) a list of genes (i.e., gene signature) specific to a disease context, e.g., HCC, risk prediction in cirrhosis (prognostic liver proteome biomarker candidates) to identify a list of circulating proteins for prognostic prediction (prognostic liver secretome biomarker candidates).

Derivation of liver secretome biomarker candidates. Liver secretome biomarker candidates were derived as follows (See also FIGS. 1A-1C). Circulating proteins included were actively secreted proteins with functional roles outside their source cells/organs (at high abundance for housekeeping purposes, e.g., albumin, or with occasional secretion when needed, e.g., cytokines) and leaked proteins from injured cells. To broadly survey these types of proteins as candidate circulating biomarkers, proteome databases that complementarily cover bioinformatically-predicted secretable proteins as well as empirically detected proteins in human body fluids were integrated. The following three algorithms—which predicted extracellular secretion based on signal peptide sequences—were applied to a total of 20,431 non-redundant proteins encoded by 20,103 genes from UniProtKB (UniProt Consortium, *Nucleic Acids Res.* 2019; 47:D506-D515): (1) the SignalP-5.0 algorithm (Almagro Armenteros et al., *Nat. Biotechnol.* 2019; 37:420-423) predicted secretory signal peptides transported by the Sec translocon and cleaved by Signal Peptidase I using a deep neural network (cbs.dtu.dk/services/SignalP-5.0/) and identified 3,528 proteins; (2) the DeepSig v.1.0 algorithm (Savojardo et al., *Bioinformatics.* 2018; 34:1690-1696) focused on signal peptide sequences located at N terminus in the membrane and other proteins (https://deepsiq.biocomp.unibo.it/deepsig) and identified 3,133 proteins; and (3) TOPCONS2 (Tsirigos et al., *Nucleic Acids Res.* 2015; 43:W401-W407) is a topology-based method combining five algorithms, OCTOPUS, Philius, PolyPhobius, SCAMPI, and SPOCTOPUS (https://topcons.cbr.su.se) used herein which identified 3,772 proteins. The intersection of the three prediction methods, including 2,875 proteins, was further considered as secretome biomarker candidates.

As complementary, wet-lab-based experimental evidence of detection in human body fluids, the following three proteome databases were integrated as well: (1) a list of mass-spectrometry-based human plasma proteins was retrieved from Human Plasma Protein Project PeptideAltas database (Schwenk et al., *J. Proteome Res.* 2017; 16: 4299-

4310), including 3,485 "evidence level 1" proteins; (2) Plasma Protein Database (Nanjappa et al., *Nucleic Acids Res.* 2014; 42: D959-D965) was a literature-based collection of human plasma and serum proteins, in which 3,742 proteins reported in two or more studies were included; and (3) Protein Abundance Across Organisms (PAXdb) v.4.1 (Wang et al., *Proteomics.* 2015; 15: 3163-3168) was a database of human protein abundance measured in 15 organs, plasma, and urine (pax-db.org), from which 4,312 proteins were retrieved. A total of 3,274 proteins detected in at least two of the three databases were included in subsequent analysis. Finally, the union of the two types of proteins, i.e., computationally-inferred and experimentally-detected proteins, were regarded as a pool of secretome biomarker candidates that includes 5,134 proteins encoded by 5,044 genes (FIG. 1B).

Figure 1C:
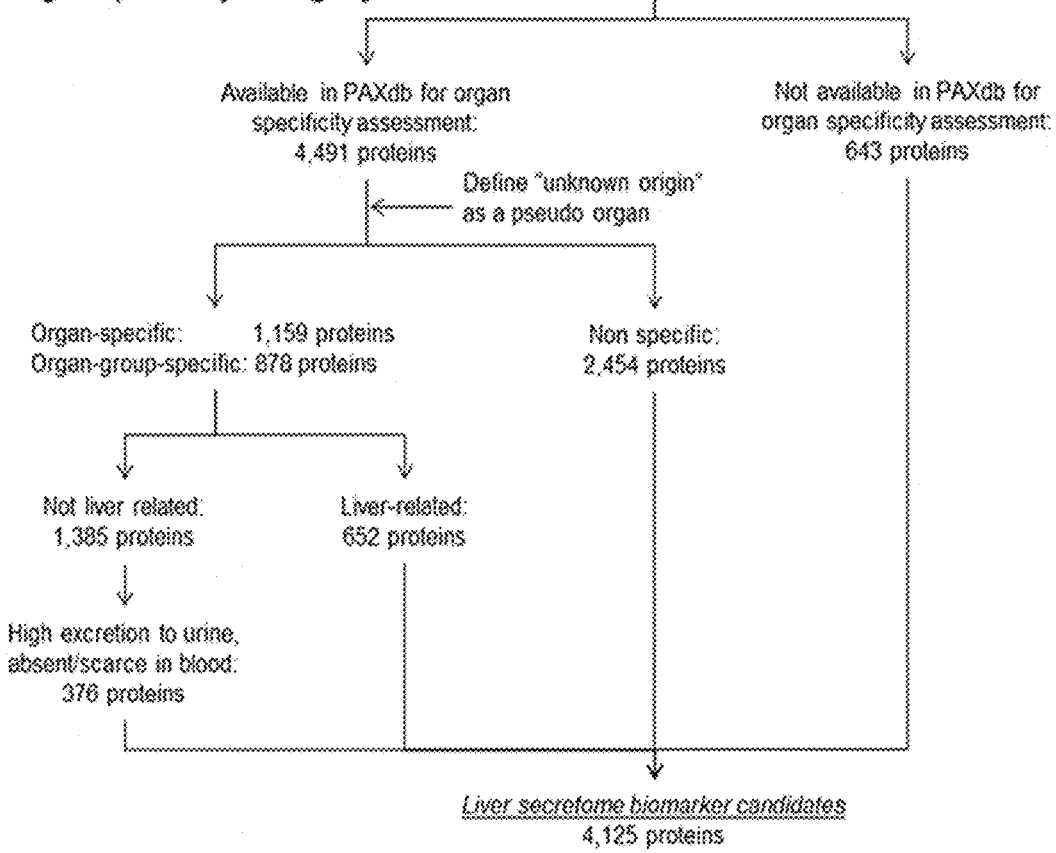

Organ specificity/ambiguity of the candidate proteins was estimated as follows (See also FIG. 1C). Proteins released from non-target organs especially at high baseline levels may obscure pathogenic change in abundance of proteins released from the target organ of interest (i.e., liver in this exemplary study) (Diamandis, *J. Natl. Cancer Inst.* 2010; 102: 1462-1467; Uhlén et al, Science. 2015; 347: 1260419). To maximize the chance to identify candidate biomarker proteins to monitor the target organ, the PAXdb, a comprehensive database of human proteins quantified in 15 organs (liver, brain, colon, rectum, esophagus, female gonad, gallbladder, heart, kidney, lung, pancreas, prostate, skin, testis, and uterus), plasma, and urine from healthy individuals, in which quantitative protein abundance data are available for 4,491 out of the 5,134 proteins was used (Wang et al., *Proteomics.* 2015; 15: 3163-3168). Among the proteins, 211 proteins (5%) in plasma+urine were substantially more abundant compared to the sum of the 15 organs (at least 5-fold higher), suggesting that these proteins were released from other organ(s) not covered in the database or immediately released from source organ(s) among the 15 organs. These proteins were regarded as released from "unknown origin" as a pseudo organ (e.g., leptin secreted from adipose tissues), and the rest of the proteins were assessed for their association with the 15 organs. The proteins were classified into the following three categories based on their relative abundance across the organs: organ-specific, i.e., >5-fold higher in one organ compared to the rest; organ-group-specific, >5-fold higher in two to five organs (median) compared to the rest; non-specific. Proteins excessively secreted into urine and absent or scarce in plasma, defined by urine-to-plasma ratio >10-fold, regardless of organ specificity were retained because such proteins could serve as liver-related biomarkers in case pathogenic secretion from liver exceeded the excretion into urine and became detectable in plasma (such as a prostate-specific protein, growth/differentiation factor 15 [GDF-15], associated with chronic liver disease and HCC when detected in blood (Liu et al, *PLoS ONE.* 2015; 10: e0127518; Koo et al, *Liver Int.* 2018; 38: 695-705)). These parameters are modifiable for an organ of user's interest in the TexSEC web application. 643 secretome biomarker candidates unavailable in the PAXdb for the organ specificity/ambiguity assessment were kept and finally 4,125 proteins were selected as liver secretome biomarker candidates to be merged with the list of proteins specifically related to the prognostic tissue transcriptome gene signatures.

Figure 2A:
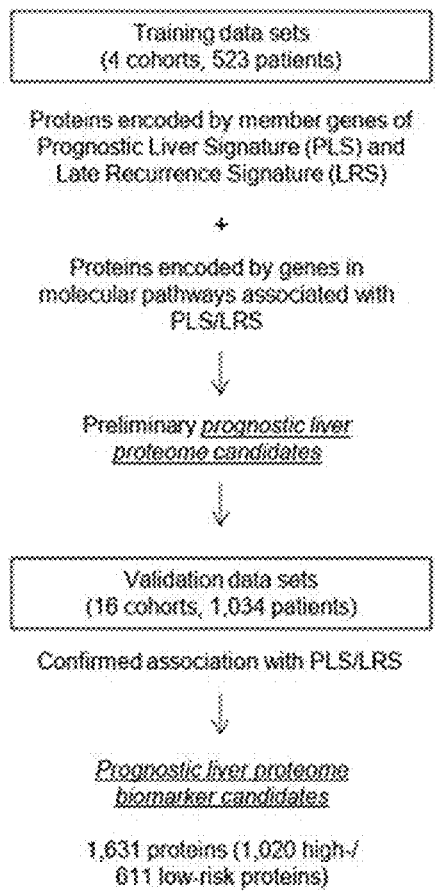
FIG. 2A depicts a representative schematic diagram illustrating an exemplary work-flow to derive prognostic liver proteome biomarker candidates according to aspects of the disclosure.

Derivation of prognostic liver proteome biomarker candidates. A previously defined 186-gene prognostic liver signature (PLS) and 132-gene late recurrence signature (LRS) [Hoshida et al., *N. Engl. J. Med.* 2008; 359: 1995-2004, the disclosure of which is incorporated herein in its entirety] was used as the source of tissue transcriptome signatures to be translated into blood secretome panel. (FIG. 2A). In addition to proteins encoded by the signature member genes, proteins in molecular pathways associated with the tissue transcriptome signature were considered as follows. To systematically identify relevant pathways in an unbiased manner across the major liver disease etiologies, 1,316 gene sets of well-defined molecular pathways from Molecular Signature Database (MSigDB, v6.2; Liberzon et al., *Cell Syst.* 2015; 1: 417-425) were surveyed using gene set enrichment analysis (Subramanian et al., *Proc. Natl. Acad. Sci. USA.* 2005; 102: 15545-15550) in the training datasets, including four independent cohorts of 523 chronic liver disease patients affected with hepatitis B virus (HBV), hepatitis C virus (HCV) (including resolved HCV), alcohol-related liver disease (ARLD), and non-alcoholic fatty liver disease (NAFLD) (FIG. 2A).

Figure 2B:
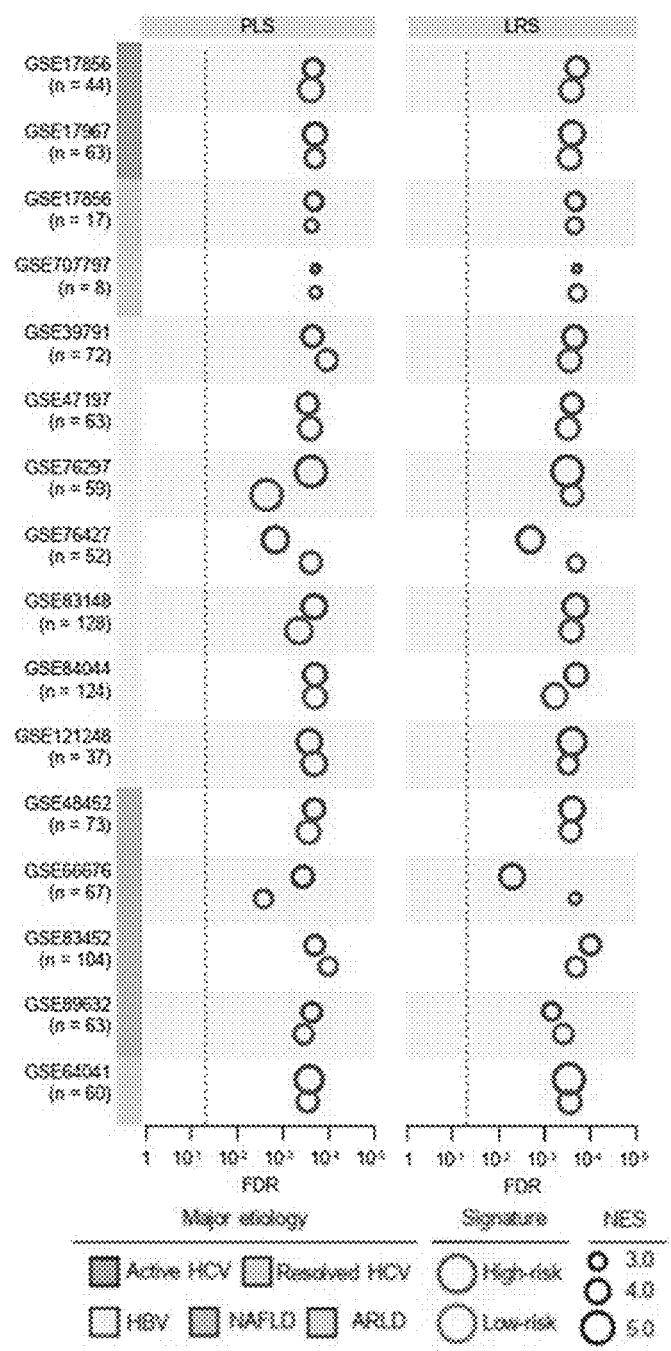
FIG. 2B depicts a representative graph illustrating validation of an exemplary prognostic liver proteome signature for association with tissue PLS/LRS status in validation data sets. Vertical dot lines indicate FDR of 0.05. As depicted, HCV represents hepatitis C virus; HBV represents hepatitis B virus; NAFLD represents non-alcoholic fatty liver disease; ARLD represents alcohol-related liver disease; PLS represents prognostic liver signature; LRS represents late recurrence signature; FDR represents false discovery rate; and NES represents normalized enrichment score.

Enrichment of each pathway gene set in each cohort was assessed on rank-ordered genes by correlation with that of the prognostic gene signature in each patient. The enrichment of each pathway gene set across the cohorts was synthesized using Fisher's inverse chi-square statistic, and 466 pathways showed association in the same direction with statistical significance (random permutation test-based false discovery rate <0.25). For each of the associated pathways, proteins encoded by leading-edge genes ((Subramanian et al., *Proc. Natl. Acad. Sci. USA.* 2005; 102: 15545-15550) contributing to the enrichment as well as their putative upstream signals were added to the list of candidate proteins. With proteins encoded by the tissue transcriptome signature genes themselves, 1,631 proteins (1,020 high- and 611 low-risk-associated proteins) were identified as prognostic liver proteome biomarker candidates, which were validated for their association with tissue PLS/LRS status in the validation datasets of 16 cohorts of 1,034 chronic liver disease patients (FIG. 2B).

Identification of prognostic liver secretome biomarker candidates. Finally, the intersection of the two lists of proteins, i.e., liver secretome biomarker candidates and prognostic liver proteome biomarker candidates, was used to derive prognostic liver secretome biomarker candidates, including 697 proteins (431 high- and 266 low-risk-associated proteins) proteins, for subsequent assay implementation.

Implementation and optimization of PLSec assay. Among the 697 prognostic liver secretome biomarker candidates, validated antibodies were available for allow for a multiplex assay for 43 proteins (41 high- and 2 low-risk-associated proteins), which were implemented in an FDA-approved multiplex clinical diagnostic technology, xMAP platform (Luminex), as an exemplary version of the PLSec assay, and run on the Bio-Plex 200 systems (Bio-Rad) according to the manufacturer's protocol. The abundance of each protein was measured as median fluorescent intensity (MFI) corrected for background signals from negative control probes and normalized to built-in dilution series of positive control probes as the standards in each 96-well assay plate, with which plate-to-plate adjustment of MFI values was performed. (See FIG. 1)

First assessed was the correlation between serum protein abundance and tissue gene signature status in the optimization set. The demographics of the patients in the exemplary optimization set are provided in Table 1.

TABLE 1

Demographics of Patients in Optimization Set

| Variable | (n = 79) |
|---|---|
| Age, median (IQR), y | 58 (52-64) |
| Male sex, No. (%) | 62 (78%) |
| Etiology, No. (%): HCV/HBV/other | 58/16/5 (73%/20%/7%) |
| Advanced fibrosis, No. (%) | 58 (91%) |
| AST, median (IQR), IU/L | 42 (25-67) |
| Platelet count, median (IQR), ×10³/μL | 134 (83-192) |
| AFP, median (IQR), ng/mL | 44 (12-218) |
| Time between HCC resection and serum collection, median | 92 (75-107) |

TABLE 1-continued

Demographics of Patients in Optimization Set

| Variable | (n = 79) |
|---|---|
| (IQR), days | |
| Clinical follow-up time, median (IQR), y | 7.5 (3.5-9.7) |
| Tissue-based high-risk PLS, No. (%) | 30 (38%) |

Figure 3A:
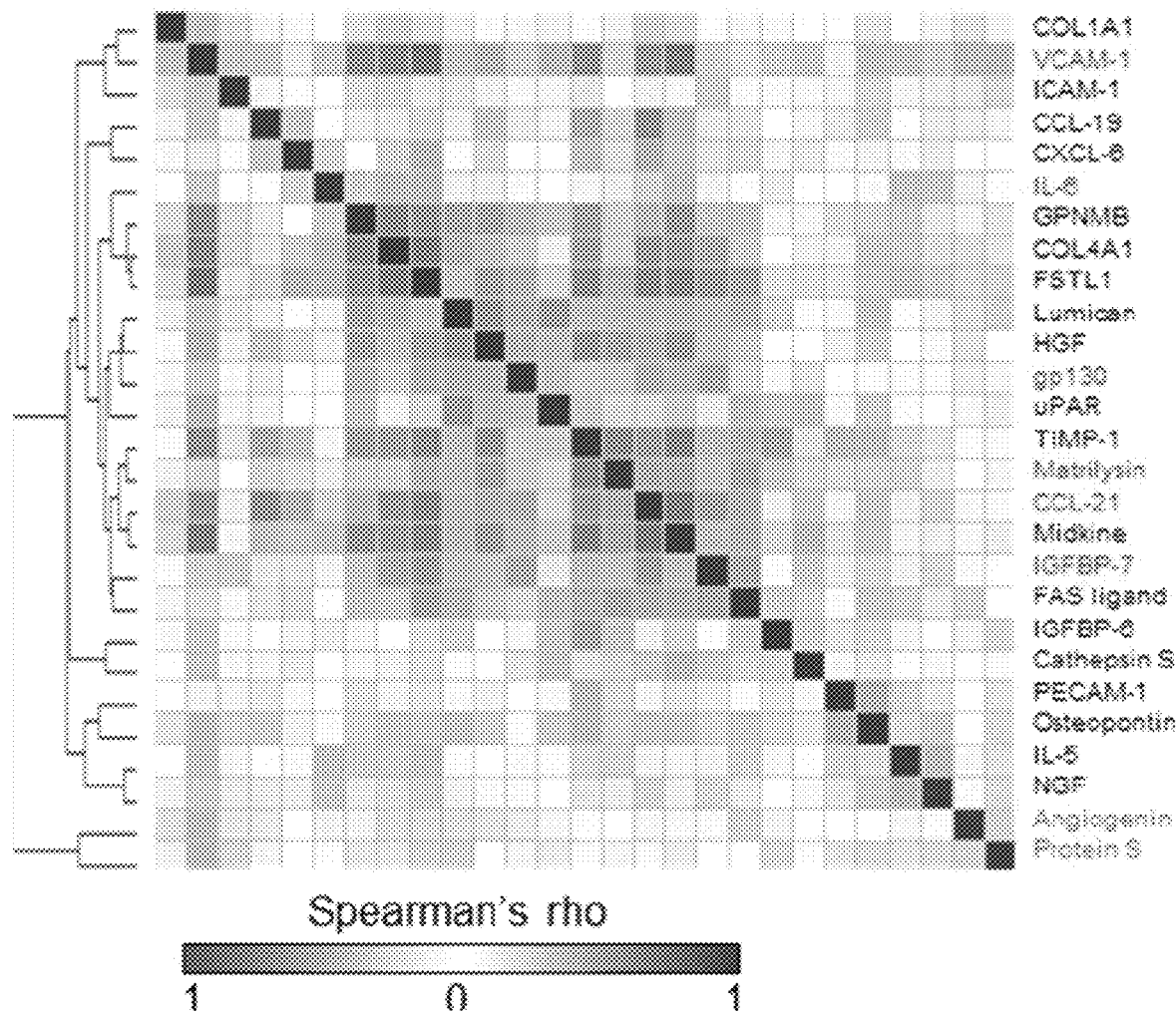
FIGS. 3A-3L depict representative images and graphs illustrating optimization of an exemplary PLSec protein panel.
Figure 3B:
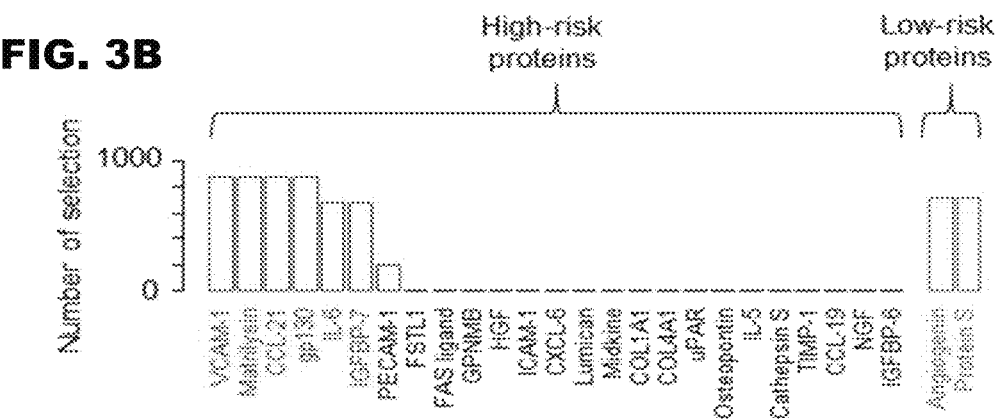
Figure 3C:
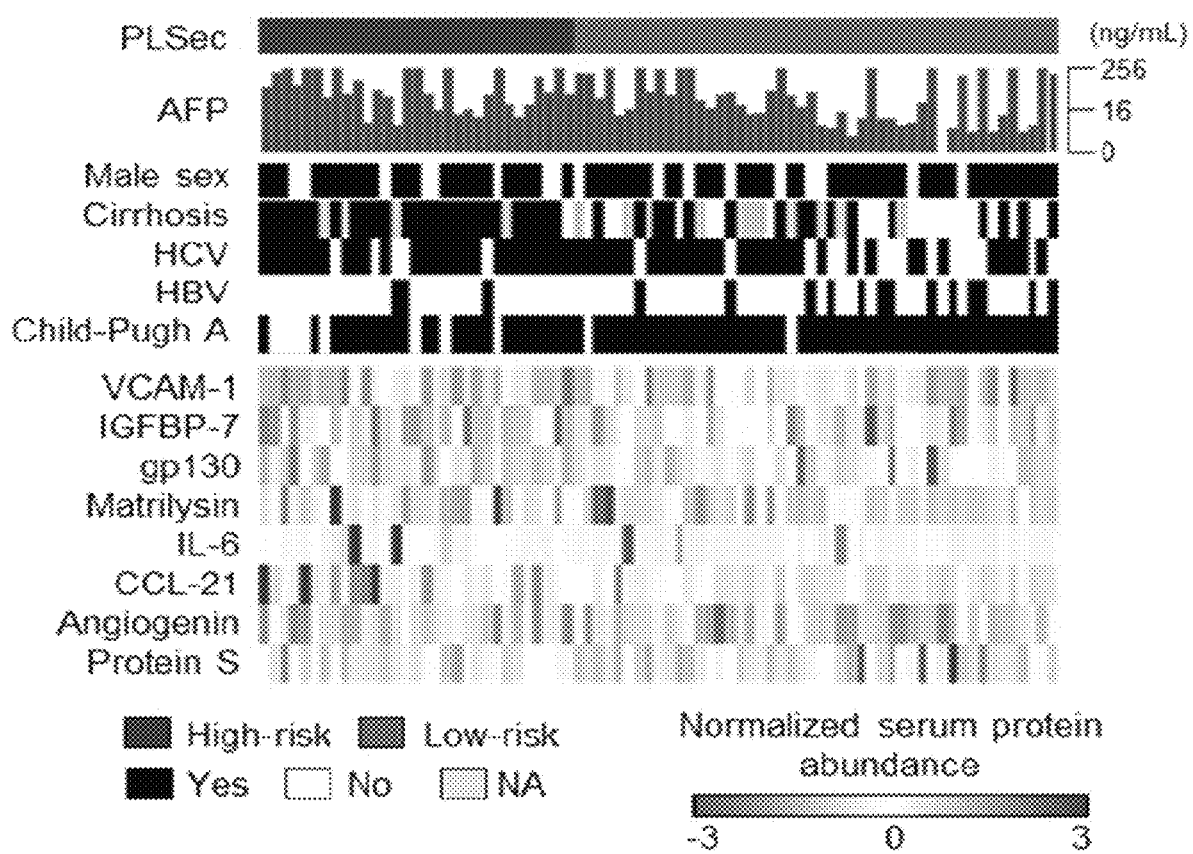

Among the 43 assayed proteins, the abundance of 27 proteins (63%) was significantly correlated with modulation of each of the high- or low-risk-associated genes in the hepatic transcriptome signatures (i.e., PLS and LRS) measured by Gene Set Enrichment Index based on single-sample-based signature enrichment analysis (eseach algorithm; Nakagawa et al., Cancer Cell. 2016; 30: 879-890) (Spearman correlation test, false discovery rate <0.25). Next, the correlation across the 27 proteins was evaluated in a correlation matrix, which revealed that there were several groups of proteins sharing a highly similar pattern of abundance across the patients (i.e., redundancy in captured information) in the optimization set (FIG. 3A). Because a larger number of assay probes generally make the development of clinical diagnostic assay more complex and costly due to increased burden of developing and validating the assay probes, an attempted to perform dimensionality reduction to shave the redundant probes without sacrificing the prognostic association was performed by using the least absolute shrinkage and selection operator (LASSO) algorithm (Friedman et al., J. Stat. Softw. 2010; 33: 1-22; Shi et al., Genomics. 2019; 111: 1839-1852). In brief, high- and low-risk-associated proteins were analyzed separately to resolve the redundancy within each direction of the prognostic association. The feature selection was repeated based on 10-fold cross-validation scheme 1,000 times and chose the most frequently selected 8 features, i.e., 6 high-risk-associated proteins (vascular cell adhesion molecule 1 [VCAM-1], insulin-like growth factor-binding protein 7 [IGFBP-7], gp130, matrilysin, interleukin-6 [IL-6], and C-C motif chemokine ligand 21 [CCL-21]), and 2 low-risk-associated proteins (angiogenin and protein S). The 8-protein secretome signature was termed "PLSec". (FIGS. 3B-3C and Table 2).

TABLE 2

Protein Secretome Signature was Termed (PLSec) Protein Panel

| Protein name | Uniprot ID | Gene symbol | Prognostic association | Correlations with PLS enrichment | | | Correlations with LRS enrichment | | |
|---|---|---|---|---|---|---|---|---|---|
| | | | | Spearman's rho | p | FDR | Spearman's rho | p | FDR |
| Vascular cell adhesion protein 1 | P19320 | VCAM1 | High-risk | 0.40 | <0.001 | 0.003 | 0.37 | 0.001 | 0.005 |
| Insulin-like growth factor-binding protein 7 | Q16270 | IGFBP7 | High-risk | 0.31 | 0.005 | 0.02 | 0.38 | 0.001 | 0.005 |
| gp130 | P40189 | IL6ST | High-risk | 0.24 | 0.04 | 0.09 | 0.21 | 0.06 | 0.14 |
| Matrilysin | P09237 | MMP7 | High-risk | 0.41 | <0.001 | 0.002 | 0.26 | 0.02 | 0.06 |
| Interleukin-6 | P05231 | IL6 | High-risk | 0.18 | 0.12 | 0.20 | 0.19 | 0.09 | 0.18 |
| C-C motif chemokine 21 | O00585 | CCL21 | High-risk | 0.47 | <0.001 | <0.001 | 0.46 | <0.001 | 0.001 |
| Protein S | P07225 | PROS1 | Low-risk | 0.40 | <0.001 | 0.001 | 0.38 | 0.001 | 0.001 |
| Angiogenin | P03950 | ANG | Low-risk | 0.21 | 0.06 | 0.06 | 0.25 | 0.03 | 0.03 |

Figure 3D:
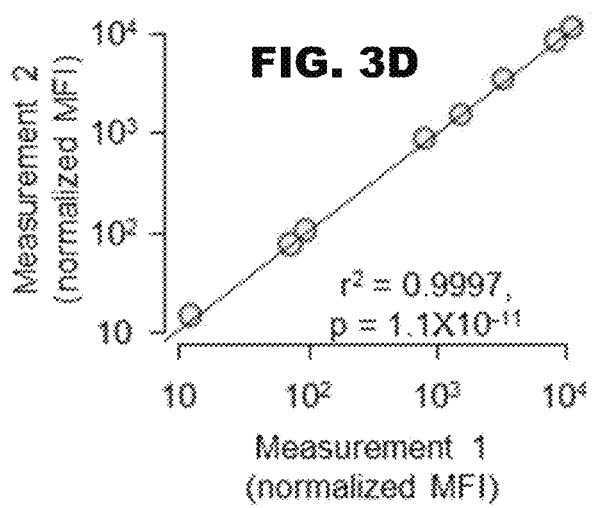
Figure 3E:
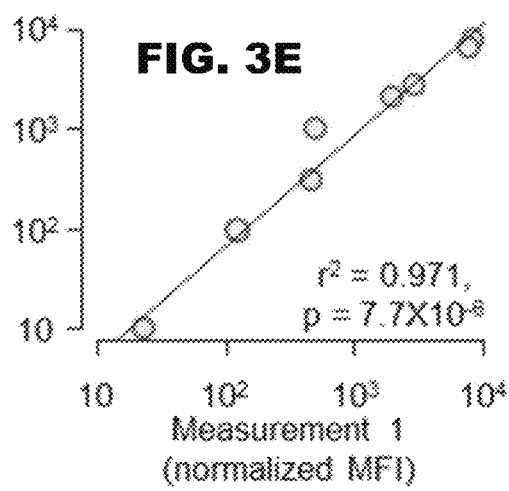

The technical validity of the assay was also evaluated. High within-plate reproducibility ($r^2=0.9997$, $p=1.1\times10^{-11}$), inter-plate/batch reproducibility ($r^2=0.971$, $p=7.7\times10^{-6}$) of technical replicates, and sensitivity of positive control proteins (99.9%±2.5%) was observed supporting reliable protein quantification with the assay platform as a clinical diagnostic test (FIGS. 3D and 3E). FIG. 3K demonstrates the sensitivity of Luminex assay used where the vertical bars indicate 95% confidence interval from the 10 batches at each dilution.

To use the PLSec assay to assist clinical decision making according to the predicted prognosis, the multi-analyte measurements were converted into a single value. In brief, to minimize the influence of the potential variation in the measurements and ensure the robust prognostic performance of the assay in a clinic, the continuous protein abundance values (i.e., normalized MFI) was converted into high or low abundance by top quartile cut-off in the optimization set, and calculated a semiquantitative score as follows:

$$2 + \sum_{i=1}^{8} \begin{pmatrix} 1 \text{ for high abundance of high risk protein} \\ -1 \text{ for high abundance of low risk protein} \\ 0 \text{ otherwise} \end{pmatrix} \text{ for probe } i$$

Figure 3F:
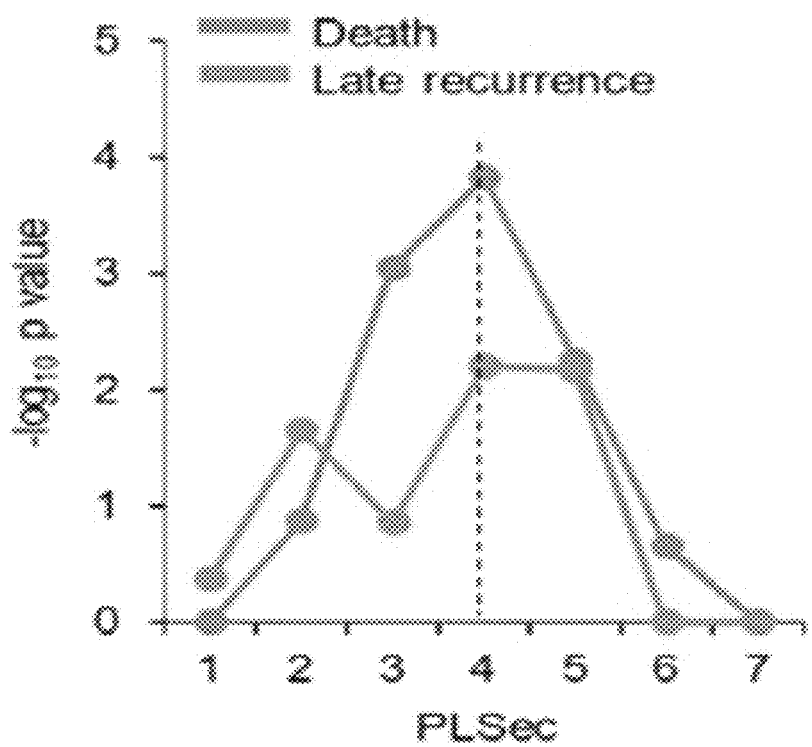
Figure 3G:
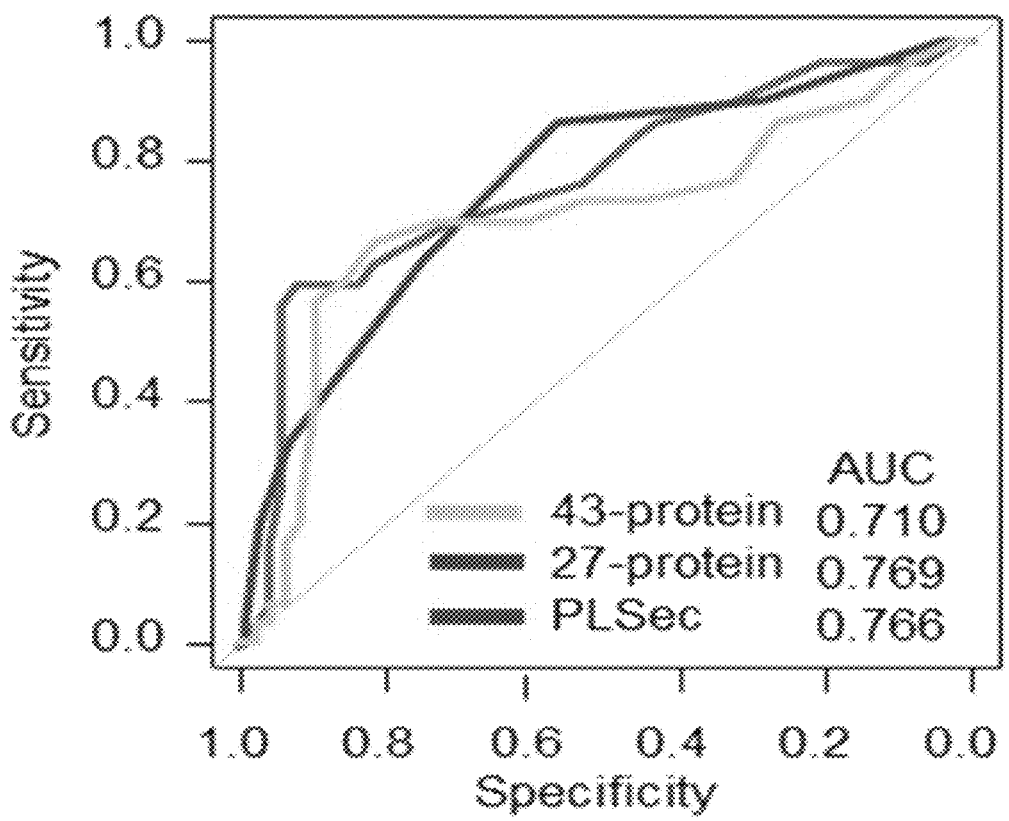
Figure 3H:
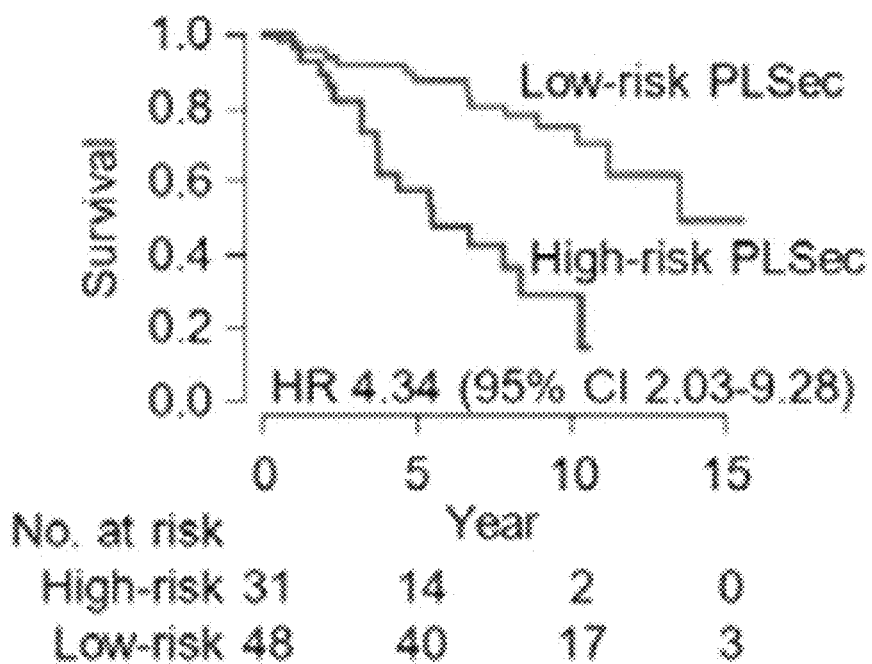
Figure 3I:
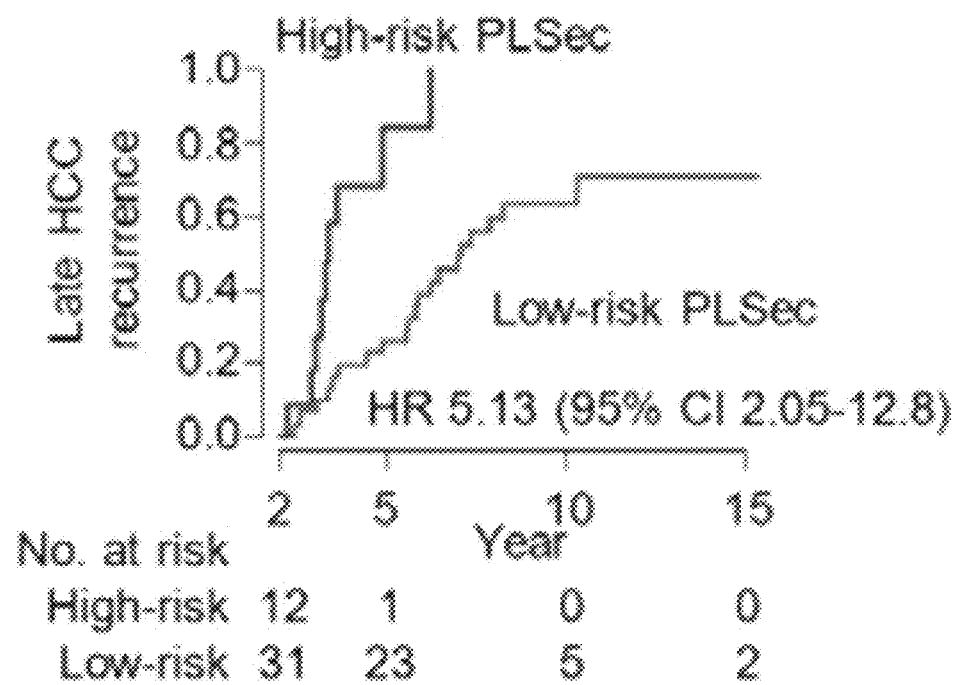
Figure 3J:
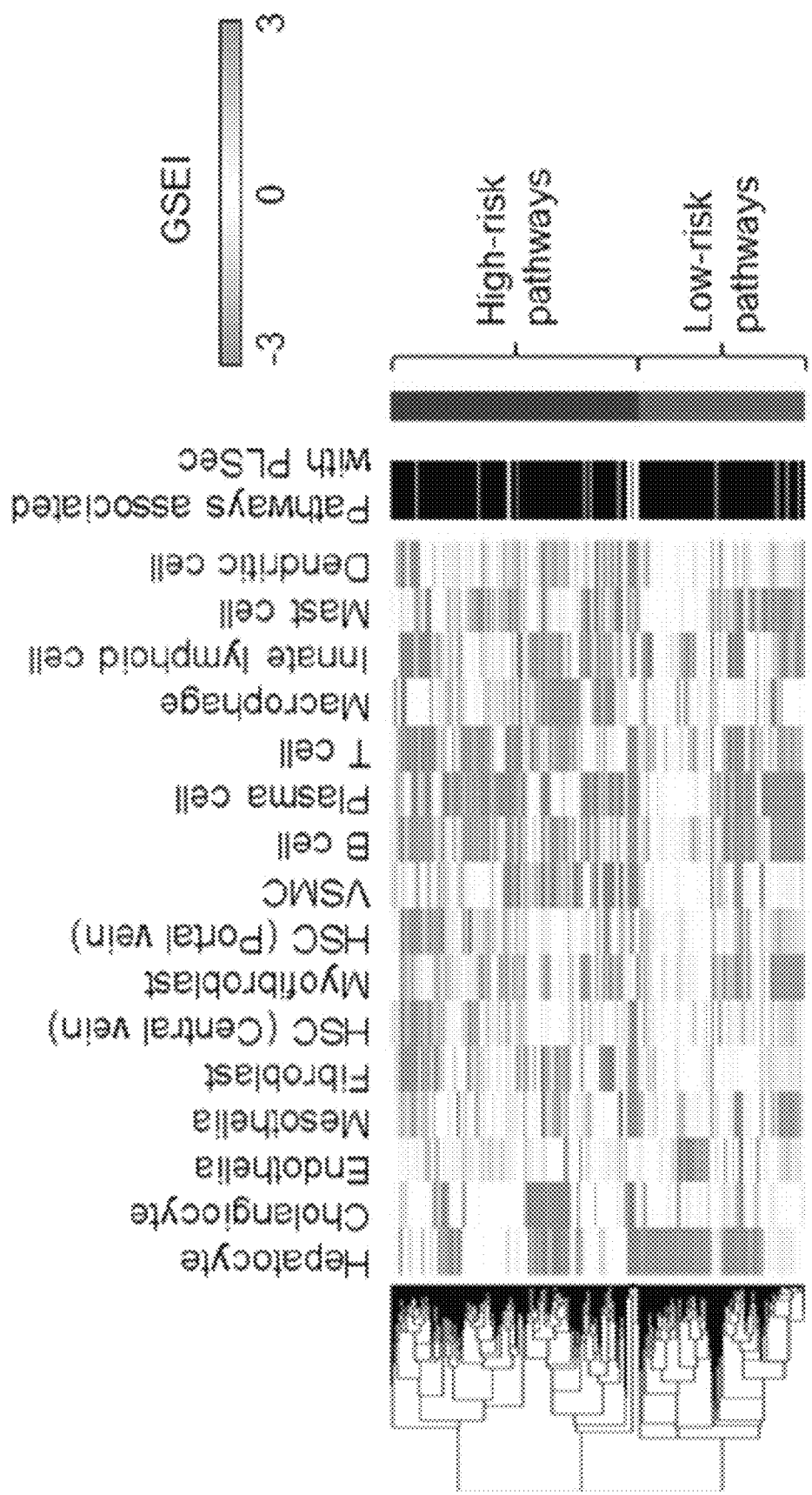
Figure 3K:
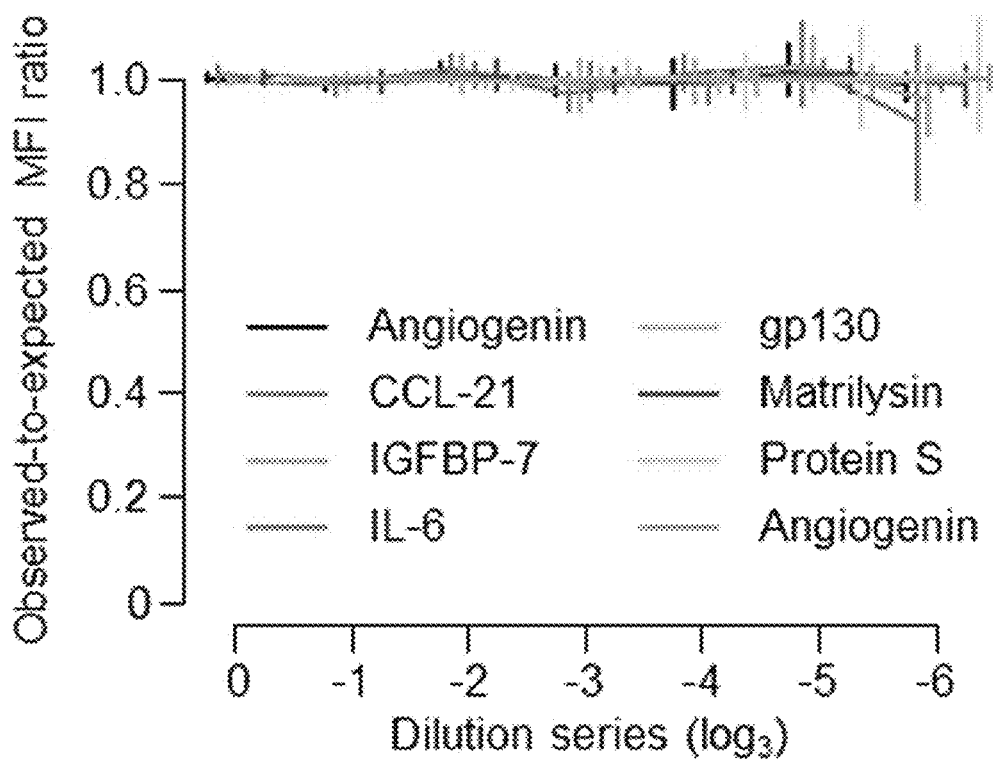
Figure 3L:
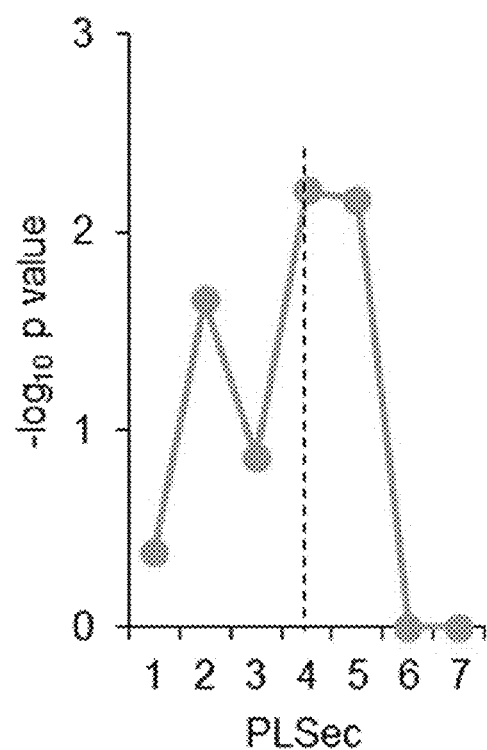

The cut-off value for the PLSec of 4 was chosen to maximize prognostic association for late recurrence based on log-rank test p value in the optimization set (FIGS. 3F and 3L). Assessment of area under receiver operating characteristic curve (AUC) to the risk prediction by the tissue-based PLS showed that the selection of the 27 proteins out of the 43 all assayed proteins improved performance of the panel as expected, and the reduction to 8 proteins with LASSO maintained the panel's performance (FIG. 3G). More importantly, significant prognostic associations for late recurrence were maintained (FIGS. 3H and 3I).

Lastly, the finally optimized 8-protein PLSec panel was assessed to determine if the panel recapitulated the full biological information associated with the original tissue-transcriptome-based gene signatures with regard to involved molecular pathways and cell types present in the liver. For the derivation of prognostic liver proteome biomarker candidates, 466 molecular pathway gene sets associated with the tissue transcriptome signatures were identified. In the genome-wide transcriptome dataset of the optimization set, genes were rank-ordered by Spearman's rank correlation (rho) with the PLSec score, and enrichment of the gene sets was assessed by Gene Set Enrichment Analysis (GSEA (Subramanian et al., *Proc. Natl. Acad. Sci. USA*. 2005; 102: 15545-15550)). 435 gene sets (93%) were enriched as observed for the tissue transcriptome signatures. Besides, in single-cell transcriptome data of three human cirrhotic livers (NCBI Gene Expression Omnibus, GSE136103 (Ramachandran et al., *Nature*. 2019; 575: 512-518)), induction of the 466 pathways across the cell types present in each liver was assessed by the eseach algorithm, which depicted involvement of diverse cell types, covering parenchymal, stromal, and infiltrating cell types (FIG. 3J). It was also confirmed that all of the involved cell types were recapitulated by the 8-protein PLSec panel. Thus, the 8-protein PLSec assay was technically validated and optimized, maintaining association with prognosis and relevant biological information for the original tissue-based transcriptome signatures. These results collectively supported that the PLSec assay was ready for subsequent clinical utility validation.

Example 2

In an exemplary method, PLSec was optimized based on recapitulation of prognostic hepatic transcriptome. The optimization set for PLSec included recapitulation of prognostic hepatic transcriptome and the least redundant information among the protein probes defined by the least absolute shrinkage and selection operator algorithm (Friedman et al., *J. Stat. Softw.* 2010; 33: 1-22) in a cohort of 79 chronic hepatitis/cirrhosis patients described in Hoshida et al., *N. Engl. J. Med.* 2008; 359: 1995-2004, the disclosure of which is incorporated herein in it's entirety. The serum samples were collected approximately 3 months (median 92 [IQR 75-107] days) after HCC resection to minimize the influence of surgical procedure and proteins released from HCC tumor. Late recurrence was defined as HCC tumor recurrence 2 years after the surgical resection of the primary HCC, is clonally independent. The follow-up time was defined as the interval between the date of blood collection and the primary endpoints (late recurrence) or the last observation date without the clinical events. For the time-to-HCC recurrence analyses, death without HCC recurrence was handled as a censoring.

Patients for validation of PLSec and a construction of PLSec-AFP. The optimized PLSec was first validated in an independent cohort of cirrhosis patients (validation set 1, cohort study) for its association with HCC risk. Subsequently, a composite score was developed with other clinical variables associated with HCC risk, which was further validated in two independent cohorts (validation set 2 [nested case-control series] and 3 [cohort study]) (FIG. 4; Table 3) utilizing a prospective specimen collection, retrospective blinded evaluation (PRoBE) design (Fujiwara et al., HEPATOCELLULAR CARCINOMA: TRANSLATIONAL PRECISION MEDICINE APPROACHES. Springer, 2019: 3-25). HCC was diagnosed based on histological or imaging-based examinations according to practice guidelines (Marrero et al., Hepatology. 2018; 68: 723-750; Kokudo et al., *Hepatol. Res.* 2019; 49: 1109-1113).

TABLE 3

Clinical Demographics of Validation Sets

| Variable | Demographics |
|---|---|
| Validation set 1 (n = 331): Cirrhosis with mixed etiology (prospective-retrospective cohort) | |
| Age (y) | 52 (47-57) |
| Male sex | 195 (59%) |
| Etiology: HCV/HBV/ARLD/NAFLD/cryptogenic/others | 161/13/94/20/39/42 (49%/4%/28%/6%/12%/13%) |
| Race/ethnicity: white/black/Hispanic/others | 311/9/8/3 (94%/3%/2%/1%) |
| Obesity | 140 (43%) |
| Diabetes | 76 (23%) |
| Active hazardous alcohol drinking | 34 (11%) |
| Albumin (g/dL) | 3.4 (2.9-3.8) |
| Total bilirubin (mg/dL) | 1.2 (0.8-1.9) |
| ALT (IU/L) | 49 (34-79) |
| Platelet count (×10³/uL) | 95 (67-136) |
| AFP (ng/mL) | 3.9 (2.3-7.9) |
| Child-Pugh class (A/B/C) | 122/179/25 (37%/55%/8%) |
| Follow-up time (y) | 4.5 (1.9-11.4) |
| Validation set 2 (n = 41:123): Resolved HCV hepatitis/cirrhosis (nested case-control series) | |
| Age (y) | 72 (62-77):72 (64-76) |
| Male sex | 23 (56%):69 (56%) |
| Cirrhosis | 30 (73%):92 (75%) |
| Obesity | 10 (24%):30 (25%) |
| Diabetes | 5 (12%):18 (15%) |
| Active hazardous alcohol drinking | 5 (14%):7 (6%) |
| HCV genotype 1 | 36 (88%):103 (84%) |
| DAA regimen: sofosbuvir-based | 11 (27%):48 (39%) |
| Albumin (g/dL) | 3.5 (3.4-3.7):3.5 (3.3-3.8) |
| Total bilirubin (mg/dL) | 0.9 (0.8-1.2):0.9 (0.8-1.3) |
| ALT (IU/L) | 20 (17-28):20 (15-28) |
| Platelet count (×10³/uL) | 116 (83-152):128 (97-162) |
| AFP (ng/mL) | 7.0 (4.0-12.0):6.0 (4.0-8.0) |
| Child-Pugh class (A/B) | 35/6 (85%/15%): 109/14 (87%/13%) |
| Follow-up time (y) | 1.1 (0.5-2.1):4.3 (4.0-4.6) |
| Validation set 3 (n = 146): Resolved HCV hepatitis/cirrhosis after HCC therapies (prospective-retrospective cohort) | |
| Age (y) | 73 (66-78) |
| Male sex | 66 (45%) |
| Cirrhosis | 117 (80%) |
| Obesity | 20 (14%) |
| Diabetes | 25 (18%) |
| Active hazardous alcohol drinking | 12 (9%) |
| HCV genotype 1 | 134 (92%) |
| DAA regimen: sofosbuvir-based | 30 (21%) |
| HCC AJCC stage I | 101 (69%) |
| HCC therapy: resection/ablation/TACE/SRBT | 43/100/3/2 (29%/68%/2%/1%) |
| Albumin (g/dL) | 3.6 (3.2-3.7) |
| Total bilirubin (mg/dL) | 0.9 (0.7-1.1) |

TABLE 3-continued

Clinical Demographics of Validation Sets

| Variable | Demographics |
|---|---|
| Platelet count (×10³/uL) | 115 (91-163) |
| ALT (IU/L) | 18 (14-24) |
| AFP (ng/mL) | 6 (4-10) |
| Child-Pugh class (A/B) | 132 (90%):14 (10%) |
| Follow-up time (y) | 2.9 (0.9-4.1) |

Validation set 1 (prospective—retrospective cohort): A total of 331 cirrhosis patients with mixed etiologies were consecutively and prospectively enrolled and regularly followed up using ultrasonography with AFP every 6 months for incident HCC for a median of 4.5 years (IQR, 1.9-11.4 years). During the clinical follow-up, 46 patients developed HCC. Time to HCC development was defined as the interval between the dates of PLSec assessment and HCC diagnosis or the last follow-up or death as a censored observation. HCC was diagnosed based on histological or imaging-based (contrast-enhanced multiphase CT and/or MRI) examinations according to the American Association of the Study of Liver Disease (AASLD) practice guideline (Marrero et al., *Hepatology*. 2018; 68: 723-750). Liver disease etiology was defined for each patient following the AASLD guidelines. Diagnosis of cirrhosis was based on liver histology or clinical-, laboratory-, and/or imaging-based evidence. Obesity was defined as body mass index (BMI) ≥30 kg/m² according to WHO criteria (*World Health Organ. Tech. Rep. Ser.* 1995; 854: 1-452). Diabetes was based on medical history or a 75-g oral glucose tolerance test. Active hazardous alcohol drinking was defined as alcohol consumption of 48 gram (g) per day for men and 24 g per day for women (Elmadhun and Sellke, *Clin. Lipidol.* 2013; 8: 5-8).

Validation sets for PLSec-AFP: Validation set 2 (nested case-control series): A total of 1,705 patients were consecutively treated with DAA for chronic hepatitis C and achieved SVR, defined as no HCV RNA detection at 24 weeks after DAA treatment (Ogata et al., *Oncology*. 2017; 93:92-98). Serum samples collected at 4 weeks after DAA treatment completion from 1,688 patients were available for the PLSec assessment. All patients were regularly screened for incident HCC with ultrasonography along with AFP and des-gamma-carboxy prothrombin every 3-6 months after completion of DAA treatment. Time to HCC development was defined as the interval between the dates of PLSec assessment and HCC diagnosis or the last follow-up or death as a censored observation. During a median follow-up of 4.3 years (IQR, 4.0-4.6 years), 41 patients developed HCC and were designated as cases. From the rest of the patients, 123 patients were selected as controls (HCC-free for at least 3.7 years) using the propensity score matching for age at DAA initiation, sex, and presence of cirrhosis using MatchIt R package (1:3 matching) (Table 3). HCC diagnosis was based on the Japan Society for Hepatology practice guidelines (Kokudo et al., *Hepatol. Res.* 2019; 49: 1109-1113). Obesity was defined as BMI≥25 kg/m² according to the Asian-Pacific criteria (pan and Yeh, *Asia Pac. J. Clin. Nutr.* 2008; 17: 370-374). Active hazardous alcohol drinking was defined by alcohol consumption at the PLSec assessment of 40 g per day for men and 20 g per day for women (Osaki et al., *Alcohol Alcohol.* 2016; 51: 465-473). High AFP was defined by 5.5 ng/mL (Carrat et al., *Lancet*. 2019; 393: 1453-1464; Nagata et al., *J. Hepatol*. 2017; 67: 933-939).

Validation set 3 (prospective—retrospective cohort): A total of 146 patients were consecutively treated with DAA and achieved SVR after confirming complete response to HCC treatment. The patients were diagnosed for early-stage HCC (American Joint Committee of Cancer, T1/2 tumor without extrahepatic lesion) and received HCC treatment (surgical resection, thermal ablation, transarterial chemoembolization, or stereotactic body radiation therapy). The absence of residual tumor was histologically (as no microscopic tumor cells at/near surgical resection margin) and/or radiologically (as no enhanced lesion with contrast-enhanced multiphase CT and/or MRI) confirmed before initiating DAA therapy. Patients who had HCC recurrence during DAA treatment were excluded. Blood samples were collected at 4 weeks after DAA treatment completion and used for the PLSec assessment. All patients were regularly followed up for HCC recurrence with multiphase CT and/or MRI every 3-4 months. Time to HCC development was defined as the interval between the dates of PLSec assessment and HCC diagnosis or the last follow-up or death as a censored observation. During a median follow-up of 2.9 years (IQR, 0.9-4.1 years), 65 patients developed HCC recurrence. At the date of PLSec assessment, the patients were already recurrence-free for a median of 1.5 years (IQR, 0.9-3.2 years) since the previous HCC treatment, therefore the observed recurrences are assumed to be dominantly de novo HCC recurrence. HCC diagnosis as well as the determination of cirrhosis, obesity, diabetes, active hazardous alcohol drinking, and high AFP was similarly performed as in the validation set 2.

Example 3

Figure 4:
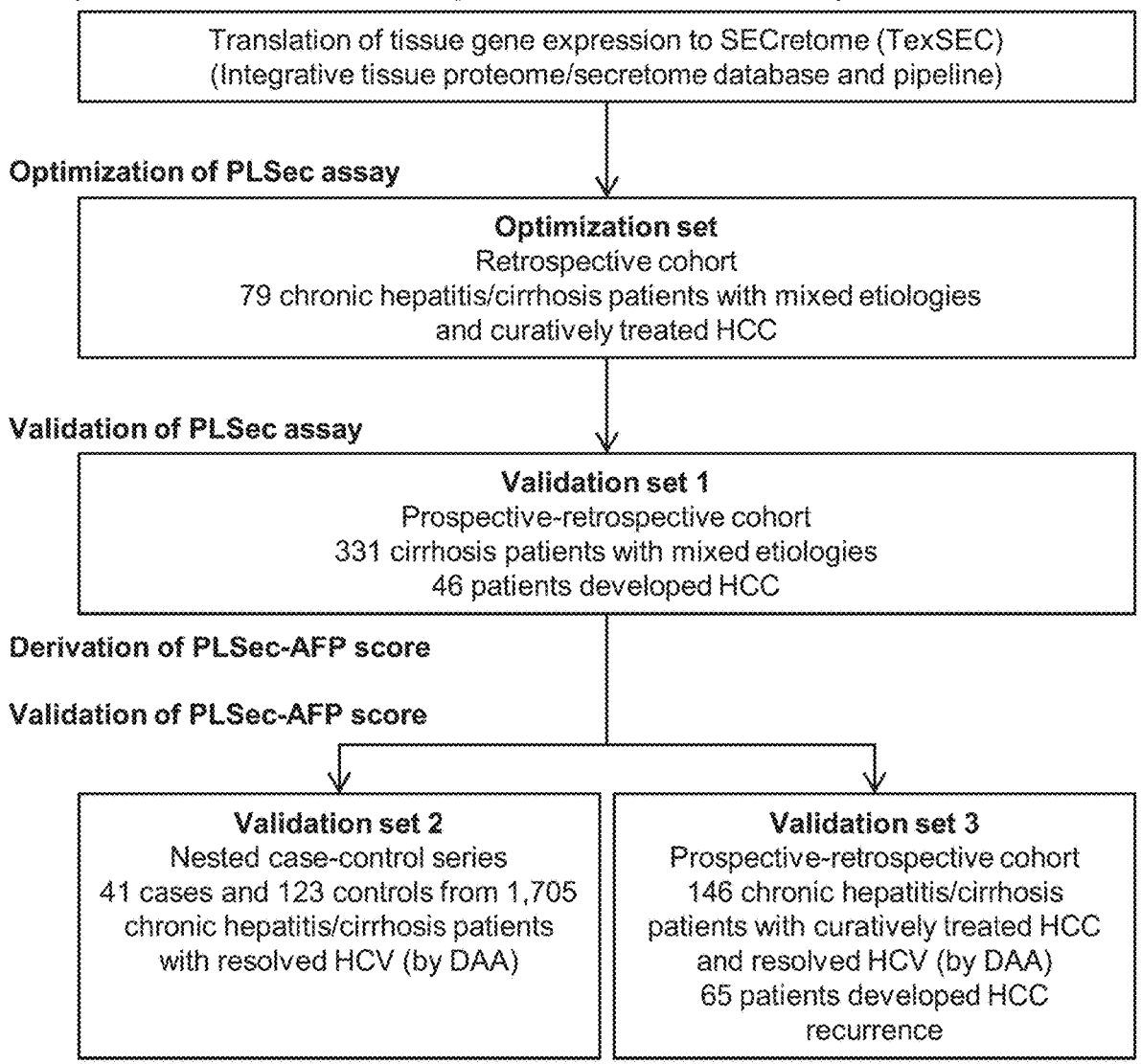
FIG. 4 depicts a representative schematic diagram illustrating an exemplary study design to derive a serum-protein-based PLSec from validated hepatic transcriptome signatures. As depicted, "AFP" represents a-fetoprotein; "DAA" represents direct-acting antiviral; "HCC" represents hepatocellular carcinoma; "HCV" represents hepatitis C virus; and "PLSec" represents prognostic liver secretome signature.

In an exemplary method, PLSec was derived as a blood-based long-term HCC risk biomarker. The exemplary computational pipeline described herein identified 43 candidate serum proteins for which validated antibodies are available for quantitative multiplex assessment (FIG. 4). This exemplary panel included proteins that were previously reported as potential HCC risk biomarkers (e.g., interleukin-6 (IL-6 (Nakagawa et al., *J. Gastroenterol. Hepatol.* 2015; 30: 379-388)), osteopontin (Sun et al., *Medicine* (Baltimore). 2018; 97: e12954), and midkine (Zhang et al., *PLoS ONE*. 2019; 14: e0223514)), supporting the validity of the unbiased secretome biomarker derivation pipeline. Based on the association with the prognostic tissue transcriptome and the least information redundancy among the probes in the optimization set, 6 high-risk-associated serum proteins were ultimately selected, including vascular cell adhesion molecule 1 (VCAM-1), insulin-like growth factor-binding protein 7 (IGFBP-7), gp130, matrilysin, IL-6, and C-C motif chemokine ligand 21 (CCL-21), and 2 low-risk-associated serum proteins, angiogenin and protein S (FIGS. 3A-3C). Observed was high within-plate reproducibility ($r^2$=0.9997, p=1.1×10$^{-11}$), inter-plate/batch reproducibility ($r^2$=0.971, p=7.7×10$^{-6}$) of technical replicates, and sensitivity for positive control proteins (99.9%±2.5%), supporting the assay reliability as a clinical test (FIGS. 3D and 3E). The normalized protein abundance measurements were converted into an aggregated score, called PLSec, and a cutoff of was defined to identify patients with a high-risk prediction in the optimization set (FIGS. 3F-3I). PLSec recapitulated 93% of dysregulated molecular pathways and all involved cell types associated with the original tissue transcriptome signatures (FIG. 3J), indicating that PLSec conveyed equivalent biological information as the PLS.

Example 4

Figure 5A:
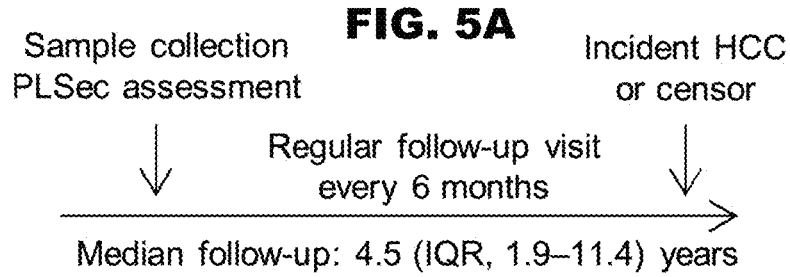
Figure 5B:
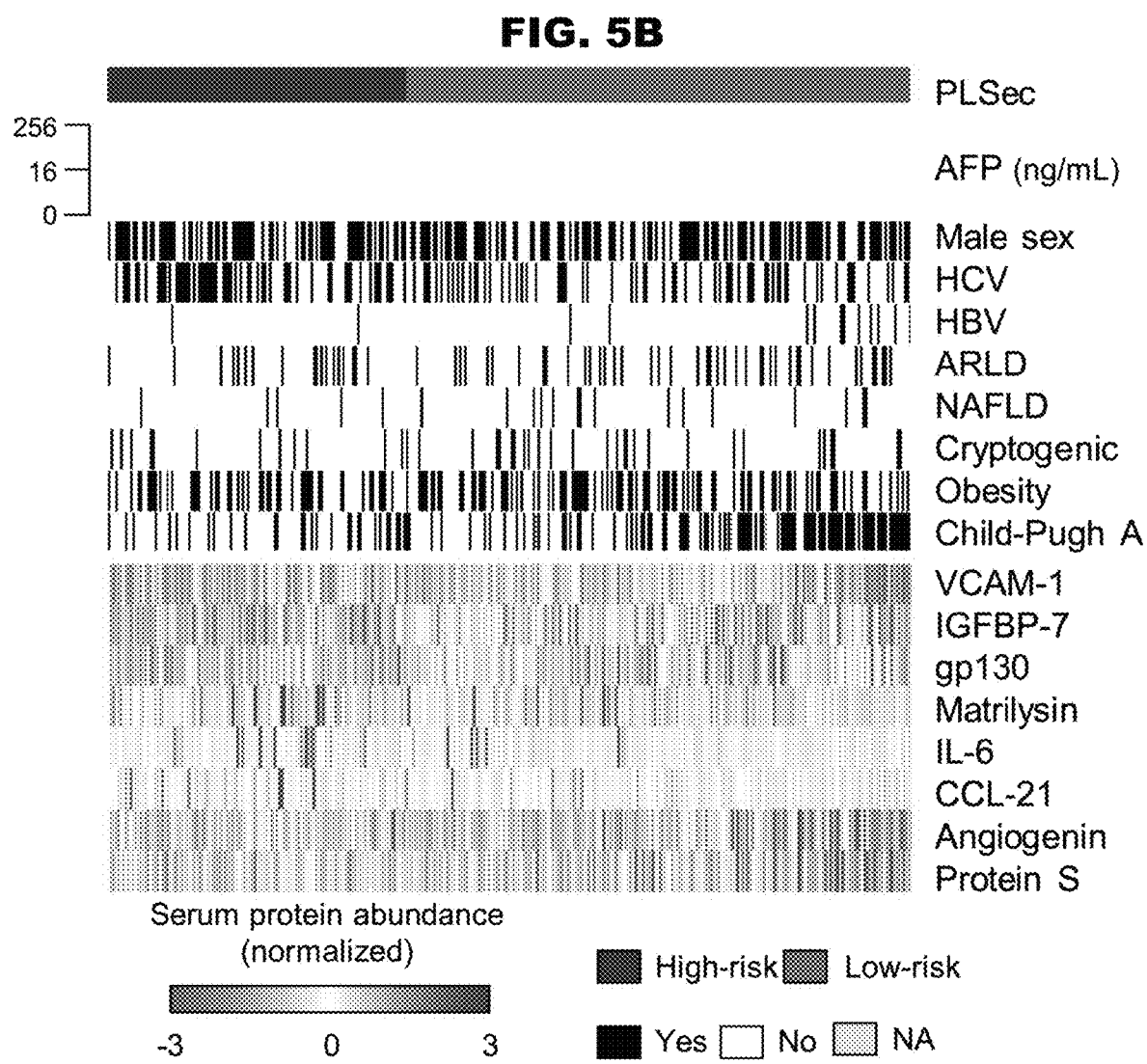
Figure 6A:
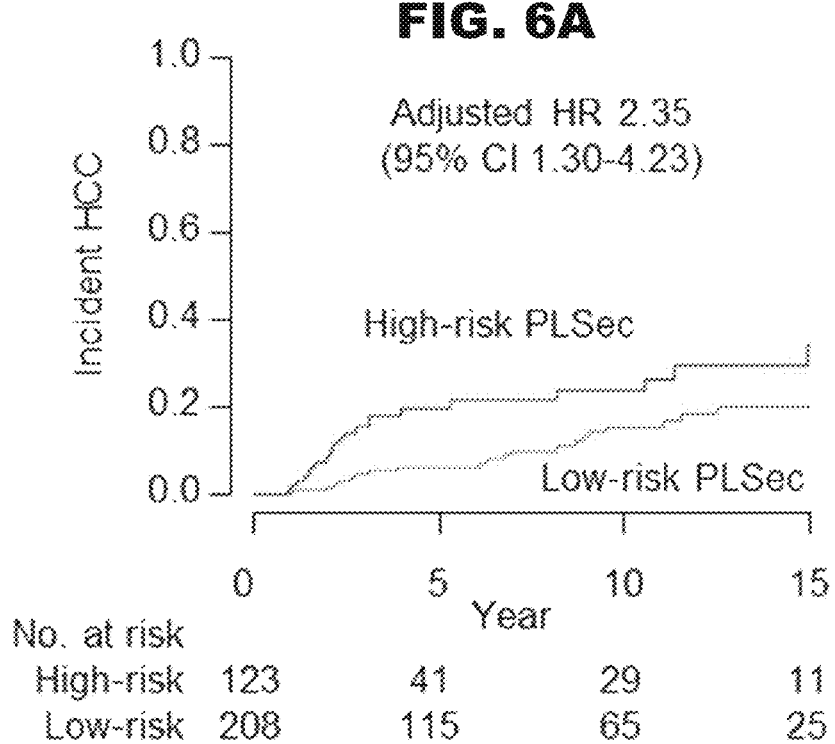
FIGS. 6A-6H depict representative graphs illustrating prognostic associations of PLSec-AFP, PLSec, and AFP in validation sets 1-3.

In an exemplary method, Validation of PLSec assay in validation set 1 (V1) assessed incident HCC risk in patients with cirrhosis. Among 331 cirrhosis patients from various etiologies, PLSec was significantly associated with incident HCC (adjusted hazard ratio [aHR], 2.35; 95% confidence interval [CI], 1.30-4.23; p=0.004) (FIGS. 5A-5B and FIG. 6A). The association with HCC risk remained similar when death and liver transplantation were considered as competing risks (adjusted sub-distribution HR, 1.91; 95% CI, 1.07-3.41). Annual HCC incidence rates in low-risk (n=208) and high-risk (n=123) patients were 1.5 and 3.6/100 person-years, respectively. HCC incidence at 5 and 10 years was 6.2% and 15.7% among low-risk patients, compared to 19.5% and 23.9% among high-risk patients, respectively.

Derivation of PLSec-AFP score in V1. Among the available clinical variables, AFP was also associated with HCC risk (aHR, 1.38; 95% CI, 1.14-1.68) independent of PLSec (Table 4), consistent with evidence that AFP can be a future HCC risk marker (reflecting chronic hepatocyte injury and proliferation without HCC (Hughes et al., *Clin. Gastroenterol. Hepatol.* 2021; 19: 162-170.e4)), especially after hepatitis C virus (HCV) cure (Fujiwara et al., *J. Hepatol.* 2018; 68: 526-549), as well as an early detection marker (Marrero et al, *Hepatology.* 2018; 68: 723-750). If elevated AFP was attributable to the presence of malignant cells that were still clinically undetectable, then it was expected that the very early subclinical HCC nodule would grow and become detectable in a few years given the anticipated tumor doubling time at ~5 months (Rich et al., *Hepatology.* 2020; 72: 1654-1665).

TABLE 4

Univariable and Multivariable Analyses in Validation Set 1 (multi-etiology cirrhosis cohort).

| Variable | No. (%) | Univariable HR (95% CI) | p value | Multivariable HR (95% CI) | p value |
|---|---|---|---|---|---|
| PLSec | | | | | |
| As continuous | — | 1.25 (1.06-1.48) | 0.009 | 1.19(1.01-1.41) | 0.04 |
| High risk defined as ≥ 4 | 123 (37%) | 2.33 (1.30-4.18) | 0.004 | | |
| Age | — | 1.02 (0.99-1.06) | 0.24 | | |
| Sex male | 195 (59%) | 1.31 (0.71-2.40) | 0.39 | | |
| Race/ethnicity (vs. black) | | | | | |
| White | 311 (94%) | 0.25 (0.06-1.06) | 0.06 | | |
| Hispanic | 8 (2%) | 4.70 × 10$^{-8}$ (0-Inf) | 1.00 | | |
| Others | 3 (1%) | 0.94 (0.08-10.5) | 0.96 | | |
| Etiology | | | | | |
| HCV | 123 (37%) | 1.38 (0.77-2.46) | 0.28 | | |
| HBV | 13 (4%) | 0.39 (0.05-2.87) | 0.36 | | |
| ARLD | 60 (18%) | 1.14 (0.55-2.37) | 0.72 | | |
| NAFLD | 20 (6%) | 0.87 (0.27-2.81) | 0.81 | | |
| Cryptogenic | 39 (12%) | 0.83 (0.30-2.31) | 0.71 | | |
| Others | 76 (23%) | 0.77 (0.36-1.65) | 0.50 | | |
| Obesity | 140 (42%) | 0.76 (0.42-1.38) | 0.37 | | |
| Active hazardous alcohol drinking | 34 (11%) | 0.45 (0.11-1.88) | 0.28 | | |
| Diabetes | 76 (23%) | 0.60 (0.27-1.35) | 0.22 | | |
| Child-Pugh class B or C (vs. A) | 204 (63%) | 1.51 (0.82-2.77) | 0.19 | | |
| FIB-4 ≥ 3.25 (vs. <3.25) | 225 (69%) | 1.84 (0.93-3.64) | 0.08 | | |
| Platelet count (×10$^3$/μL) | | | | | |
| As continuous | | 0.998 (0.99-1.00) | 0.40 | | |
| <140 × 10$^3$/μL | 250 (76%) | 1.20 (0.61-2.38) | 0.60 | | |
| <100 × 10$^3$/μL | 176 (54%) | 1.29 (0.71-2.34) | 0.40 | | |
| <80 × 10$^3$/μL | 118 (36%) | 1.56 (0.87-2.81) | 0.14 | | |
| AST (IU/L) | | | | | |
| As continuous | | 1.003 (0.99-1.01) | 0.11 | | |
| >40 IU/L | 255 (77%) | 1.52 (0.70-3.27) | 0.29 | | |
| >100 IU/L | 70 (21%) | 1.48 (0.75-2.93) | 0.26 | | |
| ALT (IU/L) | | | | | |
| As continuous | | 1.003 (0.99-1.01) | 0.32 | | |
| >40 IU/L | 216 (65%) | 0.95 (0.52-1.76) | 0.88 | | |
| >100IU/L | 58 (18%) | 1.48 (0.75-2.93) | 0.26 | | |
| AFP | | | | | |
| As continuous | | 1.004 (1.00-1.01) | 0.008 | | |

Figure 5C:
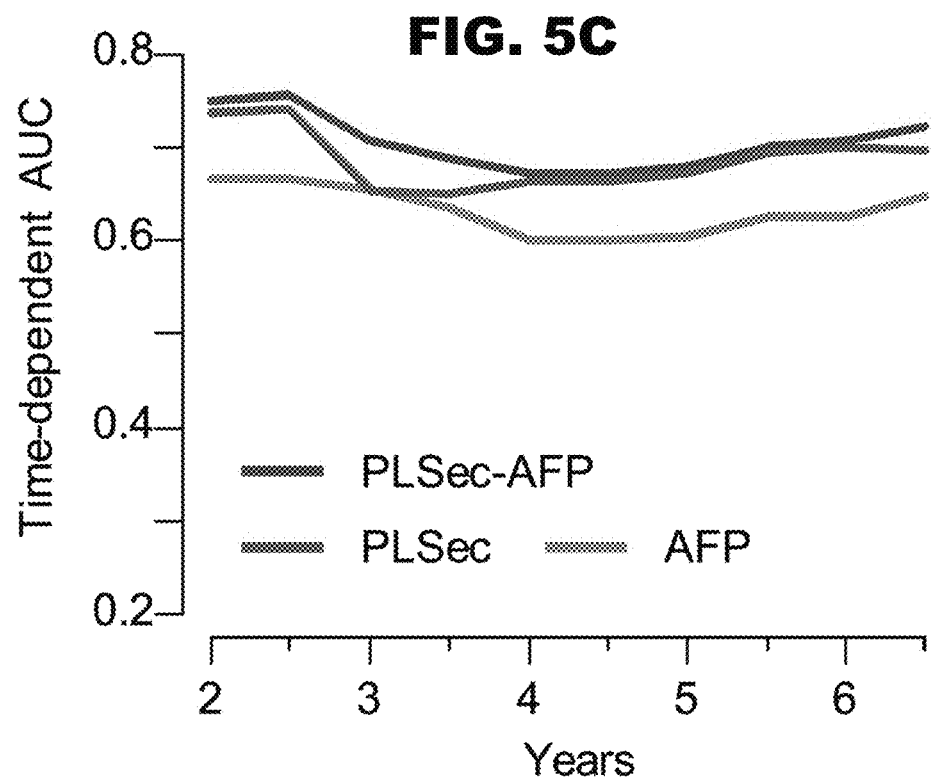
Figure 6B:
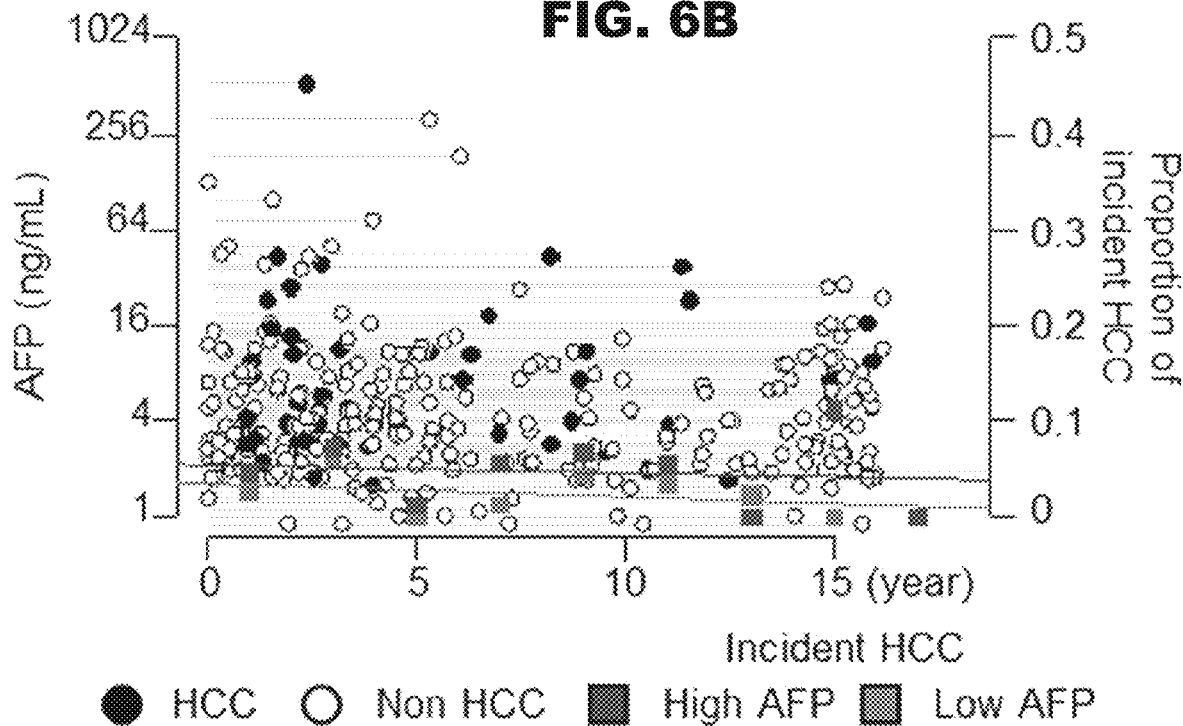
Figure 6C:
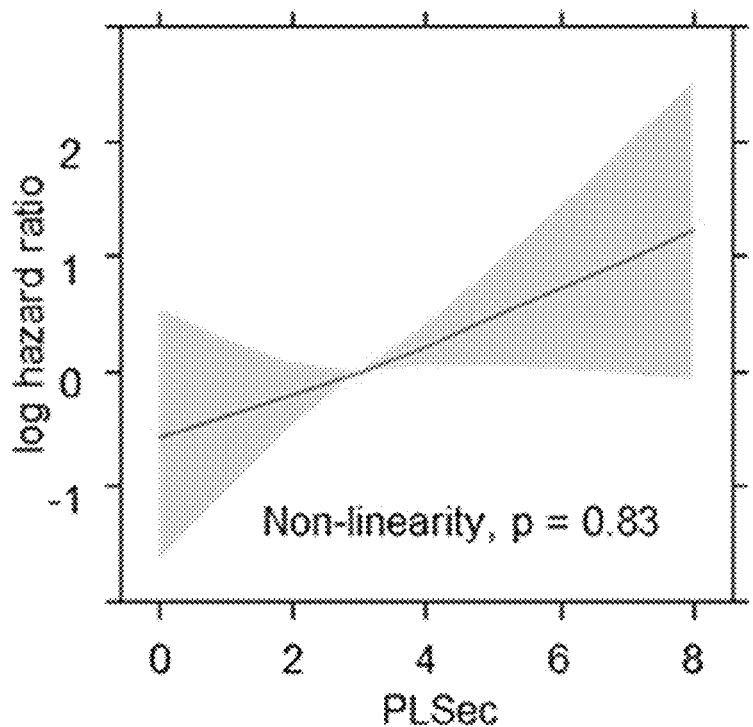
Figure 6D:
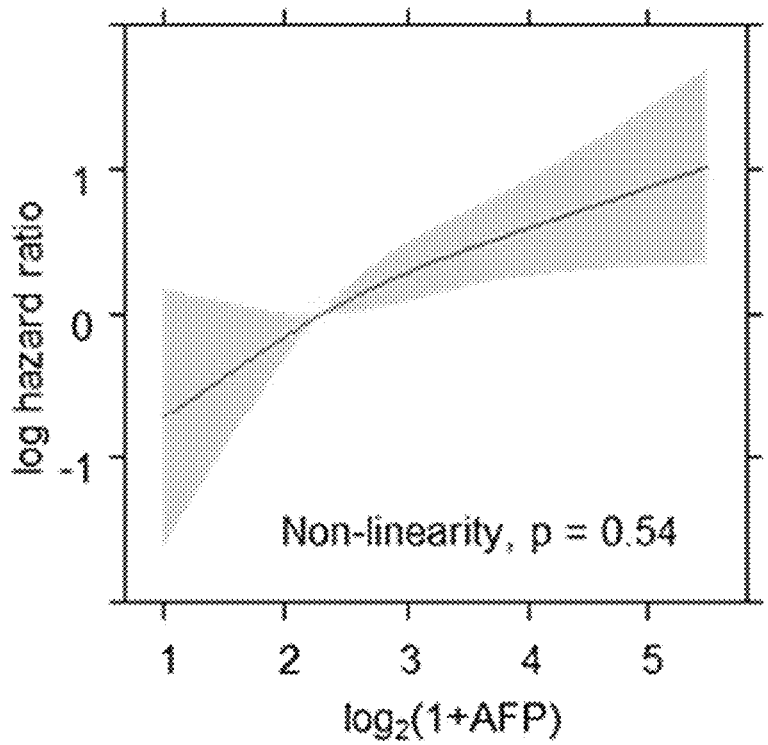

In this cohort, the proportion of HCC incidence was consistent throughout the 17 years of follow-up irrespective of AFP levels, suggesting that AFP elevation in this cohort was more likely attributable to the carcinogenesis-permissive hepatic tissue microenvironment ("field effect") rather than an undetectable subclinical tumor (FIG. 6B). High-risk PLSec was associated with HCC risk even in patients with low AFP (<5 ng/mL) (n=199; aHR, 3.49; 95% CI, 1.40-8.72). The aHRs of high AFP (5 ng/mL) for viral and non-viral etiologies were 1.52 (95% CI, 0.64-3.61) and 3.50 (95% CI, 1.34-9.12), respectively. By incorporating AFP, integrated PLSec-AFP score was developed (FIGS. 6C and 6D), which was significantly associated with HCC risk (aHR, 2.71; 95% CI, 1.69-4.33; p<0.001) and demonstrated better predictive performance than either variable alone (c-indices for PLSec-AFP, PLSec, and AFP were 0.73, 0.69, and 0.66, respectively) (FIG. 5C; Table 5).

Figure 5D:
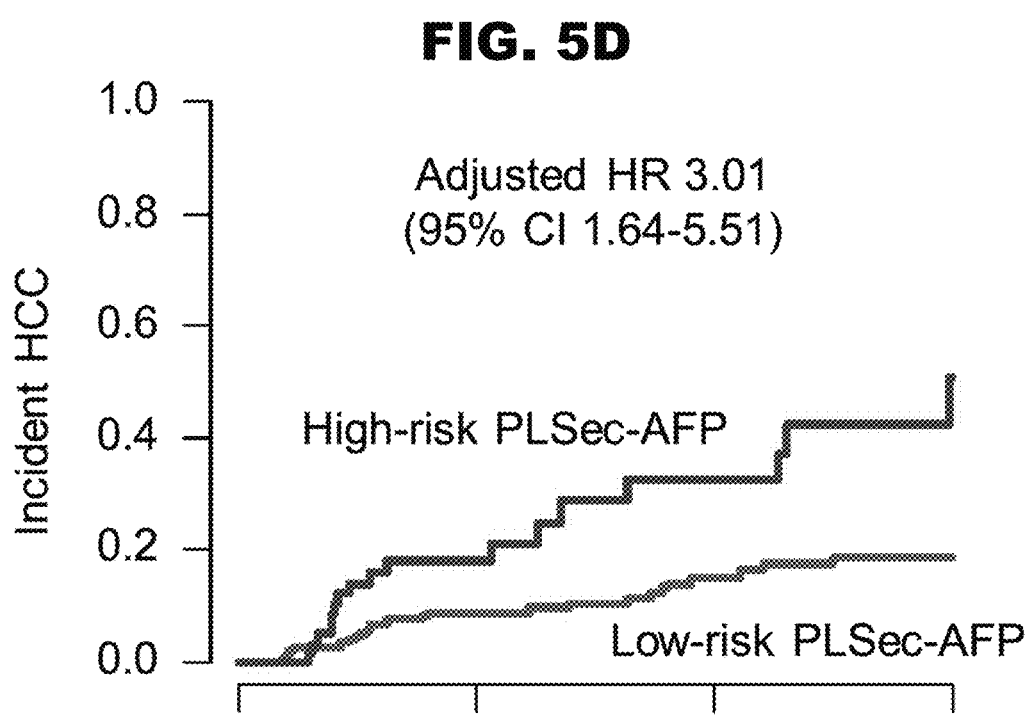

Subsequently, a cutoff of 1.66 was defined to classify low versus high risk. Annual HCC incidence rates in low-risk (n=252) and high-risk (n=79) patients were 1.5 and 4.8/100 person-years, respectively. HCC incidence rates at 5 and 10 years were 8.8% and 15.2% among low-risk patients, respectively, compared to 18.1% and 32.7% among high-risk patients (aHR, 3.01; 95% CI, 1.64-5.51; p<0.001; FIG. 5D). PLSec-AFP was well calibrated over time (FIG. 5E) and showed robust prognostic association after adjustment for other clinical variables (Table 6).

TABLE 6

Association of High-Risk PLSec-AFP with Incident HCC After Various Adjustment

| Cohort | Unadjusted HR or OR | 95% CI | Model 1 Adjusted HR or OR | 95% CI | Model 2 Adjusted HR or OR | 95% CI | Model 3 Adjusted HR or OR | 95% CI | Model 4 Adjusted HR or OR | 95% CI |
|---|---|---|---|---|---|---|---|---|---|---|
| Validation set 1 (n = 331): Cirrhosis with mixed etiology (prospective-retrospective cohort) | | | | | | | | | | |
| Overall | 2.96 | (1.64-5.35) | 3.01 | (1.64-5.51) | 2.90 | (1.61-5.25) | 2.65 | (1.43-4.91) | 2.71 | (1.44-5.12) |
| Validation set 2 (n = 41:123): Resolved HCV hapatitis/cirrhosis (nested case-control series) | | | | | | | | | | |
| Overall | 3.85 | (1.70-8.71) | 3.80 | (1.66-8.66) | 3.92 | (1.70-9.03) | 3.91 | (1.70-8.95) | 3.95 | (1.67-9.35) |
| Cirrhosis | 3.15 | (1.31-7.62) | 3.12 | (1.27-7.65) | 3.13 | (1.26-7.74) | 3.22 | (1.31-7.91) | 3.09 | (1.21-7.87) |
| Validation set 3 (n = 146): Resolved HCV hepatitis/cirrhosis after HCC therapies (prospective-retrospective cohort) | | | | | | | | | | |
| Overall | 3.00 | (1.78-4.74) | 3.08 | (1.78-5.31) | 2.58 | (1.54-4.34) | 3.03 | (1.43-4.91) | 2.79 | (1.52-5.12) |
| Cirrhosis | 2.96 | (1.74-5.16) | 3.44 | (1.86-6.36) | 2.61 | (1.48-4.63) | 3.10 | (1.43-4.91) | 3.10 | (1.58-6.05) |

PLSec-AFP of ≥1.66 was defined as high-risk. In validation set 2, ORs were adjusted for the following variables in each model with conditioning on the pairs of cases and the matched controls. Model 1, age (as continuous), sex, obesity, diabetes, and active hazardous alcohol drinking in validation set 1 and 3 and obesity, diabetes, and active hazardous alcohol drinking in validation set 2. Model 2, Child-Pugh class (A vs. B or C). Model 3, FIB-4 index (≥3.25 vs. <3.25). Model 4, All variables. PLSec, prognostic liver secretome signature; AFP, alpha-fetoprotein; HCC, hepatocellular carcinoma; HR, hazard ratio; OR, odds ratio; CI, confidence interval; HCV, hepatitis C virus.

TABLE 5

Association of PLSec and PLSec-AFP Score with Future HCC Incidence.

| Variable | Adjusted HR or OR* | 95% CI | p-value |
|---|---|---|---|
| Validation set 1 (331 consecutive patients): Cirrhosis with mixed etiology (prospective-retrospective cohort) | | | |
| PLSec | 2.36 | (1.29-4.31) | 0.005 |
| PLSec-AFP | 3.04 | (1.59-5.82) | <0.001 |
| Validation set 2 (41 cases: 123 controls): Resolved HCV, hepatitis/cirrhosis (nested case-control series) | | | |
| PLSec-AFP | 4.59 | (1.74-12.1) | 0.002 |
| Validation set 3 (146 consecutive patients): Resolved HCV, hepatitis/cirrhosis after HCC therapies (prospective-retrospective cohort) | | | |
| PLSec-AFP | 2.57 | (1.41-4.70) | 0.002 |

Subgroup analyses suggested enhanced magnitude of association in patients with early-stage (i.e., compensated) liver disease (Child-Pugh class A) as well as NAFLD or cryptogenic etiology (often associated with history of NAFLD (Castello et al., *Ann. Hepatol.* 2019; 18: 855-861)), a patient population with the greatest need for HCC risk stratification (FIG. 5F). A modest prognostic association was observed in patients with active HCV infection, a vanishing population with widespread use of direct-acting antivirals (DAAs). These data collectively supported successful independent validation of PLSec and warranted further validation of PLSec-AFP.

Example 5

Figure 7A:
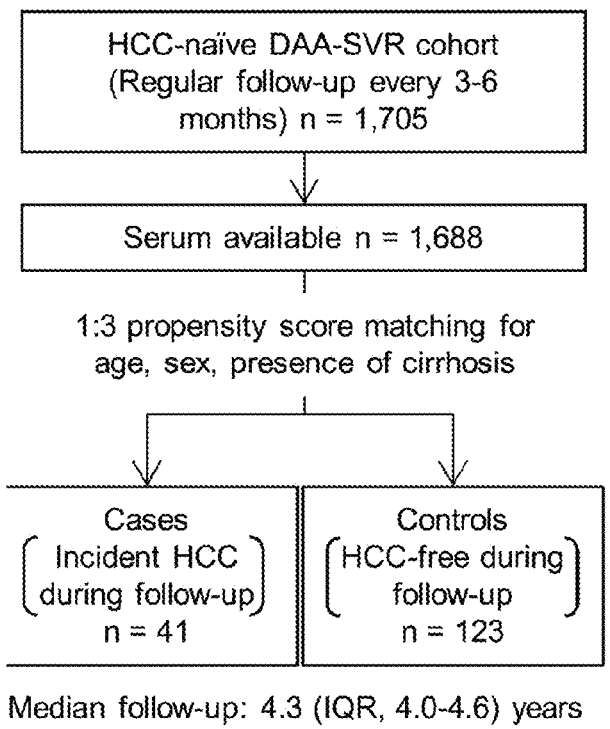
FIGS. 7A-7E depict representative images and graphs illustrating clinical utility of validation set 2—HCC risk after HCV cure by DAA (nested case-control series).
Figure 7B:
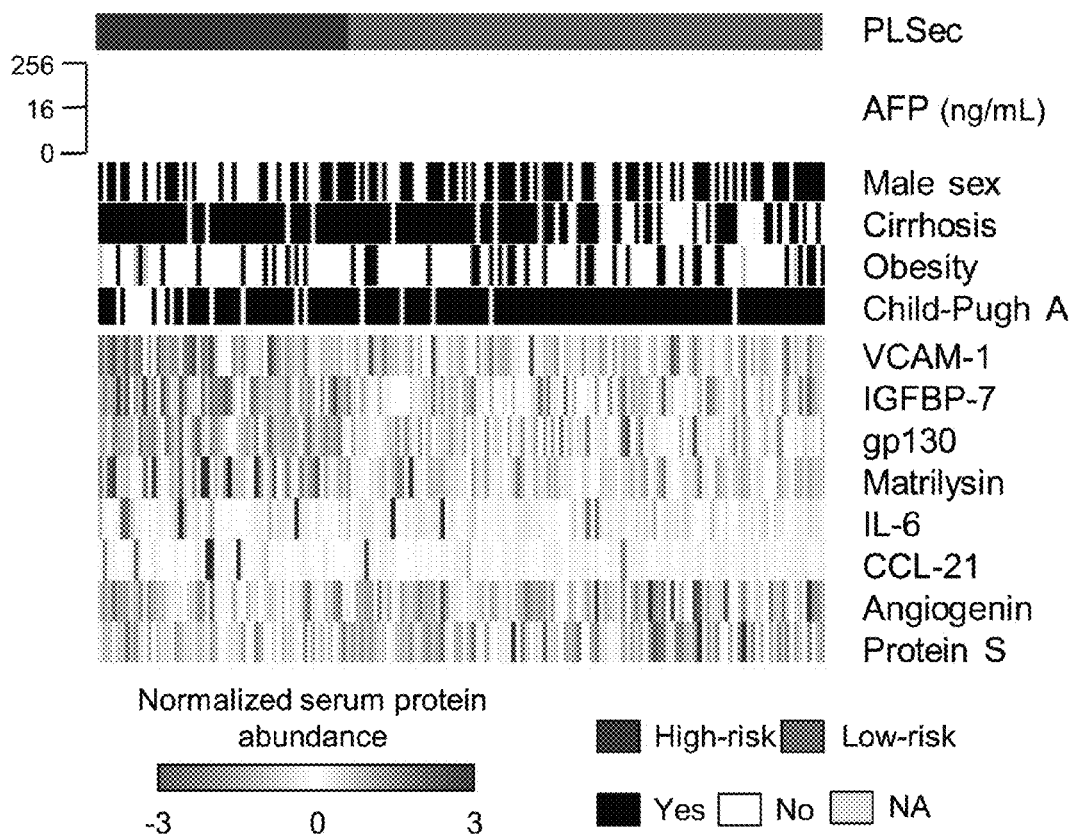

In an exemplary method, Validation of PLSec assay in validation set 2 (V2) assessed incident HCC risk in patients after HCV cure. In contrast to the decrease in patients with active HCV infection, HCV-cured patients were sharply increasing. In this nested case-control series of patients after sustained virologic response (SVR) achievement (FIG. 7A; Table 3), high-risk PLSec-AFP was significantly associated with future HCC occurrence (adjusted odds ratio [aOR], 3.80; 95% CI, 1.66-8.66; p=0.002) (FIG. 7B; Table 6 and Table 7).

TABLE 7

Univariable Analyses in Validation Set 2 and Set 3

| | Validation set 2 | | | Validation set 3 | | |
|---|---|---|---|---|---|---|
| Variable | No. (%) | | OR (95% CI) | No. (%) | | HR (95% CI) |
| Age | — | | — | | — | 0.99 (0.96-1.02) |
| Male sex | — | | — | 66 | (45%) | 0.76 (0.46-1.24) |
| Cirrhosis | — | | — | 117 | (80%) | 0.98 (0.52-1.84) |
| Obesity | 40 | (24%) | 0.95 (0.40-2.26) | 20 | (14%) | 1.14 (0.57 2.33) |
| Active hazardous alcohol drinking | 12 | (7%) | 2.79 (0.71-11.0) | 12 | (9%) | 0.55 (0.20-1.53) |
| Diabetes | 23 | (14%) | 0.71 (0.24-2.06) | 25 | (18%) | 0.99 (0.52- 1.90) |
| Child-Pugh class B or C (vs. A) | 144 | (88%) | 1.36 (0.47-3.90) | 132 | (90%) | 2.78 (1.44- 5.35) |
| FIB-4 ≥ 3.25 (vs. <3.25) | 113 | (69%) | 1.17 (0.48-2.84) | 111 | (76%) | 1.39 (0.74-2.61) |
| Platelet count (×10³/μL) | | | | | | |
| As continuous | | | 0.99 (0.93-1.06) | | — | 0.99 (0.95-1.03) |
| <140 × 10³/μL | 103 | (63%) | 1.47 (0.65-3.36) | 101 | (69%) | 0.99 (0.78-2.40) |
| <100 × 10³/μL | 60 | (37%) | 1.33 (0.64-2.80) | 59 | (40%) | 1.03 (0.63-1.69) |
| <80 × 10³/μL | 40 | (24%) | 1.20 (0.52-2.75) | 37 | (25%) | 1.13 (0.66-1.95) |
| ALT (IU/L) | | | | | | |
| As continuous | | | 1.02 (0.99-1.04) | | — | 1.01 (0.998-1.03) |
| >25 IU/L | 51 | (31%) | 0.81 (0.36-1.83) | 31 | (21%) | 1.53 (0.88-2.68) |
| >40 IU/L | 13 | (8%) | 1.41 (0.38-5.22) | 9 | (6%) | 1.97 (0.84-4.57) |

Figure 6E:
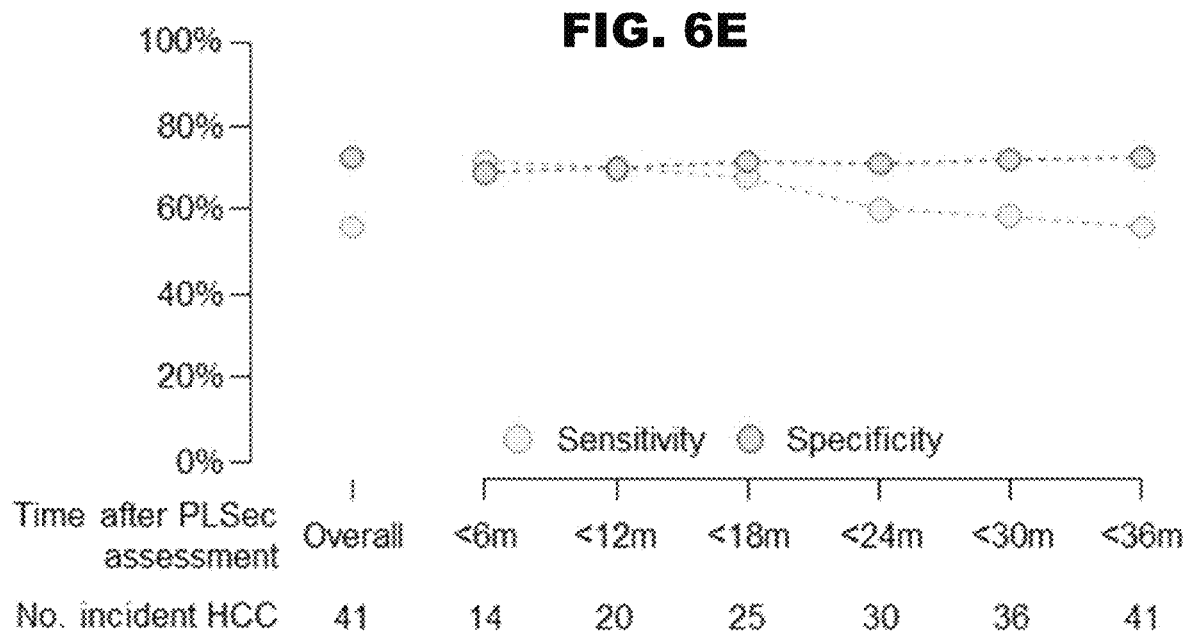
Figure 7C:
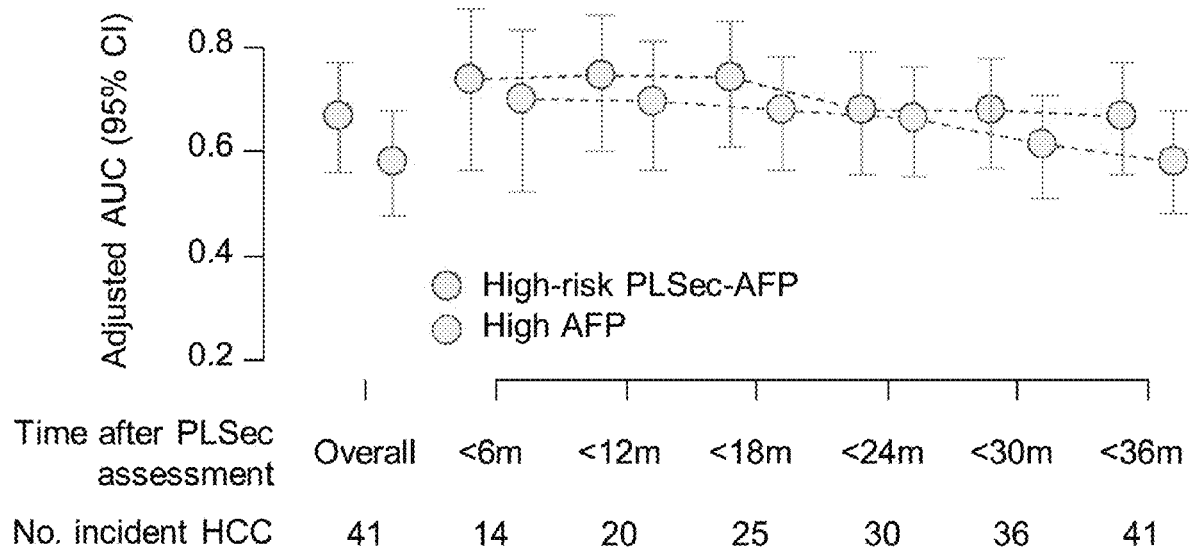
Figure 7D:
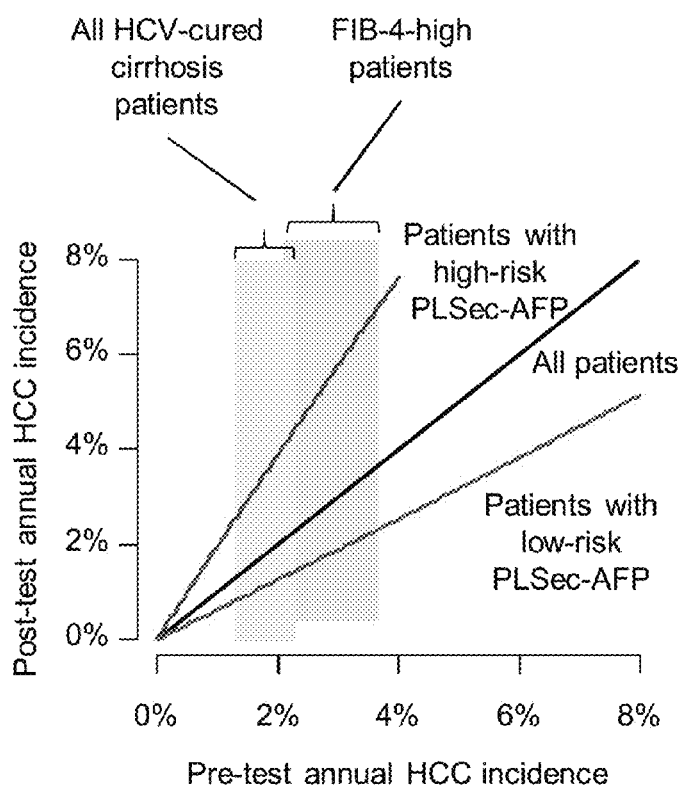

The association remained significant in the subset of patients with cirrhosis (aOR, 3.12; 95% CI, 1.27-7.65). Overall sensitivity and specificity of PLSec-AFP for long-term HCC risk were 56% and 72%, respectively. PLSec-AFP showed stable sensitivity and specificity and consistently improved prognostic association compared to AFP alone (time-dependent area under the receiver operating characteristic curve [AUC] is ~0.70 over time) (FIG. 6E and FIG. 7D). In addition, PLSec-AFP showed better model performance and fitness compared to AFP alone (Brier score, 0.165 versus 0.186; Akaike information criterion [AIC], 104 versus 114; Bayesian information criterion [BIC], 106 versus 116 for PLSec-AFP and AFP, respectively) (Table 5). Previous clinical studies reported the annual HCC incidence rate at 1%-2% in cirrhosis patients after achieving SVR with DAA therapy, and 2%-3.5% in cirrhosis patients with a high Fibrosis-4 (FIB-4) index, a clinical indicator of liver fibrosis (Baumert et al., BMC Med. 2017; 15: 52; Kanwal et al., Gastroenterology. 2017; 153: 996-1005.e1; Ioannou et al., Gastroenterology. 2019; 157: 1264-1278.e4). Based on results in the V2, high-risk PLSec-AFP was estimated to identify a subgroup of patients with an ~3-fold higher annual HCC incidence rate, up to 7% of the group (FIG. 7D).

Figure 7E:
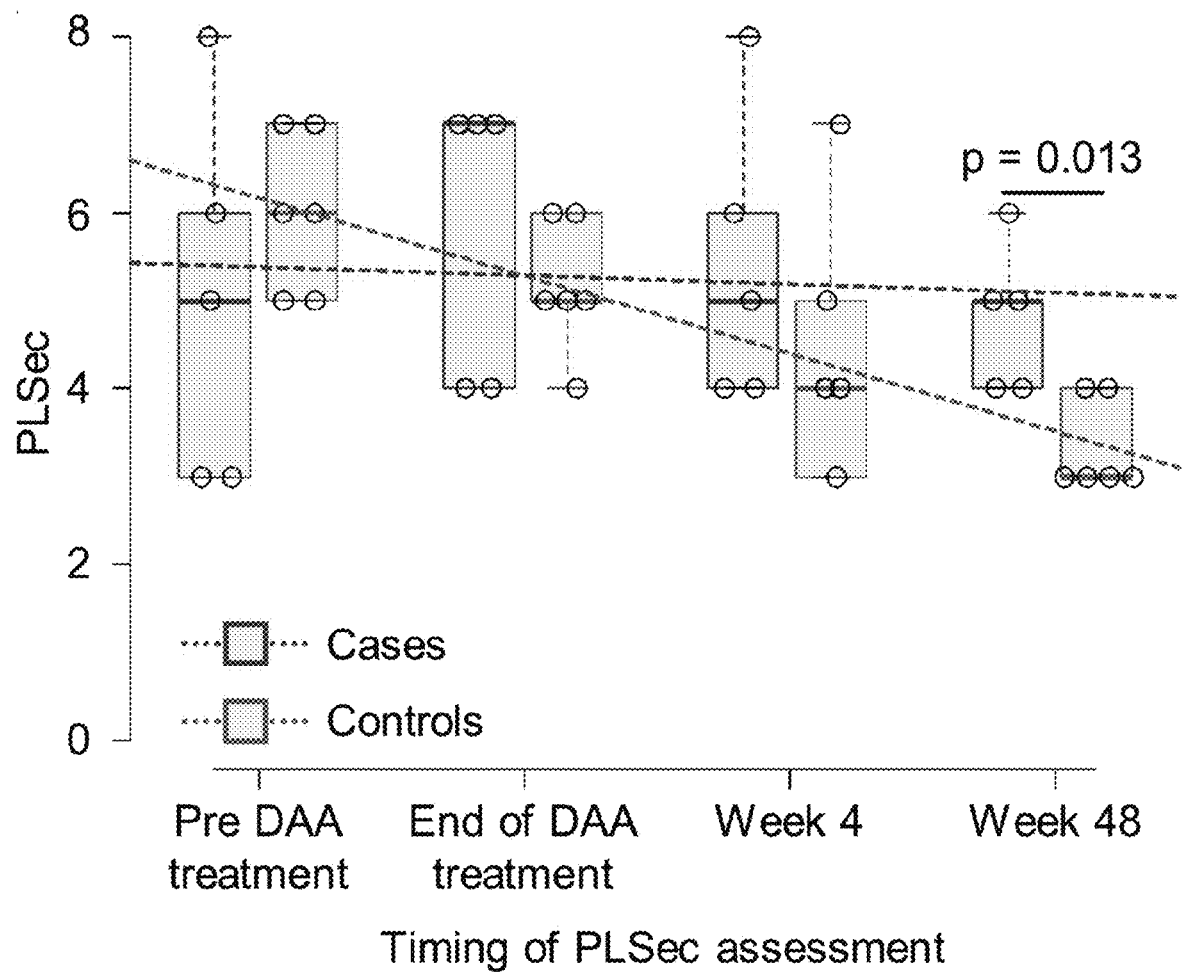

Among the analyzed patients, time-series PLSec assessment was performed in 11 patients (5 cases and 6 controls) (FIG. 7E). PLSec significantly declined after treatment in the controls, whereas it remained stably elevated among the cases, suggesting that the kinetic change of molecular HCC risk status measured by PLSec may also be used to monitor prognostic efficacy of anti-HCV or chemoprevention therapies.

Example 6

Figure 6F:
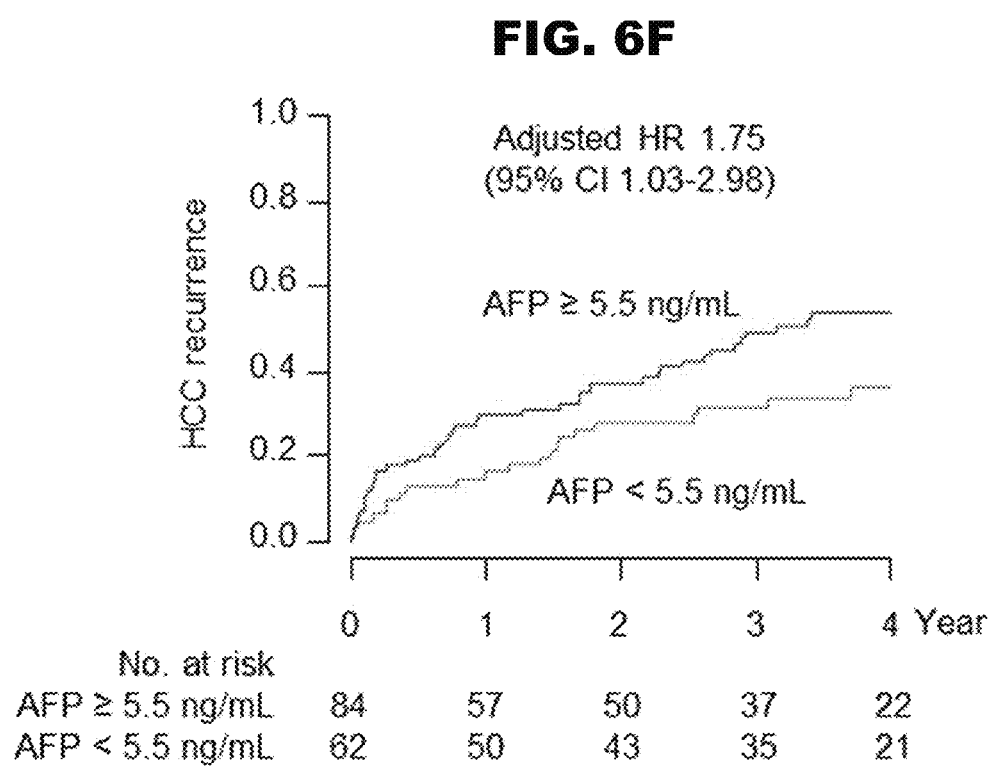
Figure 6G:
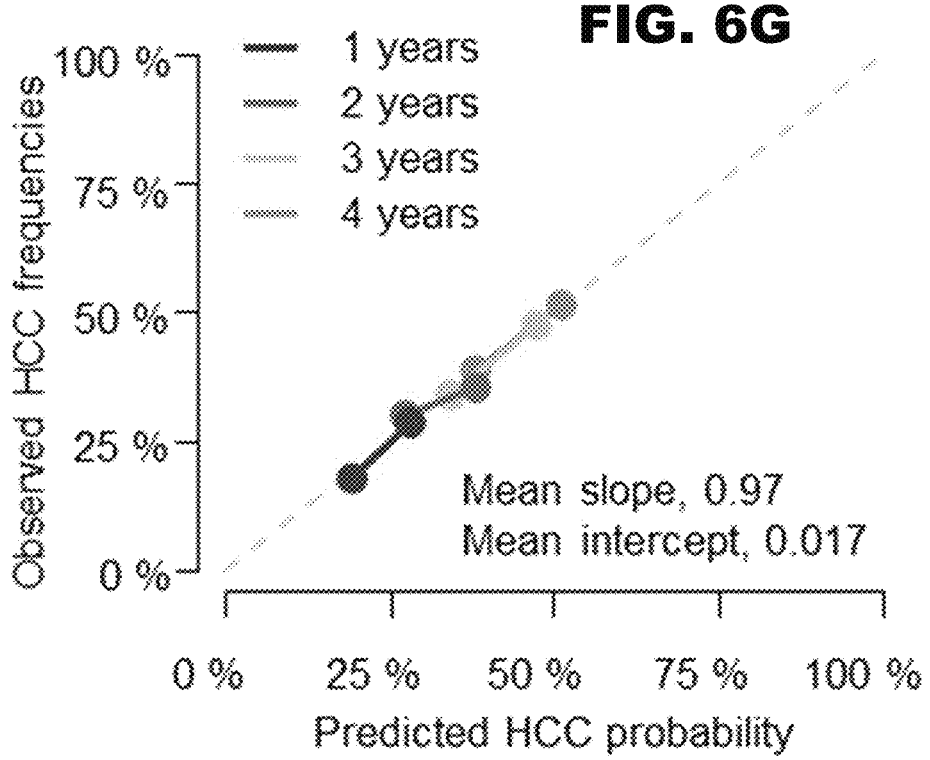
Figure 6H:
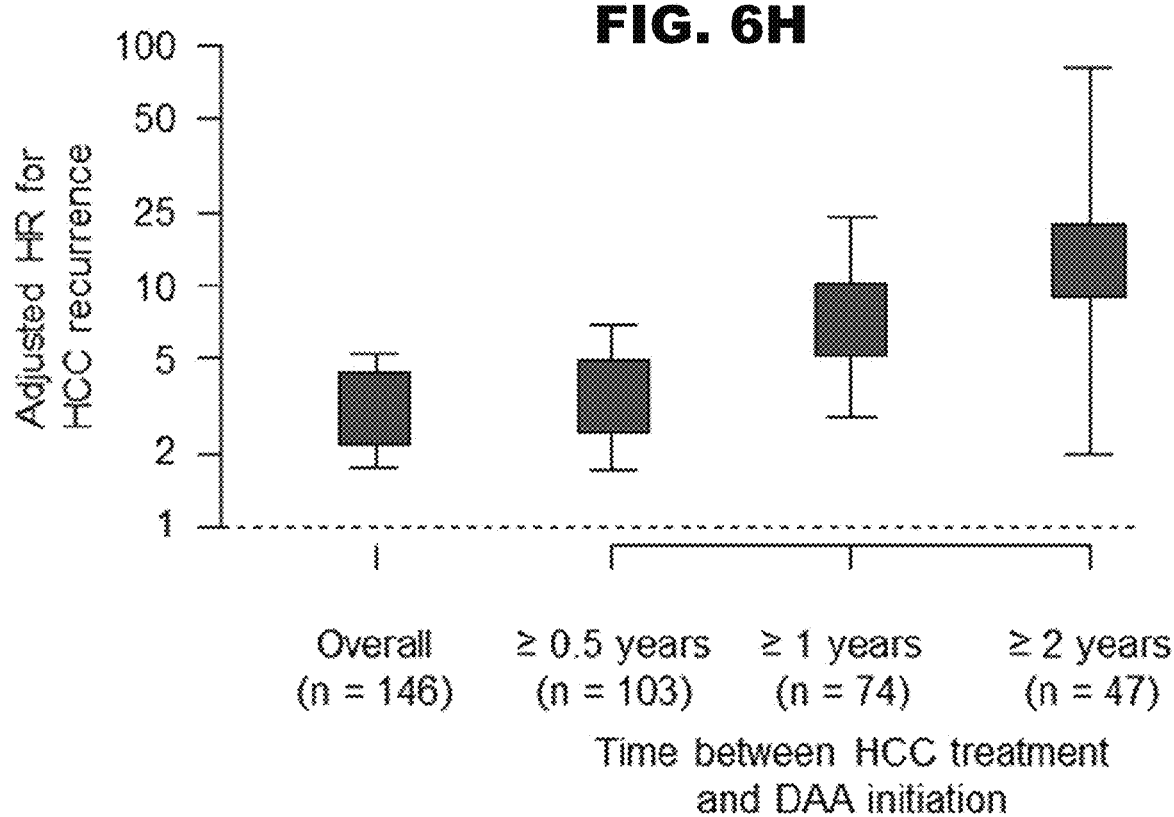
Figure 8A:
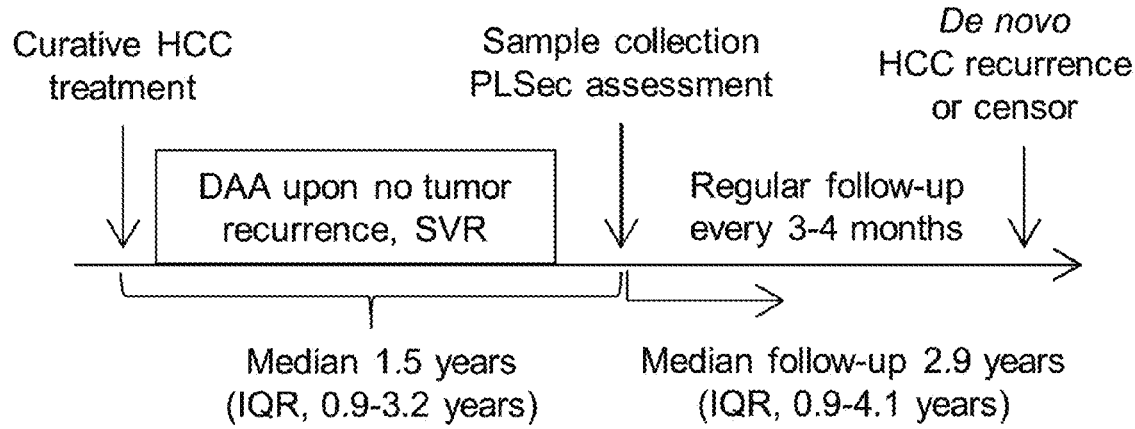
Figure 8B:
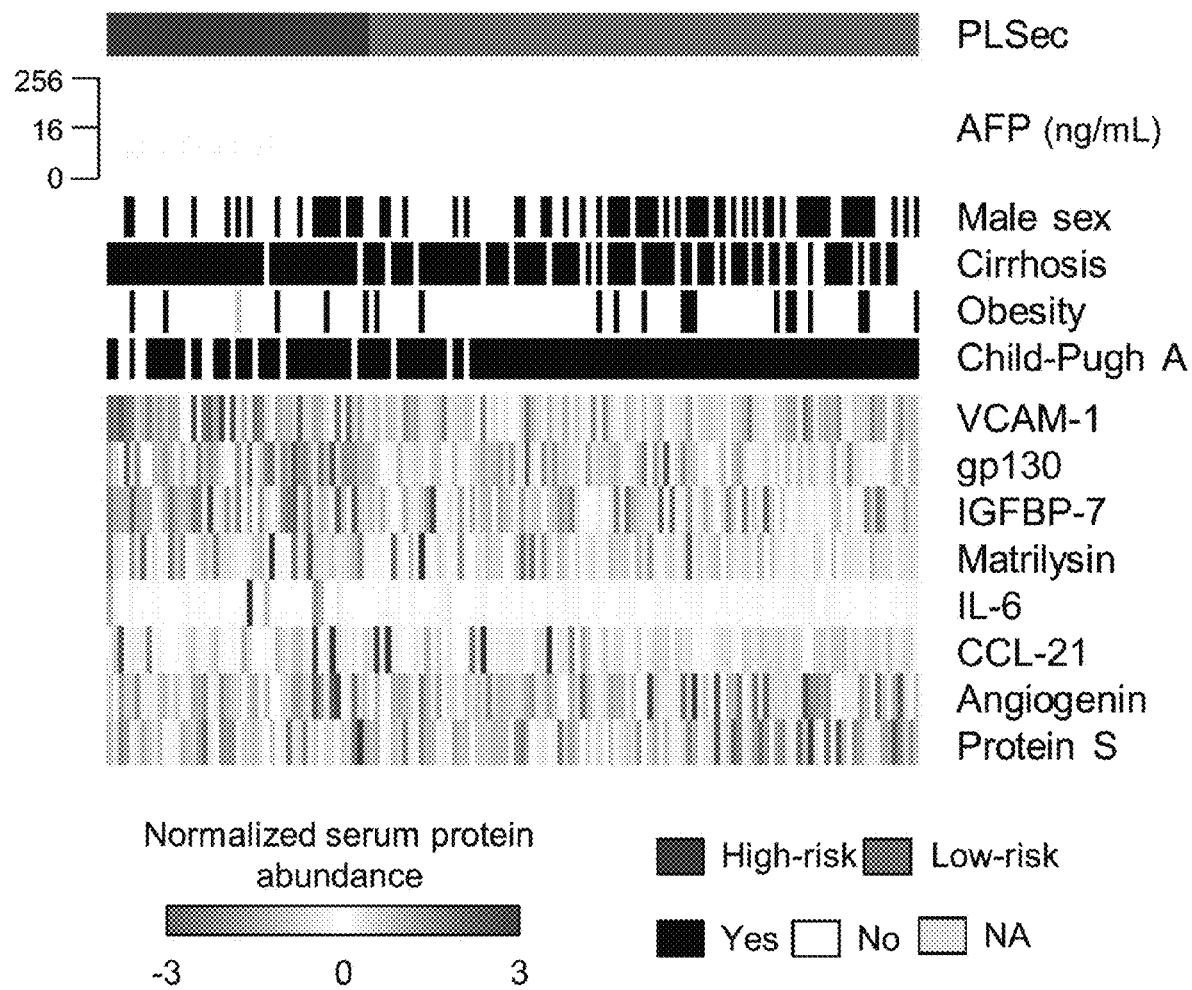

In an exemplary method, Validation of PLSec assay in validation set 3 (V3) assessed de novo HCC recurrence after complete HCC treatment response and HCV cure. DAA therapy is increasingly considered in conjunction with curative HCC treatment because of an observed survival benefit (Singal et al., Gastroenterology. 2019; 157: 1253-1263.e2). However, these patients remain at risk of de novo HCC recurrence (i.e., newly initiated HCC in remnant diseased liver clonally unrelated to the initially treated tumor (Baumert et al., BMC Med. 2017; 15: 52; Manthravadi et al., Int. J. Cancer. 2017; 140: 1042-1049) and therefore need HCC risk prediction. As such, PLSec-AFP was evaluated in a cohort of 146 patients with a history of treated HCC, with confirmed complete response, and SVR after DAA therapy (FIGS. 8A and 8B; Table 3). At the time of PLSec-AFP assessment, patients were recurrence free for a median of 1.5 years, indicating that observed HCC incidences during the follow-up were more likely de novo recurrence. High-risk PLSec-AFP showed a significant association with recurrence (aHR, 3.08; 95% CI, 1.78-5.31; p<0.001) (Table 5). The association remained significant in the subset of patients with cirrhosis (aHR, 3.44; 95% CI, 1.86-6.36), whereas the presence of cirrhosis was not associated with HCC recurrence (aHR, 0.88; 95% CI, 0.46-1.68). Cumulative incidences of recurrent HCC at 1 and 3 years were 18.5% and 30.8% among 104 low-risk patients, and 38.2% and 69.7% among 42 high-risk patients, respectively (FIG. 8C). Prognostic association and model fitness for PLSec-AFP were superior to AFP alone (integrated Brier score, 0.196 versus 0.206; c-index, 0.74 versus 0.64; AIC, 590 versus 602; BIC, 592 versus 605 for PLSec-AFP and AFP, respectively) (Table 5; FIG. 6F). Time-dependent AUC showed stably superior prognostic performance of PLSec-AFP over time (FIG. 8D). Both high-risk PLSec-AFP and high AFP were comparably well calibrated (FIG. 8E and FIG. 6G). When DAA therapy was initiated >1 year after HCC cure, high-risk PLSec-AFP showed an enhanced association with recurrent HCC (aHR, 7.32; 95% CI, 2.86-18.8) (FIG. 6H).

Quantification and statistical analysis used in Examples 1-6. All statistical analyses used in the exemplary methods detailed in Examples 1-6 herein were performed using the R statistical language (www.r-project.org). For time-to-event analyses (validation sets 1 and 3), prognostic associations of the clinical variables and PLSec were assessed using Kaplan-Meier curves and uni/multivariable Cox regression modeling. Annual incidence rates were calculated per 100 person-years, and cumulative incidences at certain time points were estimated by Kaplan-Meier method. Proportional-hazards assumption was confirmed by using cox.zph function in R survival package (Table 8).

TABLE 8

Test for Proportional Hazards Assumption in Validation Set 1

| Variable | Chi-square | p value |
|---|---|---|
| PLSec-AFP score | <0.01 | 0.95 |
| PLSec-AFP (≥1.66) | 1.46 | 0.23 |
| PLSec | 0.58 | 0.45 |
| PLSec (≥4) | 1.13 | 0.29 |
| log2(1 + AFP) (as continuous) | 0.84 | 0.36 |
| AFP ≥ 5 ng/mL | 0.27 | 0.60 |

Sample size to detect hazard ratio of 3 as statistically significant is 232 under assumption that 25% of the patients show high-risk score and 15% of the patients develop HCC at statistical power of 0.8 and alpha error of 0.05. The case-control series (validation set 2) was analyzed by multivariable conditional logistic regression. To develop a composite prognostic score combining PLSec and clinical variables in the validation set 1, PLSec and AFP were chosen based on multivariable Cox regression p value less than 0.05 (Table 4).

It was clinically known that AFP can increase at low level in association with non-malignant conditions such as chronic hepatic inflammation accompanied with hepatocyte regeneration (Galle et al., *Liver Int.* 2019; 39: 2214-2229). Even with the clinically used cut-off of >20 ng/mL, HCC was present only in up to 60% of the patients (Marrero et al., Hepatology. 2018; 68: 723-750). In this cohort, vast majority of the patients (93%) showed AFP levels even below the cut-off. If a high AFP was indicative of already existing HCC in the cohort, the tumor nodule should be clinically diagnosed in 2-3 years given the tumor volume doubling time is 4.7 months according to a recent meta-analysis (Nathani et al., *Gut.* 2021; 70: 401-407). This was not the case in majority of the cohort as shown by consistent incidence rates over time (FIG. 6B) and proportional hazard of incident HCC irrespective of AFP levels (Table 8). Collectively, it was assumed that AFP in this cohort reflected more likely tumor initiating microenvironment in liver (so-called "field effect") rather than an existing but undetected tumor.

Both PLSec and AFP were linearly correlated with time to HCC development according to non-linearity test on log relative risk plot (FIGS. 6C and 6D) and were independently associated with time to HCC development (p=0.548 for their interaction term in multivariable Cox regression). The composite PLSec-AFP score was derived by using regression coefficients from multivariable Cox regression as follows: PLSec-AFP=0.175×PLSec+0.325×$\log_2$(1+AFP). The risk-predictive performance of the PLSec-AFP score was assessed and compared to that of AFP alone using integrated Brier score (Graf et al., *Stat. Med.* 1999; 18: 2529-2545) and c-index (Harrell et al., *Stat. Med.* 1996; 15: 361-387) calculated by pec R package (Mogensen et al., *J. Stat. Softw.* 2012; 50: 1-23), and time-dependent AUCs in validation set 1 and 3, and Brier score and covariate-adjusted AUC (Pepe et al., *Acad. Radiol.* 2013; 20: 863-873) in the validation set 2 (Table 5). Fitness of the models was assessed by Akaike information criterion (AIC) and Bayesian information criterion (BIC). The confidence intervals were estimated by bootstrapping of the samples (n=1,000). A predefined subgroup analysis was performed in patients with cirrhosis in the validation set 2 and 3. The cut-off of 1.66 was defined to determine high-risk patients based on maximally selected rank statistics using maxstat R package (Lausen and Schumacher, *Biometrics.* 1992; 48: 73-85). Hazard ratios in validation set 1 and 3 were primarily adjusted for known clinical variables that influence liver disease prognosis, i.e., age (as continuous), sex, obesity, diabetes, and active hazardous alcohol drinking as defined above. The odds ratios in validation set 2 were adjusted for obesity, diabetes, and active hazardous alcohol drinking with conditioning on the pairs of cases and the matched controls. Besides, the hazard ratios and odds ratios were also adjusted for liver function reserve (Child-Pugh class A versus the rest), a liver fibrosis indicator, FIB-4 index (≥3.25 versus <3.25 (Kanwal et al., *Gastroenterology.* 2017; 153: 996-1005.e1)), and all variables used in each model as sensitivity analyses in all validation cohorts (Table 6). Missing data on the covariates used in multivariable adjustments were imputed using classification and regression trees (Doove et al., *Comput. Stat. Data Anal.* 2014; 72: 92-104; van Buurenca and Groothuis-Oudshoorn, *J. Stat. Softw.* 2011; 45: 1-67). For each incomplete case, five sets of imputed values were identified. The incomplete case's missing value was replaced with median of the five values for continuous variables and the most frequent value for categorical variables. Proportion of missing values in each variable was ≤10% (Dong and Peng, *Springerplus.* 2013; 2: 222).

In a matched case-control study, the receiver operating characteristic curve was substantially biased when the data does not acknowledge covariate matching (Pepe et al., *Acad. Radiol.* 2013; 20: 863-873). Therefore, the performance of high-risk PLSec-AFP was evaluated in validation set 2 using covariate-adjusted AUCs, including variables used in the matching, i.e., age, sex, and presence of cirrhosis, with semiparametric Bayesian inference, calculated by AROC R package (FIG. 7C). Besides, covariate-adjusted AUC was used to compare a performance of PLSec-AFP to that of AFP alone in validation set 2. In the validation set 2, the effect of PLSec-AFP on HCC risk discrimination was estimated according to Bayes' theorem as follows:

Post-test annual *HCC* risk in high-risk patients (%) =

$$\frac{\text{Sensitivity} \times x}{\text{Sensitivity} \times x + (100 - \text{Specificity}) \times (100 - x)} \times 100, \text{ and}$$

Post-test annual *HCC* risk in low-risk patients (%) =

$$\left(1 - \frac{\text{Specificity} \times (100 - x)}{(100 - \text{Sensitivity}) \times x + \text{Specificity} \times (100 - x)}\right) \times 100,$$

where x (%) denotes pre-test annual HCC risk, based on sensitivity (%) and specificity (%) for incident HCC within 3 years after PLSec-APF assessment based on their confirmed stability over time (FIG. 6E).

Example 7

122 patients with Child-Pugh class A cirrhosis from mixed etiologies were prospectively enrolled at the University of Michigan between January 2004 and September 2006. (Singal et al., *Cancer Epidemiol Biomarkers Prev* (2012)21:793-799.) Patients were prospectively followed and assessed for development of hepatic decompensation or hepatocellular carcinoma. Blood serum was collected at baseline and stored at −80° C. until use.

PLSec was derived by computationally converting prognostic liver signature via our integrative bioinformatic pipeline, TexSEC (translation of tissue gene expression to secretome) and consists of 6 high-risk-associated proteins, including vascular cell adhesion molecule-1, insulin-like growth factor-binding protein-7, gp130, matrilysin, interleukin-6, and C-C motif chemokine ligand-21; and 2 low-risk-associated proteins, including angiogenin and protein S. It was calculated in a semiquantitative manner ranging from 0 to 8 with high-risk PLSec defined as ≥4 as disclosed herein. The validated antibodies for the PLSec were implemented in a Food and Drug Administration—approved multiplex clinical diagnostic technology, (xMAP platform, Luminex, Austin, Tex.), and run on the Bio-Plex 200 systems (Bio-Rad, Hercules, Calif.) at UT Southwestern BioCenter.

The primary outcome was time to incident hepatic decompensation, defined as first occurrence of new as-cites, hepatic encephalopathy, bleeding from gastroesophageal varices, or liver transplantation. Transplantation for hepatocellular carcinoma was regarded as a censored observation. Association of PLSec with the primary outcome was assessed by multivariable Cox regression analysis, adjusted for age and sex, and compared with those of clinical scores using time-dependent area under receiver operating characteristics curve, integrated Brier score, and Harrell C-index. All statistical analyses were performed using the R statistical language version 4.0.3 (www.r-project.org).

Figure 9A:
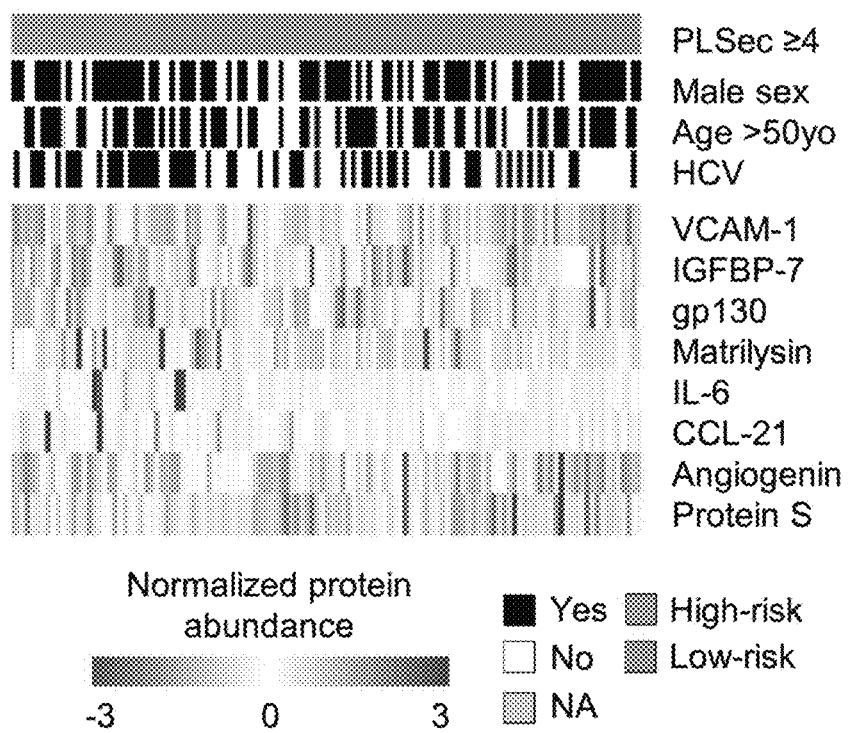
FIGS. 9A-9F depict characterization of the performance of PLSec for prediction of decompensation risk in patients with cirrhosis from mixed etiologies.

Patient demographics are summarized in Table 9. During a median follow-up of 5.5 years (interquartile range, 1.8-12.1 years), 29 patients developed hepatic decompensation (ascites, 13; variceal bleeding, 3; hepatic encephalopathy, 16; and/or liver transplantation, 6). No deaths before hepatic decompensation were observed. PLSec identified 29 (24%) and 93 (76%) patients as being high and low risk for developing hepatic decompensation, respectively (FIG. 9A).

Figure 9B:
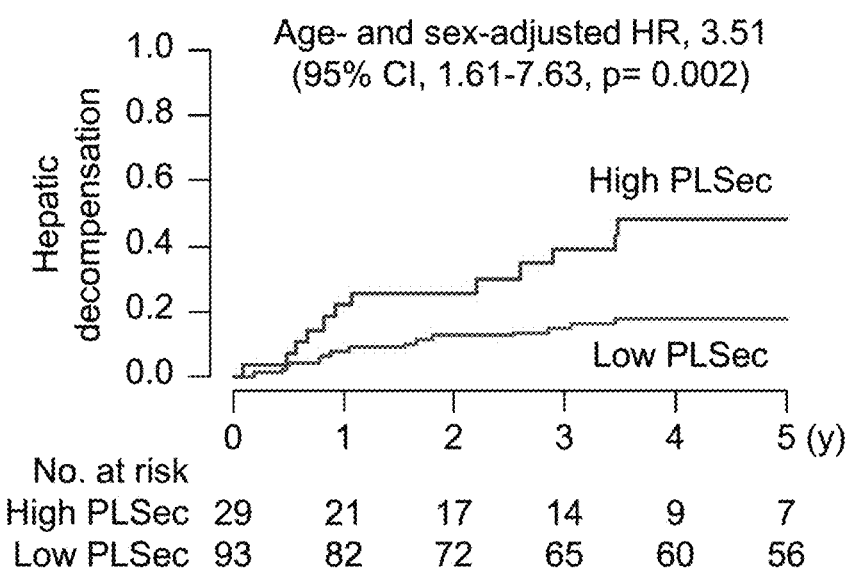
Figure 9C:
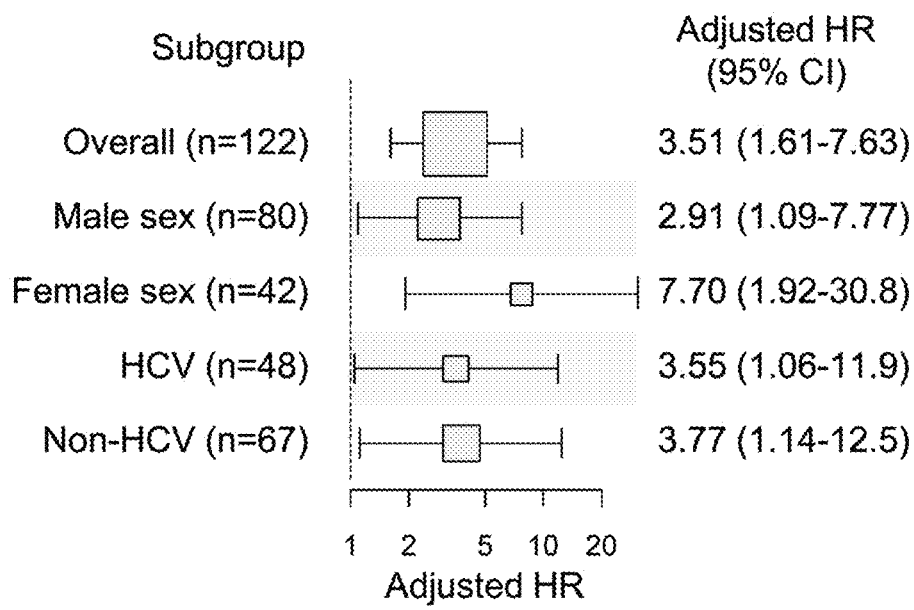
Figure 9D:
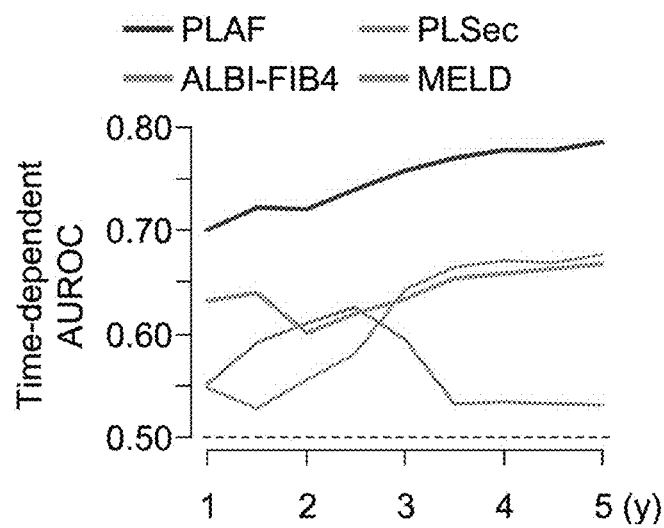

High-risk PLSec score was associated with hepatic injury (aspartate aminotransferase and alanine aminotransferase) and function reverse (albumin and bilirubin) and a-fetoprotein (Table 9). Hepatitis C virus-infected patients tended to be classified to the high-risk PLSec group. High-risk PLSec was significantly associated with incident hepatic decompensation (adjusted hazard ratio, 3.51; 95% confidence interval, 1.61-7.63; P=0.002) (FIG. 9B). In subgroup analyses, the prognostic association remained significant irrespective of sex and hepatitis C virus infection (FIG. 9C). The PLSec showed a better discrimination compared with the ALBI-FIB4 during the first 3 years and with MELD score over the follow-up time period (FIG. 9D). In multivariable Cox regression, high-risk PLSec (adjusted hazard ratio, 2.40; 95% confidence interval, 1.00-5.76) and ALBI-FIB4 (adjusted hazard ratio, 2.63; 95% confidence interval, 1.09-6.36) were independently associated with decompensation, suggesting that these variables complementarily improve prediction of decompensation.

Figure 9E:
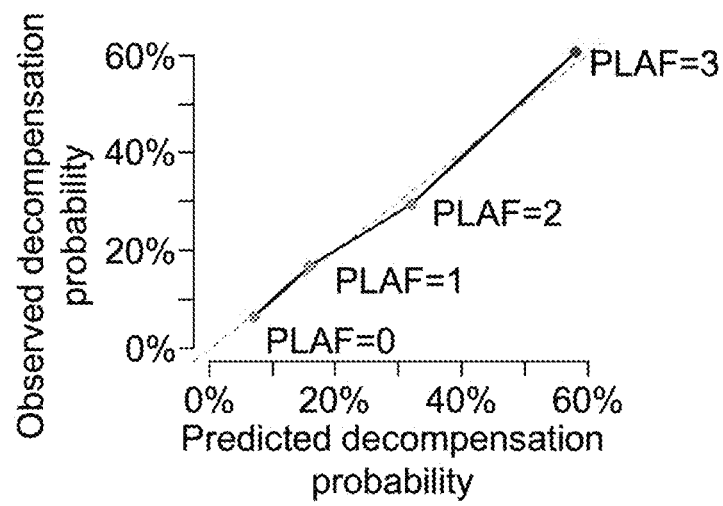
Figure 9F:
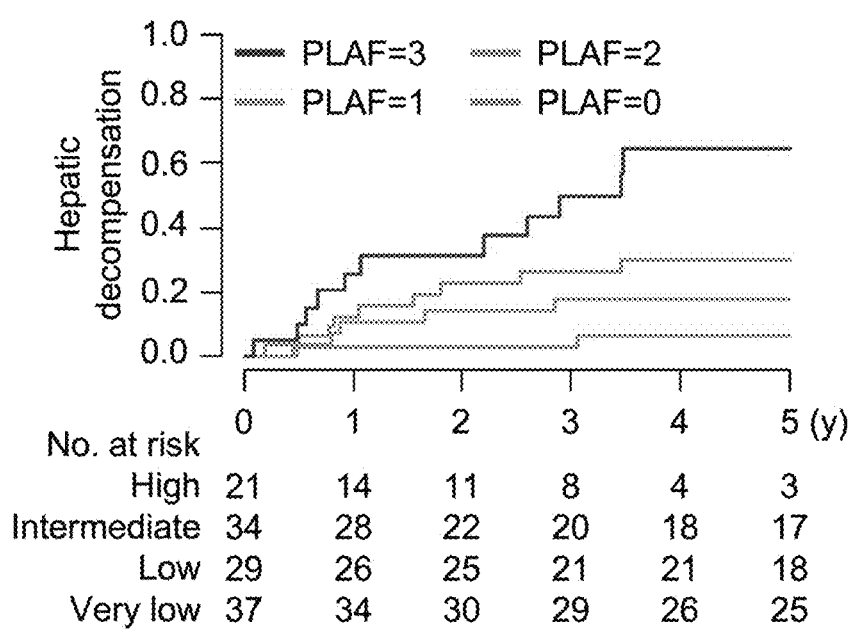

A composite score was developed, named PLSec, ALBI, and FIB-4 (PLAF) score, as follows: PLAF score=(1 for PLSec >4, otherwise 0)+(1 for ALBI grade ≥2, otherwise 0)+(1 for FIB-4>3.25, otherwise 0), using validated cutoffs for each score. (Guha et al., *Clin Gastroenterol Hepatol* (2019) 17:2330-2338; Hsu et al., *Dig Dis Sci* (2021)). As expected, the PLAF score yielded substantially improved prognostic association (C statistic=0.72) throughout the observation period (FIG. 9D, Table 10) with good calibration (FIG. 9E). An exploratory stratification of the patients into 4 risk groups enabled significant and distinct prognostication (FIG. 9F, Table 10).

TABLE 9

Clinical Demographics

| Variable | Overall (n = 122) | High-risk PLSec (n = 29) | Low-risk PLSec (n = 93) | P value[a] |
|---|---|---|---|---|
| Age, y | 51 (46-57) | 51 (48-53) | 51 (45-58) | .69 |
| Male sex, n (%) | 80 (66) | 22 (76) | 58 (62) | .26 |
| Etiology: HCV/HBV/ALD/NAFLD/cryptogenic/others, n (%) | 48/10/17/10/13/24 (39/8/14/8/11/20) | 17/1/3/1/0/7 (59/3/10³/0/24) | 31/9/14/9/13/17 (33/10/15/10/14/18) | .059 |
| Race/ethnicity: white/black/others, n (%) | 118/3/1 (97/2/1) | 29/0/0 (100/0/0) | 89/3/1 (96/1/3) | 1.00 |
| BMI, kg/m² | 28.4 (25.0-34.2) | 26.8 (24.5-31.3) | 29.8 (25.1-35.1) | .051 |
| Obesity, n (%) | 54 (44) | 8 (28) | 46 (49) | .053 |
| Diabetes, n (%) | 22 (18) | 5 (17) | 17 (18) | 1.00 |
| Active hazardous alcohol drink, n (%) | 8 (7) | 3 (12) | 5 (6) | .38 |
| Albumin, g/dL | 3.8 (3.6-4.1) | 3.6 (3.4-3.7) | 3.9 (3.7-4.2) | <.001 |
| Total bilirubin, mg/dL | 0.9 (0.6-1.2) | 1.1 (0.7-1.4) | 0.8 (0.5-1.1) | <.001 |
| INR | 1.1 (1.0-1.2) | 1.1 (1.0-1.2) | 1.1 (1.0-1.2) | .50 |
| AST, IU/L | 53 (35-74) | 73 (61-118) | 44 (30-69) | <.001 |
| ALT, IU/L | 50 (34-75) | 67 (53-133) | 46 (31-68) | <.001 |
| Platelet count, ×10³/mL | 116 (82-160) | 96 (63-130) | 117 (85-166) | .063 |
| a-Fetoprotein, ng/mL | 3.7 (2.2-7.2) | 5.3 (3.2-9.4) | 3.5 (2.1-6.9) | .013 |
| Child-Pugh score (5/6), n (%) | 60/62 (49/51) | 10/19 (34/66) | 50/43 (54/46) | .089 |
| PLSec score | 2 (1-3) | | | |
| High-risk PLSec (>4), n (%) | 29 (24) | | | |

ALBI, albumin-bilirubin; ALD, alcohol-associated liver disease; ALT, alanine transaminase; AST, aspartate transaminase; BMI, body mass index; FIB4, fibrosis-4; HBV, hepatitis B virus; HCV, hepatitis C virus; INR, international normalized ratio; MELD, model for end-stage liver disease; NAFLD, nonalcoholic fatty liver disease; PLSec, prognostic liver secretome signature. Comparisons in categorical and continuous variables were evaluated by Fisher exact test and Wilcoxon rank sum test, respectively.

TABLE 10

Prognostic Performance of PLAF and Other Scores

| | | | Prognostic Association | | Model Performance | |
| --- | --- | --- | --- | --- | --- | --- |
| Variable | Risk (score) | n (%) | % decompensation at 5 y | Age- and sex-adjusted HR (95% CI) | Integrated Brier score | Harrell C-statistic |
| PLAF score | Very low | 37 (31) | 6.2 | Ref. | 0.136 (0.097-0.169) | 0.72 (0.63-0.80) |
| | Low | 29 (24) | 17.7 | 3.79 (0.75-19.0) | | |
| | Intermediate | 34 (28) | 29.7 | 6.36 (1.39-29.0) | | |
| | High | 21 (17) | 64.1 | 18.5 (3.95-86.4) | | |
| PLSec | Low | 93 (76) | 17.7 | Ref. | 0.157 (0.118-0.191) | 0.61 (0.53-0.70) |
| | High | 29 (24) | 48.2 | 3.51 (1.61-7.63) | | |
| MELD score | ≤6 | 67 (57) | 23.3 | Ref. | 0.176 (0.133-0.207) | 0.54 (0.50-0.64) |
| | >6 | 50 (43) | 26.8 | 1.49 (0.70-3.19) | | |
| ALBI-FIB4 | ≤−1.822 | 102 (84) | 17.8 | Ref. | 0.148 (0.104-0.186) | 0.61 (0.54-0.70) |
| | >−1.822 | 19 (16) | 70.1 | 3.93 (1.78-8.68) | | |

ALBI, albumin-bilirubin; CI, confidence interval; HR, hazard ratio; MELD, model for end-stage liver disease; PLAF, PLSec, ALBI, and FIB-4; PLSec, prognostic liver secretome signature.

In this independent validation, the prognostic capability of PLSec and limited performance of the ALBI-FIB4 score for prediction of decompensation risk in early-stage cirrhosis from mixed etiologies was confirmed. These data demonstrated that integrations of prognostic biomarkers with existing clinical scores achieved an accurate risk prediction method and a transformative improvement of the care of patients with cirrhosis.

Example 8

Figure 10A:
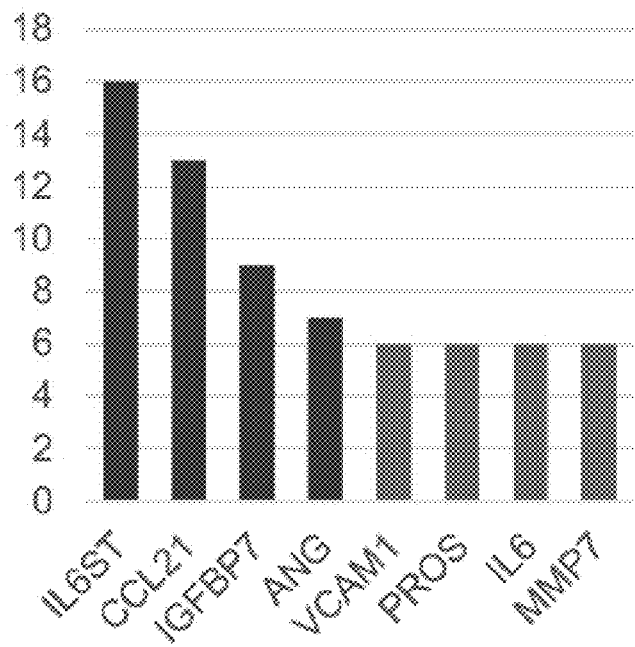
FIGS. 10A-10B depict all possible combinations of 5 or 4 proteins from full 8-protein PLSec, that is, 56 or 70 patterns, that were evaluated regarding HCC risk in the optimization set. In order to prevent overfitting in the optimization set, the most frequently selected proteins in the patterns for a 5-protein panel (FIG. 10A) and 4-protein panel (FIG. 10B) are shown.
Figure 10B:
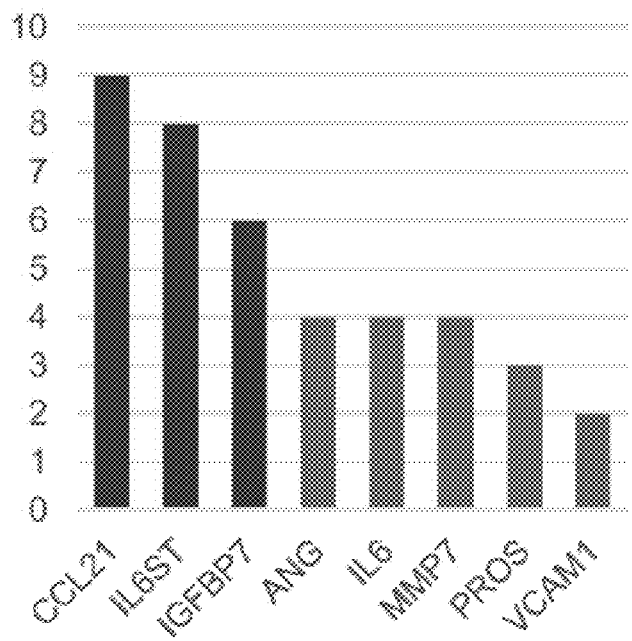
Figure 11E:
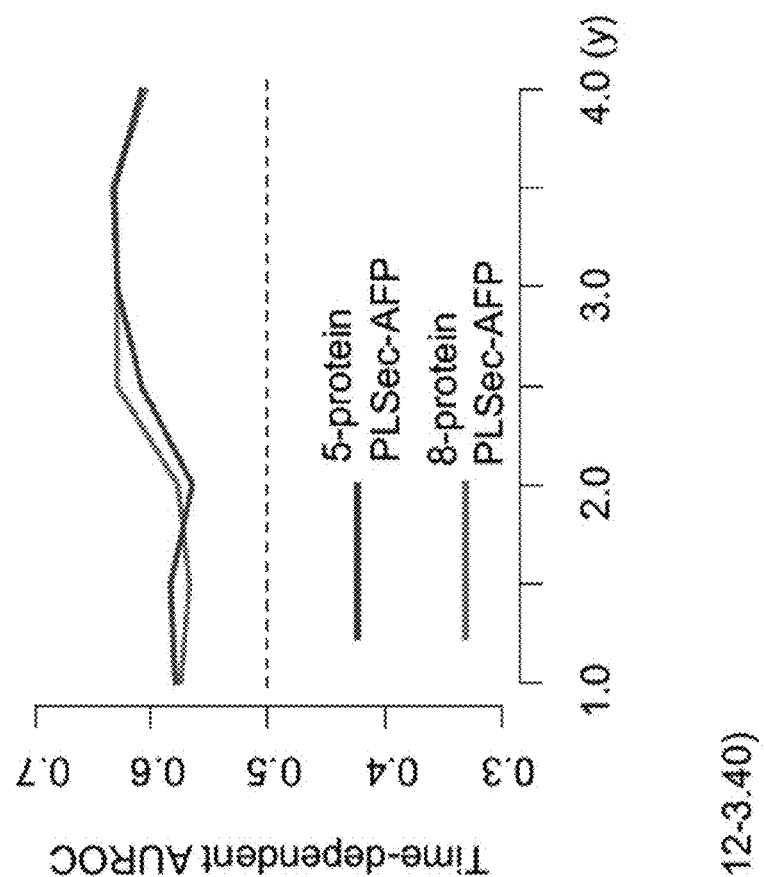
Figure 11D:
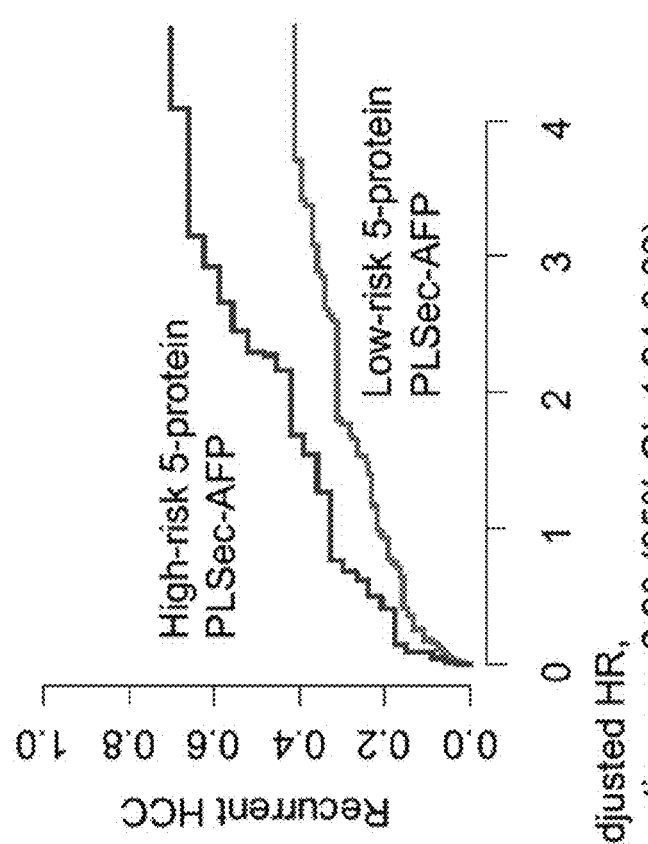

To identify subsets of the original 8 PLSec proteins that yield comparable prognostic performance, combinations of 5 or 4 proteins were systematically evaluated as follows. In the optimization set (n=79, Table 2), 56 and 70 possible combinations were assessed for time to HCC development by Cox regression for 5-protein and 4-protein panels, respectively. Among the possible combinations of the proteins, 13 and 10 combinations showed significant association with the clinical endpoint with Cox regression p<0.001 for 5-protein and 4-protein panels, respectively. Within the statistically significant protein panels, most frequently selected proteins were finally selected as follows (See also FIGS. 10A-10B): 1) 5-protein panels: IL6ST, CCL21, IGFBP7, Angiogenin, VCAM1; IL6ST, CCL21, IGFBP7, Angiogenin, Protein S; IL6ST, CCL21, IGFBP7, Angiogenin, IL6; and IL6ST, CCL21, IGFBP7, Angiogenin, MMP7; and 2) 4-protein panels: IL6ST, CCL21, IGFBP7, Angiogenin; IL6ST, CCL21, IGFBP7, IL6; and IL6ST, CCL21, IGFBP7, MMP7. Prognostic association of these sub-panels was confirmed in the validation sets (n=641 in total, Table 11).

TABLE 11

Validation: Adjusted hazard/odds ratios of 5- or 4-protein PLSec-AFP

| | | Validation set 1 | | | Validation set 2 | | | Validation set 3 | | |
| --- | --- | --- | --- | --- | --- | --- | --- | --- | --- | --- |
| # | Combination proteins | Continuous | Binary at median | Binary at Cut-off defined in V1 | Continuous | Binary at median | Binary at Cut-off defined in V1 | Continuous | Binary at median | Binary at Cut-off defined in V1 |
| 8 | Original 8-protein PLSec | 2.71 (1.69-4.33) | 3.04 (1.62-5.69) | 3.01 (1.64-5.51) | 3.95 (1.58-9.89) | 3.96 (1.64-9.60) | 3.80 (1.66-8.66) | 1.87 (1.07-3.29) | 1.82 (1.06-3.10) | 3.08 (1.78-5.31) |
| 5 | IL6ST, CCL21, IGFBP7, Angiogenin + VCAM1 | 2.69 (1.65-4.36) | 2.44 (1.31-4.52) | 3.44 (1.85-6.37) | 3.63 (1.44-9.14) | 2.85 (1.27-6.41) | 3.37 (1.37-8.26) | 2.20 (1.24-3.89) | 2.19 (1.27-3.78) | 1.95 (1.12-3.40) |
| 5 | IL6ST, CCL21, IGFBP7, Angiogenin + Protein S | 2.65 (1.61-4.35) | 1.75 (0.97-3.17) | 3.36 (1.75-6.42) | 4.38 (1.60-12.0) | 3.25 (1.41-7.47) | 2.86 (1.13-7.27) | 2.21 (1.21-4.04) | 1.97 (1.16-3.34) | 2.06 (1.14-3.72) |
| 5 | IL6ST, CCL21, IGFBP7, Angiogenin + IL6 | 2.63 (1.60-4.31) | 1.77 (0.98-3.19) | 3.41 (1.80-6.48) | 3.71 (1.39-9.87) | 3.45 (1.47-8.07) | 2.23 (0.94-5.27) | 2.34 (1.28-4.25) | 2.04 (1.21-3.45) | 1.88 (1.05-3.38) |
| 5 | IL6ST, CCL21, IGFBP7, Angiogenin + MMP7 | 2.62 (1.57-4.37) | 1.92 (1.05-3.50) | 4.11 (2.15-7.86) | 4.37 (1.44-13.3) | 2.29 (1.05-4.98) | 2.41 (0.86-6.74) | 2.53 (1.27-5.02) | 1.79 (1.07-3.00) | 2.06 (1.06-3.99) |
| 4 | IL6ST, CCL21, IGFBP7 + Angiogenin | 2.62 (1.58-4.39) | 1.66 (0.92-3.00) | 3.44 (1.81-6.55) | 3.97 (1.39-11.3) | 2.64 (1.19-5.88) | 2.48 (0.98-6.28) | 2.45 (1.30-4.63) | 2.00 (1.18-3.39) | 2.12 (1.16-3.90) |

TABLE 11-continued

Validation: Adjusted hazard/odds ratios of 5- or 4-protein PLSec-AFP

| | | Validation set 1 | | | Validation set 2 | | | Validation set 3 | | |
| --- | --- | --- | --- | --- | --- | --- | --- | --- | --- | --- |
| # | Combination proteins | Continuous | Binary at median | Binary at Cut-off defined in V1 | Continuous | Binary at median | Binary at Cut-off defined in V1 | Continuous | Binary at median | Binary at Cut-off defined in V1 |
| 4 | IL6ST, CCL21, IGFBP7 + IL6 | 2.62 (1.58-4.36) | 1.99 (1.09-3.62) | 3.41 (1.82-6.41) | 4.56 (1.56-13.3) | 2.75 (1.20-6.10) | 2.75 (1.19-6.38) | 2.52 (1.32-4.81) | 2.34 (1.37-3.99) | 1.63 (0.92-2.91) |
| 4 | IL6ST, CCL21, IGFBP7 + MMP7 | 2.60 (1.55-4.37) | 1.83 (1.00-3.37) | 3.45 (1.83-6.50) | 5.15 (1.55-17.1) | 2.33 (1.07-5.04) | 1.95 (0.83-4.61) | 2.88 (1.39-6.21) | 2.00 (1.18-3.39) | 1.90 (1.03-3.48) |

FIGS. 11A-11E provide more detailed validation results in the validation sets 1 (FIGS. 11A-11C) and 3 (FIGS. 11D-11E) for the top-performing 5-protein panel of IL6ST, CCL21, IGFBP7, Angiogenin, VCAM1.

Figure 12:
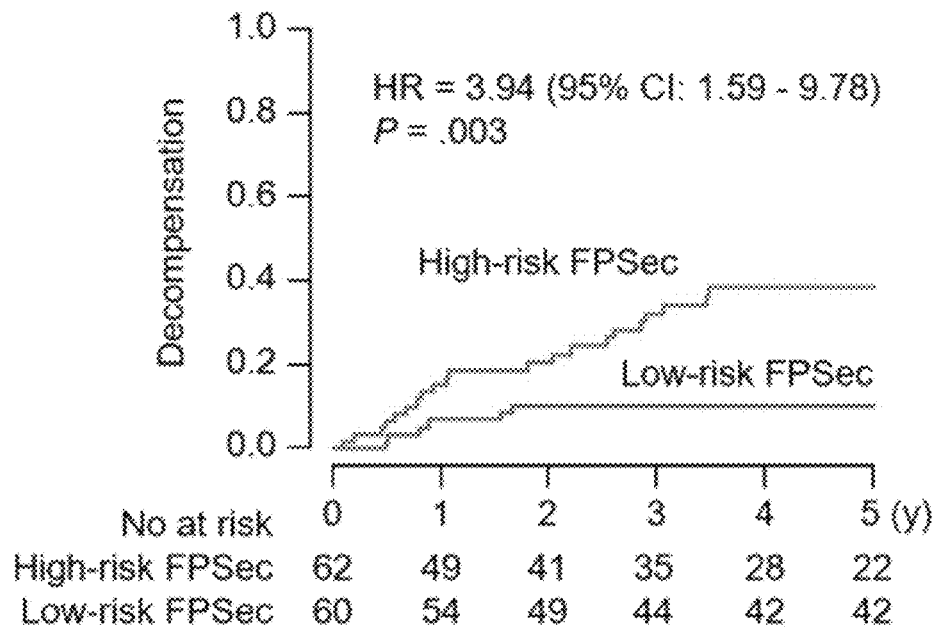
FIG. 12 depicts a validation of the FPSec in an independent cohort of US patients with compensated cirrhosis (n=122) for the development of incident hepatic decompensation (the hazard proportionality test P=0.17).

In a separate study, 7 out of the 8 PLSec proteins (VCAM1, IGFBP7, MMP7, IL6, CCL21, Protein S, Angiogenin) were shown to be significantly correlated with a hepatic Fibrosis Progression Signature in the optimization set (n=79, FIG. 12) and validated for development of hepatic decompensation in 122 patients with compensated cirrhosis within the validation set 1 (Table 12).

TABLE 12

Factors associated with fibrosis progression in the validation sets (Uni/multivariable logistic regression)

| | | Univariable | | | Multivariable | |
| --- | --- | --- | --- | --- | --- | --- |
| Variable | OR | 95% CI | P | OR | 95% CI | P |

PLS validation set 1, FPS derivation set 1 (chronic hepatitis C, case-control, U.S.)

| Variable | OR | 95% CI | P | OR | 95% CI | P |
| --- | --- | --- | --- | --- | --- | --- |
| PLS: intermediate-risk (vs. low-risk) | 3.75 | (0.56-25.12) | .17 | 8.00 | (0.77-83.30) | .08 |
| high-risk (vs. low-risk) | 5.62 | (0.92-34.57) | .06 | 10.61 | (1.01-111.51) | .049 |
| Male sex | 3.21 | (0.35-29.35) | .30 | | | |
| Age > 50 y | 0.57 | (0.10-3.21) | .53 | | | |
| Total bilirubin > 0.8 mg/dL | 1.05 | (0.25-4.33) | .95 | | | |
| Albumin < 4.0 g/dL | 1.05 | (0.25-4.33) | .95 | | | |
| AST > 40 IU/L | 7.12 | (1.31-38.76) | .02 | | | |
| ALT > 40 IU/L | 6.92 | (1.29-37.05) | .02 | 9.69 | (1.39-67.53) | .02 |
| Platelet count < 200,000/mL | 3.42 | (0.86-13.67) | .08 | 7.89 | (1.19-52.17) | .03 |
| HIV co-infection | 3.20 | (0.73-14.12) | .13 | | | |

Example 9

The PLSec score in combination with AFP (PLSec-AFP) was further validated in another independent cohort of 1,342 cirrhosis patients prospectively enrolled under the National Cancer Institute Early Detection Research Network (EDRN) Hepatocellular carcinoma Early Detection Strategy (HEDS) study (Table 13).

TABLE 13

Patient Demographics

| Age (y) | 61 (55-66) |
| --- | --- |
| Male (sex) | 710 (53%) |
| Obesity | 675 (50%) |
| Race/ethnicity (Non-Hispanic white/ Hispanic/black/others) | 1,083/127/91/41 (81%/10%/7%/2%) |
| Etiology (HCV/SVR/HBV/NAFLD/ Alcohol/others) | 557/213/29/291/199/253 (42%/16%/2%/22%/ 15%/17%) |
| Child-Pugh class A/B | 976/364 (7%/27%) |

TABLE 13-continued

Patient Demographics

| AFP (ng/mL) | 3.8 (2.4-6.3) |
| --- | --- |
| PLSec | 3 (2-4) |
| PLSec-AFP/High-risk | 1.26 (0.98-2.00)/ |
| PLSec-AFP | 302 (23%) |

Figure 13A:
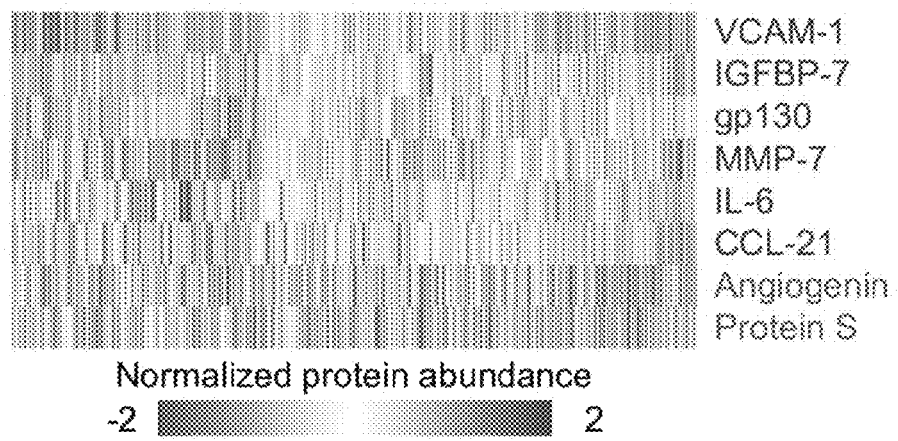
FIGS. 13A-13C depict validation studies of the PLSec score in combination with AFP (PLSec-AFP) showing statistically significant association of the prediction of HCC with the clinical endpoint (time to HCC development) was successfully confirmed in cirrhosis patients.
Figure 13B:
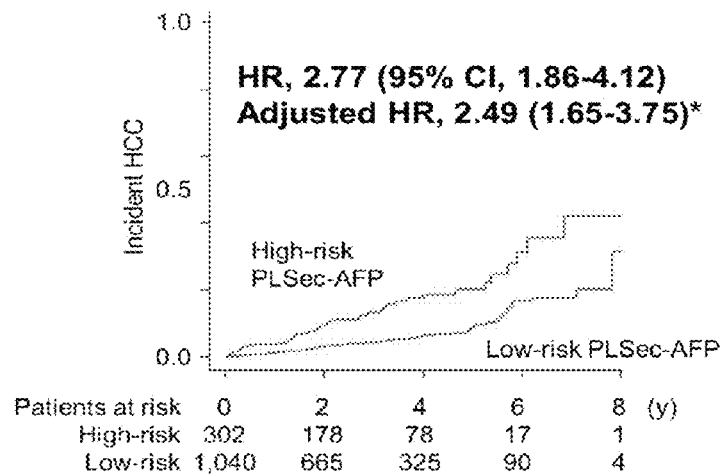
Figure 13C:
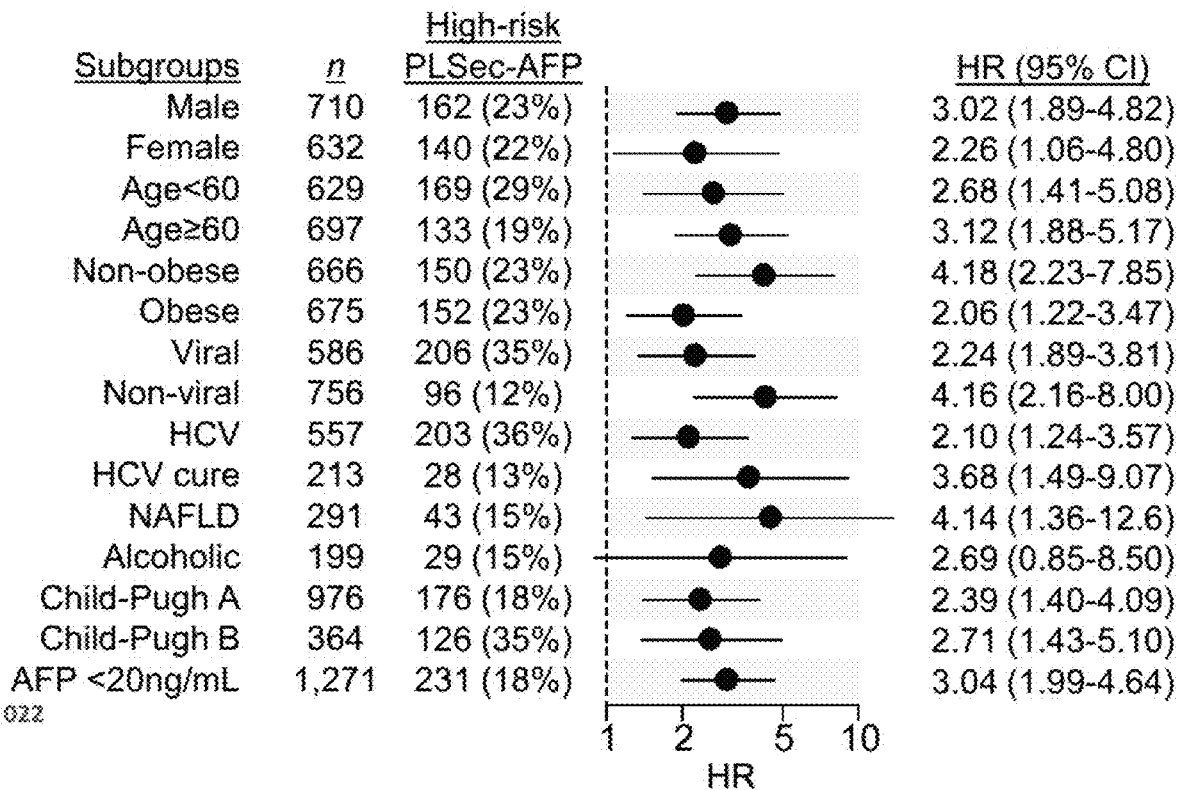

Categorical variables are shown as n (%); Continuous variables are shown as median Prospectively archived serum samples were analyzed with the PLSec assay using the FDA-approved multiplex clinical diagnostic platform, xMAP assay, Luminex. The prognostic prediction was performed following the established algorithm as outlined in the present disclosure. Statistically significant association of the prediction with the clinical endpoint (time to HCC development, Hazard ratio >2 with statistical significance) was successfully confirmed. High-risk PLSec-AFP was pre-defined as >1.66 (FIGS. 13A-13C).

What is claimed is:

1. A method of reducing and/or mitigating the risk for developing hepatocellular carcinoma (HCC) in a subject, the method comprising:
   (a) obtaining a prognostic liver secretome signature (PLSec) score for the subject by a method comprising:
      (i) subjecting a sample of blood from the subject to a multi-analyte profiling assay for protein quantification of vascular cell adhesion molecule 1 (VCAM-1), insulin-like growth factor-binding protein 7 (IG-FBP-7), gp130, matrilysin, interleukin-6 (IL-6), C-C motif chemokine ligand 21 (CCL-21), angiogenin, and protein S;

(ii) normalizing protein quantification measurements of VCAM-1, IGFBP-7, gp130, matrilysin, IL-6, CCL-21, angiogenin, and protein S to median fluorescent intensity; and (iii) converting the normalized protein quantification measurements of VCAM-1, IGFBP-7, gp130, matrilysin, IL-6, CCL-21, angiogenin, and protein S into an aggregated score, wherein the aggregated score is the PLSec score; and (b) identifying the subject as at high risk for developing HCC based on the PLSec score obtained for the subject; and (c) administering one or more chemoprevention agents to subject identified as at high risk for developing HCC, wherein the one or more chemoprevention agents comprise an antiviral, a statin, an anti-diabetic, a dietary and/or nutritional agent, eicosapentaenoic acid (EPA), docosapentaenoic acid (DPA), docosahexaenoic acid (DHA), Branched-chain amino acid (BCAA), Vitamin D, S-adenosylmethionine (SAMe), an anti-inflammatory, an immunomodulatory, or any combination thereof; and wherein the subject has or is suspected of having a disease, a condition, or a combination thereof that predisposes the subject to HCC.

2. The method of claim 1, wherein the subject is identified to be at high risk for developing HCC if the PLSec score is 4 or higher.

3. The method of claim 1, wherein the disease, condition, or combination thereof that predisposes the subject to HCC comprises cirrhosis, chronic infection of hepatitis B virus (HBV), chronic infection of hepatitis C virus (HCV), non-alcoholic fatty liver disease (NAFLD), non-alcoholic steatohepatitis (NASH), primary biliary cirrhosis (PBC), hereditary hemochromatosis, type 2 diabetes, obesity, tobacco use, alcohol abuse, long-term anabolic steroid use, tyrosinemia, alpha1-antitrypsin deficiency, *porphyria* cutanea *tarda*, glycogen storage diseases, Wilson disease, or any combination thereof.

4. The method of claim 1 further comprising diagnosing HCC in the subject determined to be at risk of developing HCC.

5. The method of claim 4, wherein the method of diagnosing HCC in the subject comprises performing a liver biopsy, one or more blood tests to assess liver function, computed tomography, magnetic resonance imaging, or any combination thereof.

6. The method of claim 5, wherein the one or more blood tests performed to assess liver function comprises a measurement of alanine transaminase (ALT), aspartate transaminase (AST), alkaline phosphatase (ALP), albumin, bilirubin, gamma-glutamyltransferase (GGT), L-lactate dehydrogenase (LD), prothrombin time (PT), or any combination thereof.

7. The method of claim 4 further comprising administering one or more treatments of HCC to the subject diagnosed with HCC.

8. The method of claim 7, wherein the one or more treatments of HCC comprises surgical removal of one or more liver tumors, liver transplant, radiation therapy, drug therapy, immunotherapy, chemotherapy, or any combination thereof.

9. The method of claim 8, wherein the drug therapy comprises administration of one or more drugs to the subject, wherein the drugs are comprised of sorafenib, regorafenib, nivolumab, erlotinib, lenvatinib, cabozantinib, ramucirumab, pembrolizumab, durvalumab, tremelimumab, atezolizumab, bevacizumab, or any combination thereof.

10. A method of determining a prognostic liver secretome signature (PLSec) score for a subject comprising:

(a) obtaining a sample of blood from the subject;

(b) subjecting the sample to a multi-analyte profiling assay for protein quantification measurements of vascular cell adhesion molecule 1 (VCAM-1), insulin-like growth factor-binding protein 7 (IGFBP-7), gp130, matrilysin, interleukin-6 (IL-6), C-C motif chemokine ligand 21 (CCL-21), angiogenin, and protein S;

(c) normalizing the protein quantification measurements of VCAM-1, IGFBP-7, gp130, matrilysin, IL-6, CCL-21, angiogenin, and protein S to median fluorescent intensity; and, (d) converting the normalized protein quantification measurements of VCAM-1, IGFBP-7, gp130, matrilysin, IL-6, CCL-21, angiogenin, and protein S into an aggregated score, wherein the aggregated score is the PLSec score.

11. The method of claim 10, wherein the subject is having or is suspected of having a disease, a condition, or a combination thereof that predisposes the subject to hepatocellular carcinoma (HCC).

12. The method of claim 11, wherein the disease, condition, or combination thereof that predisposes the subject to HCC comprises cirrhosis, chronic infection of hepatitis B virus (HBV), chronic infection of hepatitis C virus (HCV), non-alcoholic fatty liver disease (NAFLD), non-alcoholic steatohepatitis (NASH), primary biliary cirrhosis (PBC), hereditary hemochromatosis, type 2 diabetes, obesity, tobacco use, alcohol abuse, long-term anabolic steroid use, tyrosinemia, alpha1-antitrypsin deficiency, *porphyria* cutanea *tarda*, glycogen storage diseases, Wilson disease, or any combination thereof.

13. A method of treating a subject at high risk for developing hepatocellular carcinoma (HCC), the method comprising:

(a) determining if the subject is at high risk for developing HCC by (i) obtaining a sample of blood from the subject;

(ii) determining protein levels of six or more liver disease biomarkers in the sample wherein;

the six or more liver disease biomarkers are selected from vascular cell adhesion molecule 1 (VCAM-1), insulin-like growth factor-binding protein 7 (IGFBP-7), gp130, matrilysin, interleukin-6 (IL-6), C-C motif chemokine ligand 21 (CCL-21) angiogenin and protein S;

(iii) determining that the subject is at high risk for developing HCC if the six or more liver disease biomarkers have a higher protein expression compared to a control, wherein the control is a sample of blood from a subject known to not have any liver disease; and (b) administering one or more-chemoprevention agents to the subject determined to be at high risk for developing HCC;

wherein the one or more chemoprevention agents comprise antiviral, a statin, an anti-diabetic, a dietary and/or nutritional agent, eicosapentaenoic acid (EPA), docosapentaenoic acid (DPA), docosahexaenoic acid (DHA), Branched-chain amino acid (BCAA), Vitamin D, S-adenosylmethionine (SAMe), an anti-inflammatory, an immunomodulatory, or any combination thereof.

14. The method of claim 13, wherein the subject is at high risk for developing HCC if VCAM-1, IGFBP-7, gp130, matrilysin, IL-6, and CCL-21 have a higher protein expression compared to the control.

15. The method of claim 13, wherein the subject is at high risk for developing HCC if VCAM-1, IGFBP-7, gp130, matrilysin, IL-6, CCL-21, angiogenin and protein S have a higher protein expression compared to the control.

16. The method of claim 13, wherein the protein level of at least six liver disease biomarkers is determined by one or more methods selected from the group consisting of Western blotting, enzyme-linked immunosorbent assay (ELISA), multi-analyte profiling assay, mass spectrometry, HPLC, flow cytometry, fluorescence-activated cell sorting (FACS), liquid chromatography-mass spectrometry (LC/MS), immunoelectrophoresis, translation complex profile sequencing (TCP-seq), protein microarray, protein chip, capture arrays, reverse phase protein microarray (RPPA), two-dimensional gel electrophoresis or (2D-PAGE), functional protein microarrays, electrospray ionization (ESI), matrix-assisted laser desorption/ionization (MALDI), and combinations thereof.

17. The method of claim 1, comprising performing risk-based liver cancer screening on the subject identified to be at high risk for developing HCC and wherein performing risk-based liver cancer screening on the subject comprises measuring circulating cell-free methylated DNA, measuring a-fetoprotein (AFP), ultrasound, magnetic resonance imaging (MRI), computed tomography (CT), or any combination thereof.

18. The method of claim 17, comprising performing the risk-based liver cancer screening on the subject twice a year.

19. The method of claim 1, comprising administering the one or more chemoprevention agents to the subject identified to be at high risk for developing HCC.

20. The method of claim 19, wherein the one or more chemoprevention agents comprise tenofovir disoproxil fumarate, simvastatin, atorvastatin, lovastatin, pravastatin, rosuvastatin, metformin, polyunsaturated fatty acids (PUFAs), eicosapentaenoic acid (EPA), docosapentaenoic acid (DPA), docosahexaenoic acid (DHA), Branched-chain amino acid (BCAA), Vitamin D, S-adenosylmethionine (SAMe), celecoxib, aspirin, thalidomide, thymalfasin, or any combination thereof.

21. The method of claim 13, wherein the one or more chemoprevention agents comprise tenofovir disoproxil fumarate, simvastatin, atorvastatin, lovastatin, pravastatin, rosuvastatin, metformin, polyunsaturated fatty acids (PUFAs), eicosapentaenoic acid (EPA), docosapentaenoic acid (DPA), docosahexaenoic acid (DHA), Branched-chain amino acid (BCAA), Vitamin D, S-adenosylmethionine (SAMe), celecoxib, aspirin, thalidomide, thymalfasin, or any combination thereof.

* * * * *